US010129558B2

(12) United States Patent
Ramasubramonian et al.

(10) Patent No.: US 10,129,558 B2
(45) Date of Patent: Nov. 13, 2018

(54) SUPPLEMENT ENHANCEMENT INFORMATION (SEI) MESSAGES FOR HIGH DYNAMIC RANGE AND WIDE COLOR GAMUT VIDEO CODING

(71) Applicant: QUALCOMM Incorporated, San Diego, CA (US)

(72) Inventors: Adarsh Krishnan Ramasubramonian, San Diego, CA (US); Dmytro Rusanovskyy, San Diego, CA (US); Joel Sole Rojals, San Diego, CA (US); Sungwon Lee, San Diego, CA (US); Done Bugdayci Sansli, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 15/269,497

(22) Filed: Sep. 19, 2016

(65) Prior Publication Data
US 2017/0085896 A1 Mar. 23, 2017

Related U.S. Application Data

(60) Provisional application No. 62/236,804, filed on Oct. 2, 2015, provisional application No. 62/221,586, filed on Sep. 21, 2015.

(51) Int. Cl.
H04N 19/66 (2014.01)
H04N 19/70 (2014.01)
(Continued)

(52) U.S. Cl.
CPC ......... H04N 19/463 (2014.11); H04N 19/184 (2014.11); H04N 19/36 (2014.11);
(Continued)

(58) Field of Classification Search
None
See application file for complete search history.

(56) References Cited

U.S. PATENT DOCUMENTS 8,811,470 B2  8/2014 Kimura et al.
2012/0314944 A1 12/2012 Ninan et al.
(Continued)

OTHER PUBLICATIONS

Bugdayci Sansli et al., "Dynamic Range Adjustment SEI Message", Joint Collaboration Team on Video Coding (JCT-VC) on ITU-T SG 16 WP 3 and ISO/IEC JTC 1/SC 29/WG 11, 21st Meeting: Warsaw, Poland, Jun. 19-26, 2015, Document JCTVC-U0098. (Year: 2015).*
(Continued)

Primary Examiner — Reza Aghevli
(74) Attorney, Agent, or Firm — Shumaker & Sieffert, P.A.

(57) ABSTRACT

This disclosure relates to processing video data, including processing video data that is represented by an HDR/WCG color representation. In accordance with one or more aspects of the present disclosure, one or more Supplemental Enhancement Information (SEI) Messages may be used to signal syntax elements and or other information that allow a video decoder or video postprocessing device to reverse the dynamic range adjustment (DRA) techniques of this disclosure to reconstruct the original or native color representation of the video data. Dynamic range adjustment (DRA) parameters may be applied to video data in accordance with one or more aspects of this disclosure in order to make better use of an HDR/WCG color representation, and may include the use of global offset values, as well as local scale and offset values for partitions of color component values.

68 Claims, 17 Drawing Sheets

(51) Int. Cl.

| | | |
|---|---|---|
| *H04N 19/46* | (2014.01) | |
| *H04N 19/80* | (2014.01) | |
| *H04N 19/85* | (2014.01) | |
| *H04N 19/36* | (2014.01) | |
| *H04N 19/44* | (2014.01) | |
| *H04N 19/463* | (2014.01) | |
| *H04N 19/184* | (2014.01) | |
| *H04N 19/117* | (2014.01) | |
| H04N 19/124 | (2014.01) | |
| H04N 19/60 | (2014.01) | |
| H04N 19/186 | (2014.01) | |
| H04N 19/154 | (2014.01) | |
| H04N 19/174 | (2014.01) | |

(52) U.S. Cl.
CPC .............. *H04N 19/46* (2014.11); *H04N 19/66* (2014.11); *H04N 19/70* (2014.11); *H04N 19/80* (2014.11); *H04N 19/85* (2014.11); *H04N 19/117* (2014.11); *H04N 19/124* (2014.11); *H04N 19/154* (2014.11); *H04N 19/174* (2014.11); *H04N 19/186* (2014.11); *H04N 19/44* (2014.11); *H04N 19/60* (2014.11)

(56) References Cited

U.S. PATENT DOCUMENTS

| | | | |
|---|---|---|---|
| 2013/0294689 A1 | 11/2013 | Jia et al. | |
| 2014/0218473 A1* | 8/2014 | Hannuksela | H04N 19/597 348/43 |
| 2014/0219346 A1* | 8/2014 | Ugur | H04N 19/00575 375/240.12 |
| 2014/0247869 A1 | 9/2014 | Su et al. | |
| 2014/0247870 A1* | 9/2014 | Mertens | H04N 19/46 375/240.08 |
| 2014/0294313 A1 | 10/2014 | Su et al. | |
| 2015/0010059 A1 | 1/2015 | Hattori et al. | |
| 2015/0016542 A1 | 1/2015 | Rosewarne et al. | |
| 2015/0063465 A1* | 3/2015 | Hattori | H04N 9/73 375/240.25 |
| 2015/0237322 A1 | 8/2015 | Stec et al. | |
| 2016/0227217 A1* | 8/2016 | Karczewicz | H04N 19/70 |
| 2016/0309154 A1* | 10/2016 | Rusanovskyy | H04N 19/159 |
| 2016/0360215 A1* | 12/2016 | Rusanovskyy | H04N 19/1887 |
| 2017/0026646 A1 | 1/2017 | Minoo et al. | |
| 2017/0085878 A1* | 3/2017 | Sole Rojals | H04N 19/124 |
| 2017/0085894 A1* | 3/2017 | Ramasubramonian | H04N 19/46 |
| 2017/0085896 A1* | 3/2017 | Ramasubramonian | H04N 19/70 |
| 2017/0105014 A1* | 4/2017 | Lee | H04N 19/30 |
| 2017/0111643 A1* | 4/2017 | Bugdayci Sansli | H04N 19/30 |
| 2017/0310981 A1 | 10/2017 | Agostinelli | |
| 2017/0318301 A1 | 11/2017 | Li et al. | |
| 2017/0330529 A1 | 11/2017 | Van et al. | |
| 2017/0332098 A1* | 11/2017 | Rusanovskyy | H04N 19/55 |

OTHER PUBLICATIONS

Joint Collaborative Team on Video Coding (JCT-VC) of ITU-T SG 16 WP 3 and ISO/IEC JTC 1/SC 29/WG 11, 2ast Meeting, Warsaw, Poland, Jun. 19-26, 2015, Document: JCTVC-U0098. (Year: 2015).*
Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
"High Dynamic Range Electro-Optical Transfer Function of Mastering Reference Displays," SMPTE ST 2084:2014; SMPTE Standard, Aug. 16, 2014, 14 pp.
"Parameter values for the HDTV standards for production and international programme exchange," Recommendation ITU-R BT_709-6, International Telecommunication Union, Jun. 2015, 19 pp.
"Parameter values for ultra-high definition television systems for production and international programme exchange," Recommendation ITU-R BT.2020-2, International Telecommunication Union, Oct. 2015, 8 pp.
"Parameter values for the HDTV standards for production and international programme exchange," Recommendation ITU-R BT.709-5, International Telecommunication Union, Apr. 2002, 32 pp.
Wang et al., "High Efficiency Video Coding (HEVC) Defect Report," Jul. 25-Aug. 2, 2013, Vienna, AT (Joint Collaborative Team on Video Coding of ISO/IEC JTC1/SC29/WG11 and ITU-T SG.16); JCTVC-N1003_v1; Sep. 27, 2013; 311 pp.
ETSI TS 101 547-2, V1.2.1, Digital Video Broadcasting (DVB); Plano-steroscopic 3DTV; Part 2: Frame Compatible Plano-stereoscopic 3DTV, Nov. 2012, 26 pp.
ETSI TS 126 141, V13.0.0, Digital cellular telecommunications system (Phase 2+); Universal Mobile Telecommunications System (UMTS); LTE; IP Multimedia System (IMS) Messaging and Presence; Media formats and codecs, (3GPP TS 26.141 version 13.0.0 Release 13); Jan. 2016; 15 pp.
ETSI TS 101 154 V1.9.1, Digital Video Broadcasting (DVB); Specification for the use of Video and Audio Coding in Broadcasting Applications based on the MPEG-2 Transport Stream, Sep. 2009, 163 pp.
Sansli et al., "Dynamic range adjustment SEI message," m36330, Jun. 19-26, 2015, Warsaw, PL (Joint Collaborative Team on Video Coding of ISO/IEC JTC1/SC29/WG11 and ITU-T SG.16); MPEG meeting, Jun. 26, 2015, No. JCTVC-U0098, 5 pp.
ITU-T H-264, Series H: Audiovisual and Multimedia Systems, Infrastructure of audiovisual services—Coding of moving video, Advanced video coding for generic audiovisual services, The International Telecommunication Union. Jun. 2011, 674 pp.
"Image parameter values for high dynamic range television for use in production and international programme exchange," Recommendation ITU-R BT.2100-0; International Telecommunication Union, Jul. 2016, 17 pp.
ITU-T Recommendation, H.264—Telecommunication Standardization Sector of ITU; Series H: Audiovisual and Multimedia Systems; Infrastructure of audiovisual services—Coding of moving video; "Advanced video coding generic audiovisual services," Mar. 2005, pp. 1-343.
Response to Written Opinion dated Nov. 14, 2016, from International Application No. PCT/US2016/052640, filed on Jul. 21, 2017, 5 pp.
Second Written Opinion from International Application No. PCT/US2016/052640, dated Sep. 19, 2017, 5 pp.
International Preliminary Report on Patentability from International Application No. PCT/US2016/052640, dated Dec. 19, 2017, 11 pp.
Dsouza et al., "Adaptive Gamut Expansion for Chroma Components," JCT-VC Meeting; Feb. 19-26, 2016; San Diego, CA, USA (Joint Collaborative Team on Video Coding of ISO/IEC JTC1/SC29/WG11 and ITU-T SG.16); URL: http://wftp3.itu.int/av-arch/jctvc-site/, No. JCTVC-W0040, Feb. 10, 2016, XP030117808, 9 pp.
Francois et al., "HDR CE2: CE6-4.6b report of usage of SEI for Test Model," JCT-VC Meeting; Feb. 19-26, 2016; San Diego, CA, USA (Joint Collaborative Team on Video Coding of ISO/IEC JTC1/SC29/WG11 and ITU-T SG.16); URL:http://wftp3.itu.int/av-arch/jctvc-site/, No. JCTVC-W0059/m37693, Feb. 10, 2016, XP030117831, 6 pp.
"Dynamic Range Adjustment SEI to enable High Dynamic Range video coding with Backward-Compatible Capability," ITU-T SG16 Meeting; Geneva, CH, No. T13-SG16-C-1027, Sep. 29, 2015, XP030100746, 11 pp.
Sansli et al., "Dynamic Range Adjustment SEI Message," JCT-VC Meeting; Jun. 19-26, 2015; Warsaw, PL (Joint collaborative Team on Video Coding of ISO/IEC JTC1/SC29/WG11 and ITU-TSG.16); URL:http://wftp3.itu.int/av-arch/jctvc-site/, No. JCTVC-U0098-v2, Jun. 25, 2015, XP030117531, 6 pp.

(56) References Cited

OTHER PUBLICATIONS

Sansli et al., "HDR CE6: Test 4.1 Reshaper from m37064," JCT-VC Meeting; Feb. 19-26, 2016; San Diego, CA, USA; (Joint Collaborative Team on Video Coding of ISO/IEC JTC1/SC29/WG11 and ITU-T SG.16); URL:http://wftp3.itu.int/av-arch/jctvc-site/, No. JCTVC-W0103-v3, Feb. 23, 2016, XP030117886, with Supplemental Materials, 37 pp.

Rusanovskyy et al., "Candidate HDR test model proposal on CE2.1.3 test," Geneva, CH, ISO/IEC JTC1/SC29/WG11 MPEG2015/M37427, Oct. 2015, 18 pp.

"Candidate Test Model for HEVC extension for HDR and WCG video coding based on technology in CE2.1.3," Geneva, CH, ISO/IEC JTC1/SC29/WG11 MPEG2015/m37427, Oct. 2015, 8 pp.

U.S. Appl. No. 15/269,558, filed by Adarsh Krishnan Ramasubramonian on Sep. 19, 2016.

International Search Report and Written Opinion from International Application No. PCT/US2016/052640, dated Nov. 14, 2016, 15 pp.

Yeung, et al., "Indication of SMPTE 2094-10 metadata in HEVC," JCT-VC Meeting; Feb. 19-26, 2016;(Joint Collaborative Team on Video Coding of ISO/IEC JTC1/SC29/WG11 and ITU-T SG.16); document No. JCTVC-W0086, Feb. 9, 2016; 6 pp.

de Haan et al., "Indication of SMPTE 2094-20 metadata in HEVC," JCT-VC Meeting; Feb. 19-26, 2016;(Joint Collaborative Team on Video Coding of ISO/IEC JTC1/SC29/WG11 and ITU-T SG.16); document No. JCTVC-W0133; Feb. 26, 2016; 5 pp.

\* cited by examiner

Example of EOTFs

SUPPLEMENT ENHANCEMENT INFORMATION (SEI) MESSAGES FOR HIGH DYNAMIC RANGE AND WIDE COLOR GAMUT VIDEO CODING

This application claims the benefit of U.S. Provisional Application No. 62/221,586, filed Sep. 21, 2015, and U.S. Provisional Application No. 62/236,804, filed Oct. 2, 2015, the entire content of both of which are hereby incorporated by reference.

TECHNICAL FIELD

This disclosure relates to video processing.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

The total number of color values that may be captured, coded, and displayed may be defined by a color gamut. A color gamut refers to the range of colors that a device can capture (e.g., a camera) or reproduce (e.g., a display). Often, color gamuts differ from device to device. For video coding, a predefined color gamut for video data may be used such that each device in the video coding process may be configured to process pixel values in the same color gamut. Some color gamuts are defined with a larger range of colors than color gamuts that have been traditionally used for video coding. Such color gamuts with a larger range of colors may be referred to as a wide color gamut (WCG).

Another aspect of video data is dynamic range. Dynamic range is typically defined as the ratio between the maximum and minimum brightness (e.g., luminance) of a video signal. The dynamic range of common video data used in the past is considered to have a standard dynamic range (SDR). Other example specifications for video data define color data that has a larger ratio between the maximum and minimum brightness. Such video data may be described as having a high dynamic range (HDR).

SUMMARY

This disclosure relates to processing video data, including processing video data that is represented by an HDR/WCG color representation. In accordance with one or more aspects of the present disclosure, one or more Supplemental Enhancement Information (SEI) Messages may be used to signal syntax elements and or other information that allow a video decoder or video postprocessing device to reverse the dynamic range adjustment (DRA) techniques of this disclosure to reconstruct the original or native color representation of the video data. Dynamic range adjustment (DRA) parameters may be applied to video data in accordance with one or more aspects of this disclosure in order to make better use of an HDR/WCG color representation, and may include the use of global offset values, as well as local scale and offset values for partitions of color component values.

In one example of the disclosure, a method of decoding video data that has been adjusted by performing a dynamic range adjustment, comprises receiving at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment, and performing an inverse dynamic range adjustment on the video data in accordance with the adjustment information to generate unadjusted component values from the video data.

In another example of the disclosure, a method of encoding video data comprises performing a dynamic range adjustment on the video data to generate adjusted component values from the video data, and generating at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment.

In another example of the disclosure, an apparatus configured to decode video data that has been adjusted by performing a dynamic range adjustment comprises a memory configured to store the video data, and one or more processors configured to: receive at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment, and perform an inverse dynamic range adjustment on the video data in accordance with the adjustment information to generate unadjusted component values from the video data.

In another example of the disclosure, an apparatus configured to decode video data that has been adjusted by performing a dynamic range adjustment comprises means for receiving at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment, and means for performing an inverse dynamic range adjustment on the video data in accordance with the adjustment information to generate unadjusted component values from the video data.

In another example of the disclosure, a computer program product for decoding video data that has been adjusted by performing a dynamic range adjustment comprises a computer-readable medium having stored thereon. When executed the instructions cause a processor to receive at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment, and perform an inverse dynamic range adjustment on the video data in accordance with the adjustment information to generate unadjusted component values from the video data.

The details of one or more examples are set forth in the accompanying drawings and the description below. Other features, objects, and advantages will be apparent from the description, drawings, and claims.

DETAILED DESCRIPTION

This disclosure is related to the processing and/or coding of video data with high dynamic range (HDR) and wide color gamut (WCG) representations. More specifically, the techniques of this disclosure include signaling and related operations that are applied to video data in certain color spaces to enable more efficient compression of HDR and WCG video data. In accordance with one or more aspects of the present disclosure, parameters relating to such operations may be signaled through one or more SEI messages. The techniques and devices described herein may improve compression efficiency of hybrid-based video coding systems (e.g., H.265/HEVC, H.264/AVC, etc.) utilized for coding video data, including HDR and WCG video data.

Video coding standards, including hybrid-based video coding standards include ITU-T H.261, ISO/IEC MPEG-1 Visual, ITU-T H.262 or ISO/IEC MPEG-2 ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely High Efficiency Video coding (HEVC, also called H.265), has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version of the finalized HEVC standard was published in October 2014. A copy of the H.265/HEVC specification text may be downloaded from http://www.itu.int/rec/T-REC-H.265-201504-I/en.

Figure 1:
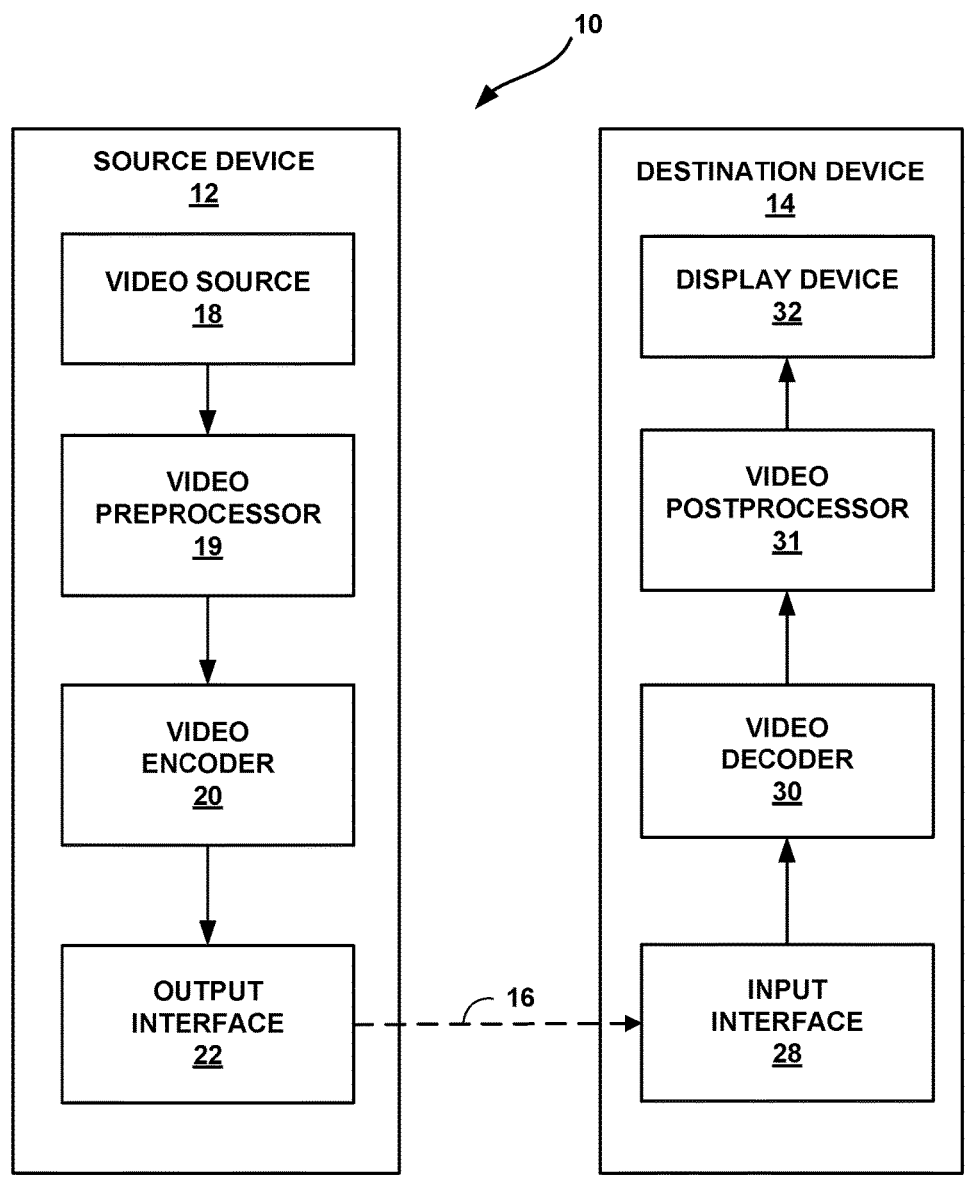
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wired or wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In other examples, computer-readable medium 16 may include non-transitory storage media, such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video preprocessor 19, video encoder 20, and output interface 22. Destination device 14 includes input interface 28, video postprocessor 31, video decoder 30, and display device 32. In accordance with this disclosure, video preprocessor 19 of source device 12 may be configured to implement the techniques of this disclosure, including signaling and related operations applied to video data in certain color spaces to enable more efficient compression of HDR and WCG video data. In some examples, video preprocessor 19 may be separate from video encoder 20. In other examples, video preprocessor 19 may be part of video encoder 20. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing HDR and WCG video data may be performed by any digital video encoding and/or video decoding device. Moreover, the techniques of this disclosure may also be performed by a video preprocessor and/or video postprocessor. A video preprocessor may be any device configured to process video data before encoding (e.g., before HEVC encoding). A video postprocessor may be any device configured to process video data after decoding (e.g., after HEVC decoding). Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components, as well as a video preprocessor and a video postprocessor (e.g., video preprocessor 19 and video postprocessor 31, respectively). Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding and video processing, in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video preprocessor 19 and video postprocessor 31 each may be implemented as any of a variety of suitable encoder circuitry, such as one or more microprocessors, DSPs, ASICs, FPGAs, discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the HEVC standard.

In accordance with one or more aspects of the present disclosure, one or more SEI messages may signal one or more parameters generated by video preprocessor 19. As will be explained in more detail below, video preprocessor 19 and video postprocessor 31 may be, in some examples, configured to receive video data related to a first color representation comprising a first color container, the first color container being defined by a first color gamut or a first set or color primaries, and a first color space, derive one or more dynamic range adjustment parameters, the dynamic range adjustment parameters being based on characteristics of the video data, and perform a dynamic range adjustment on the video data in accordance with the one or more dynamic range adjustment parameters. Video encoder 20 may signal the one or more SEI messages based on one or more parameters received from the video preprocessor 19. Video decoder 30 may receive and decode the one or more SEI messages and pass the parameters to the video postprocessor 31.

Video preprocessor 19 and video postprocessor 31 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. As discussed above video preprocessor 19 and video postprocessor 31 may be separate devices from video encoder 20 and video decoder 30, respectively. In other examples, video preprocessor 19 may be integrated with video encoder 20 in a single device and video postprocessor 31 may be integrated with video decoder 30 in a single device.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion indicating a spatial displacement between a sample block of the PU and the first reference location and a second motion indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR and a WCG. Parameters of the utilized dynamic range and color gamut are two independent attributes of video content, and their specification for purposes of digital television and multimedia services are defined by several international standards. For example, ITU-R Rec. BT.709, "Parameter values for the HDTV standards for production and international programme exchange," and/or ITU-R Rec. BT.2020, "Parameter values for ultra-high definition television systems for production and international programme exchange," defines parameters for HDTV (high definition television) and UHDTV (ultra-high definition television), respectively, such as standard dynamic range (SDR) and color primaries that extend beyond the standard color gamut. Rec. BT.2100: Image parameter values for high dynamic range television for use in production and international programme exchange" defines transfer functions and representations for HDR television use, including primaries that support wide color gamut representation. There are also other standards developing organization (SDOs) documents that specify dynamic range and color gamut attributes in other systems, e.g., DCI-P3 color gamut is defined in SMPTE-231-2 (Society of Motion Picture and Television Engineers) and some parameters of HDR are defined in SMPTE-2084. A brief description of dynamic range and color gamut for video data is provided below.

Dynamic range is typically defined as the ratio between the maximum and minimum brightness (e.g., luminance) of the video signal. Dynamic range may also be measured in terms of 'f-stop,' where one f-stop corresponds to a doubling of a signal's dynamic range. In MPEG's definition, content that features brightness variation with more than 16 f-stops is referred as HDR content. In some terms, levels between 10 and 16 f-stops are considered as intermediate dynamic range, but it is considered HDR in other definitions. In some examples of this disclosure, HDR video content may be any video content that has a higher dynamic range than traditionally used video content with a standard dynamic range (e.g., video content as specified by ITU-R Rec. BT.709).

Figure 2:
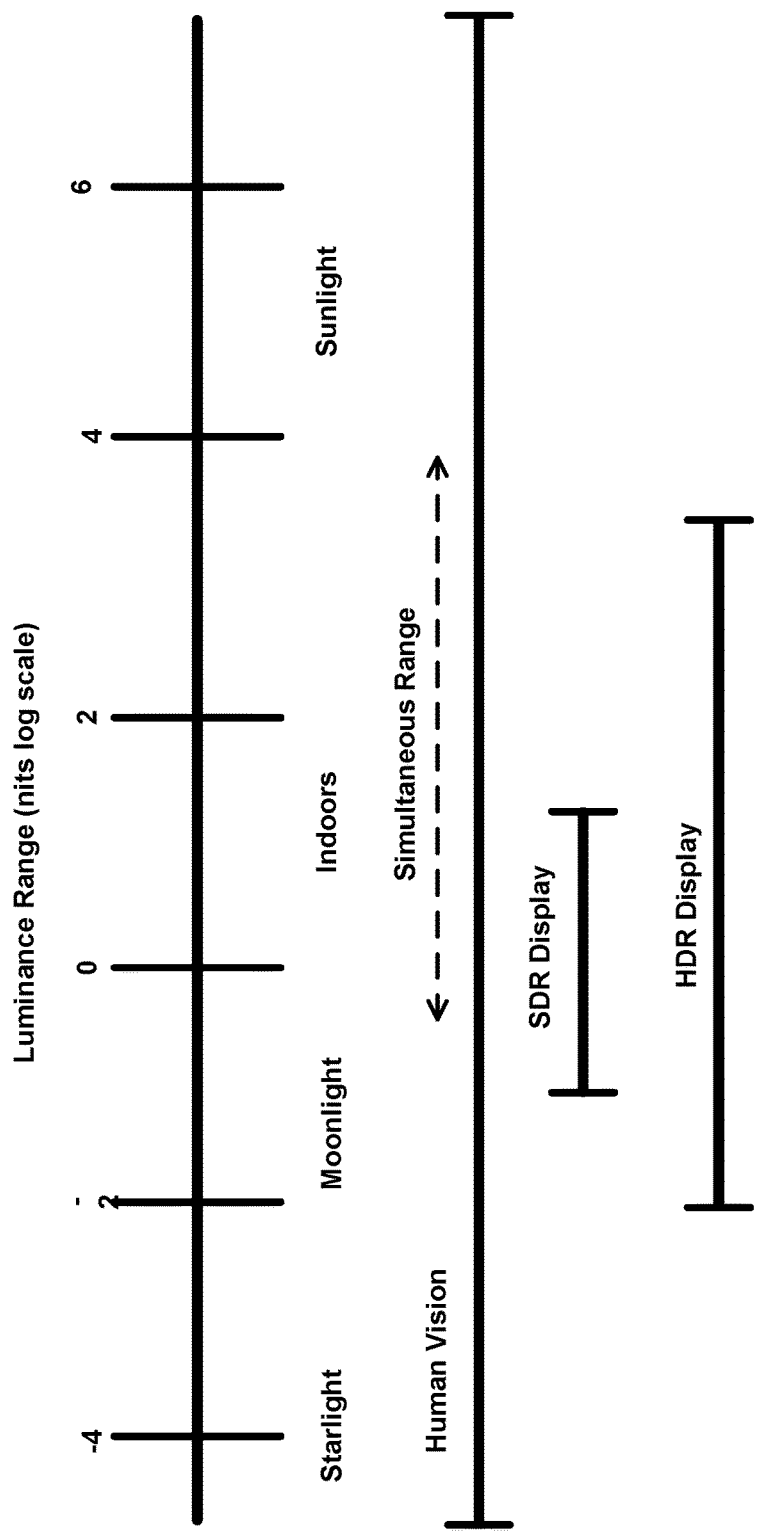
FIG. 2 is a conceptual drawing illustrating the concepts of HDR data.

The human visual system (HVS) is capable for perceiving much larger dynamic ranges than SDR content and HDR content. However, the HVS includes an adaptation mechanism to narrow the dynamic range of the HVS to a so-called simultaneous range. The width of the simultaneous range may be dependent on current lighting conditions (e.g., current brightness). Visualization of dynamic range provided by SDR of HDTV, expected HDR of UHDTV and HVS dynamic range is shown in FIG. 2, although the exact range may vary based on each individual and display.

Current video application and services are regulated by ITU Rec.709 and provide SDR, typically supporting a range of brightness (e.g., luminance) of around 0.1 to 100 candelas (cd) per m2 (often referred to as "nits"), leading to less than 10 f-stops. Some example next generation video services are expected to provide dynamic range of up to 16 f-stops. Although detailed specifications for such content are currently under development, some initial parameters have been specified in SMPTE-2084 and ITU-R Rec. 2020.

Figure 3:
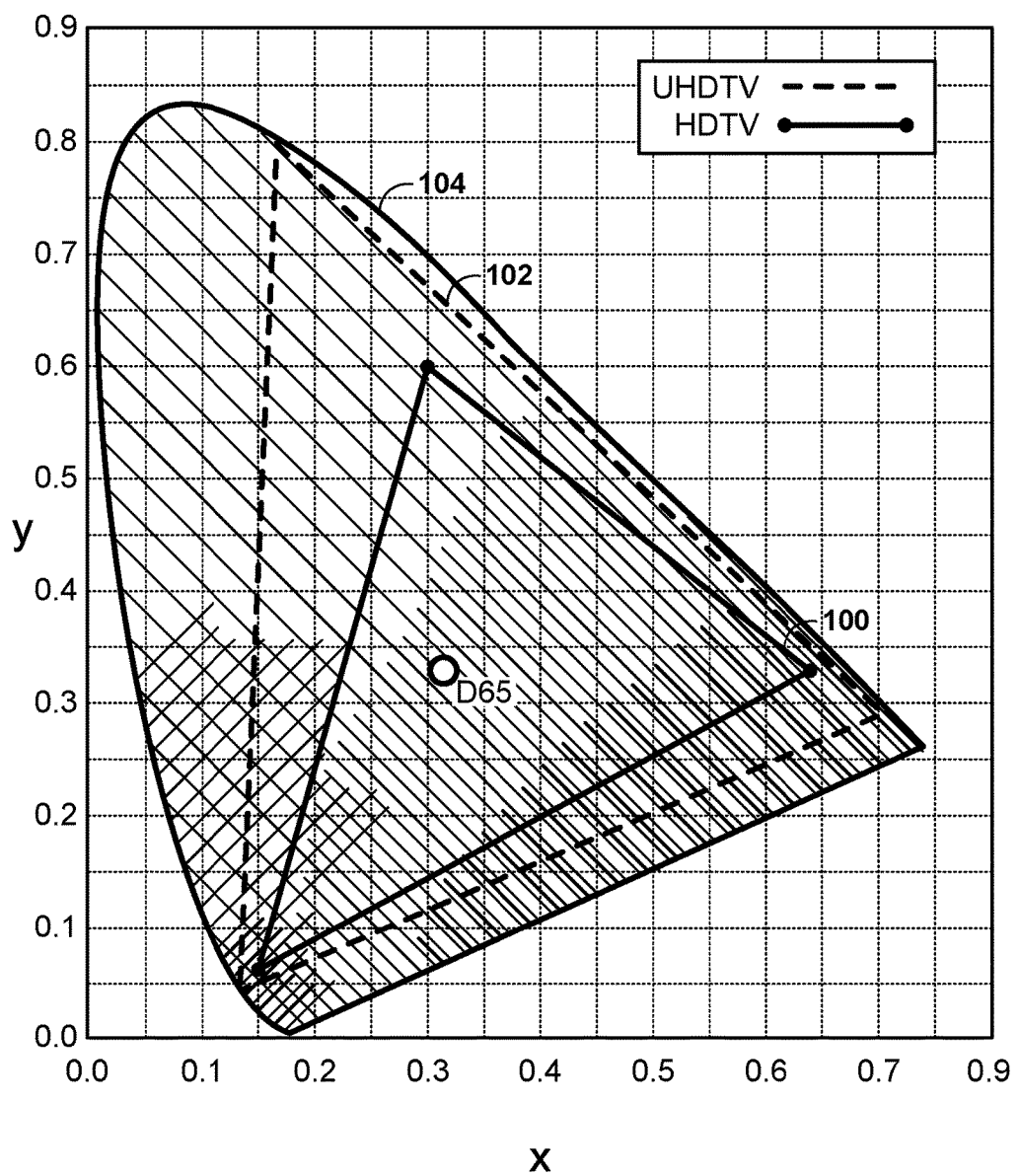
FIG. 3 is a conceptual diagram illustrating example color gamuts.

Another aspect for a more realistic video experience, besides HDR, is the color dimension. Color dimension is typically defined by the color gamut. FIG. 3 is a conceptual diagram showing an SDR color gamut (triangle 100 based on the BT.709 color primaries), and the wider color gamut that for UHDTV (triangle 102 based on the BT.2020 color primaries). FIG. 3 also depicts the so-called spectrum locus (delimited by the tongue-shaped area 104), representing the limits of the natural colors. As illustrated by FIG. 3, moving from BT.709 (triangle 100) to BT.2020 (triangle 102) color primaries aims to provide UHDTV services with about 70% more colors. D65 specifies an example white color for the BT.709 and/or BT.2020 specifications.

Examples of color gamut specifications for the DCI-P3, BT.709, and BT.2020 color spaces are shown in Table 1.

TABLE 1

| Color space | Color gamut parameters RGB color space parameters | | | | | | | |
|---|---|---|---|---|---|---|---|---|
| | White point | | Primary colors | | | | | |
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the x and y values of the primary colors (e.g., red (R), green (G), and blue (B). The x and y values represent normalized values that are derived from the chromaticity (X and Z) and the brightness (Y) of the colors, as is defined by the CIE 1931 color space. The CIE 1931 color space defines the links between pure colors (e.g., in terms of wavelengths) and how the human eye perceives such colors.

HDR/WCG video data is typically acquired and stored at a very high precision per component (even floating point), with the 4:4:4 chroma format and a very wide color space (e.g., CIE XYZ). This representation targets high precision and is almost mathematically lossless. However, such a format for storing HDR/WCG video data may include a lot of redundancies and may not be optimal for compression purposes. A lower precision format with HVS-based assumptions is typically utilized for state-of-the-art video applications.

Figure 4:
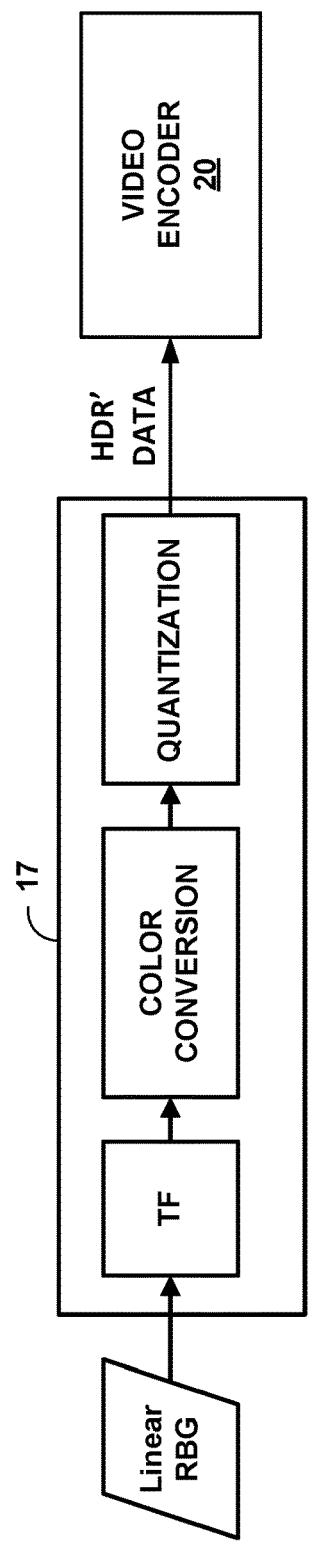
FIG. 4 is a conceptual diagram illustrating an example of HDR/WCG representation conversion.

Typical video data format conversion for purposes of compression consists of three major elements, as shown in FIG. 4. The techniques of FIG. 4 may be performed, for example, by a video preprocessor 17. The three elements include a non-linear transfer function (TF) for dynamic range compacting such that errors due to quantization are perceptually uniform (approximately) across the range of luminance values, color conversion to a more compact or robust color space, and floating-to-integer representation conversion (quantization). Hence, linear RGB data is compacted using a non-linear transfer function (TF) for dynamic range compacting. For instance, video preprocessor 17 may include a transfer function unit (TF) unit configured to use a non-linear transfer function for dynamic range compacting such that errors due to quantization are perceptually uniform (approximately) across the range of luminance values. The compacted data is than run through a color conversion process into a more compact or robust color space (e.g., via a color conversion unit). Data is then quantized using a floating-to-integer representation conversion (e.g., via a quantization unit) to produce the video data (e.g., HDR' data), which may be transmitted to video encoder 20.

Figure 5:
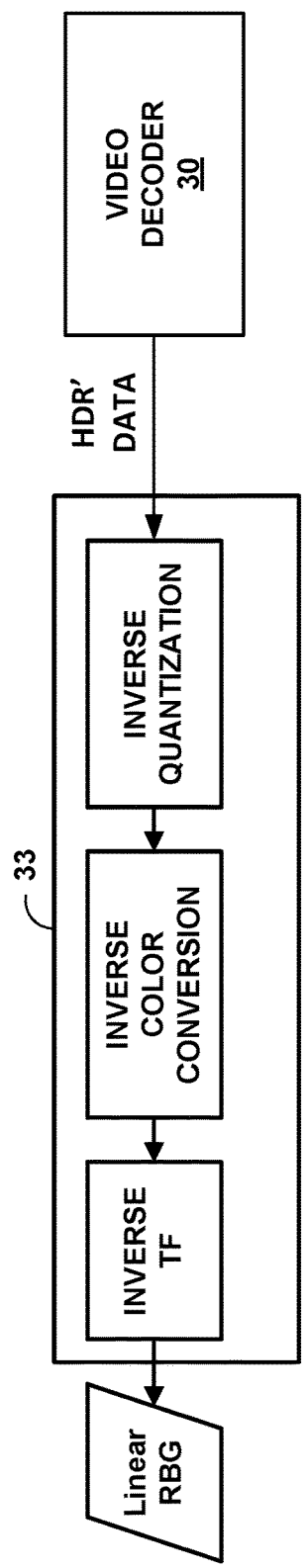
FIG. 5 is a conceptual diagram illustrating an example of HDR/WCG representation inverse conversion.

The inverse conversion at the decoder side is depicted in FIG. 5. The techniques of FIG. 5 may be performed by video postprocessor 33. For example, video postprocessor 33 may receive video data from video decoder 30, inverse quantize the data (e.g., via inverse quantization unit), perform inverse color conversion (e.g., via inverse color conversion unit), and perform inverse non-linear transfer function (e.g., via inverse TF unit). The order of these elements, e.g., in FIG. 4 and FIG. 5, is given as an example, and may vary in real-world applications. (e.g., in FIG. 4, color conversion may precede the TF module (e.g., TF unit), as well as additional processing, e.g., spatial subsampling, may be applied to color components.

Figure 6:
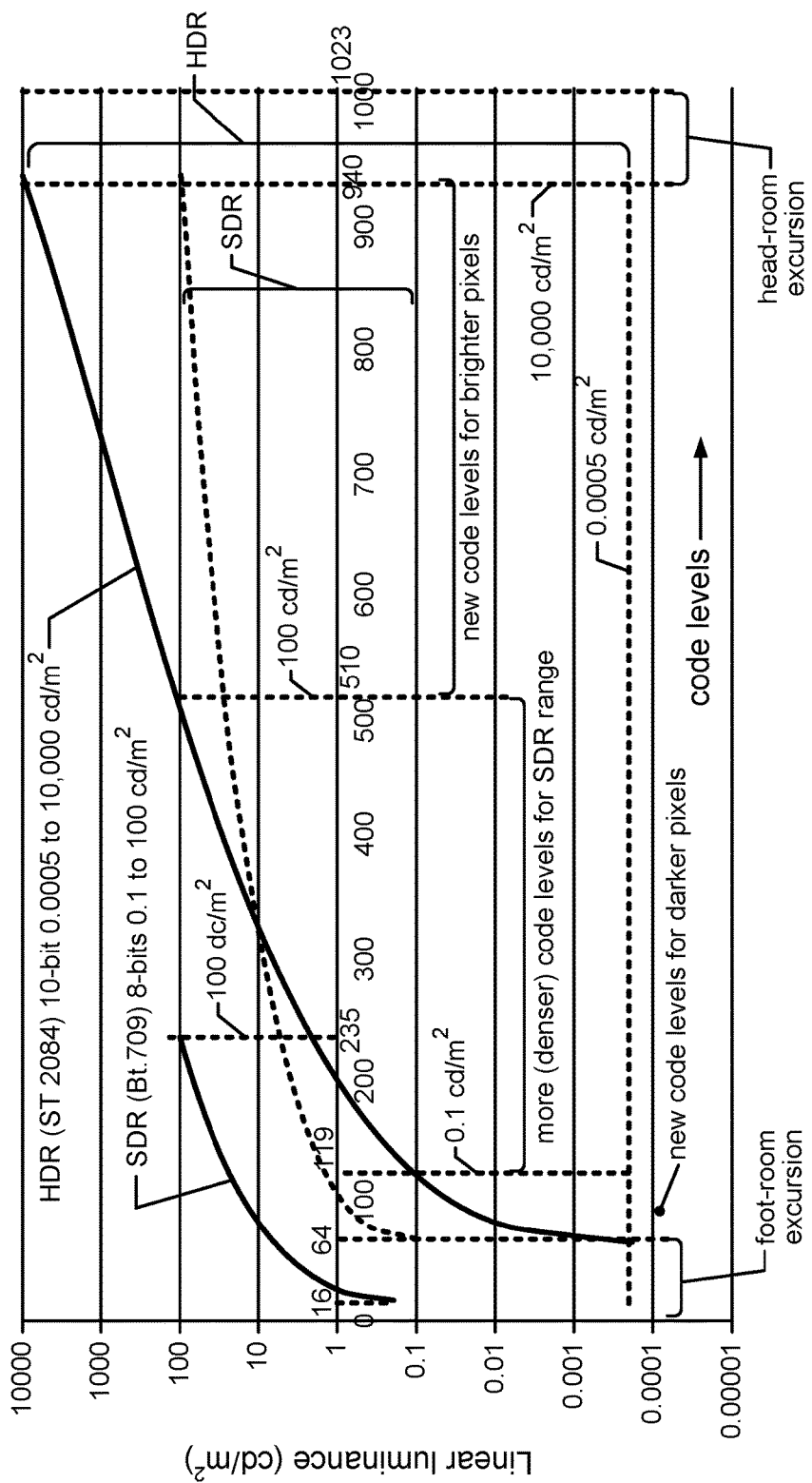
FIG. 6 is conceptual diagram illustrating example of Electro-optical transfer functions (EOTF) utilized for video data conversion (including SDR and HDR) from perceptually uniform code levels to linear luminance.

The techniques depicted in FIG. 4 will now be discussed in more detail. In general, a transfer function is applied to data (e.g., HDR/WCG video data) to compact the dynamic range of the data such that errors due to quantization are perceptually uniform (approximately) across the range of luminance values. Such compaction allows the data to be represented with fewer bits. In one example, the transfer function may be a one-dimensional (1D) non-linear function and may reflect the inverse of an electro-optical transfer function (EOTF) of the end-user display, e.g., as specified for SDR in Rec. 709. In another example, the transfer function may approximate the HVS perception to brightness changes, e.g., the PQ transfer function specified in SMPTE-2084 for HDR. The inverse process of the OETF is the EOTF (electro-optical transfer function), which maps the code levels back to luminance. FIG. 6 shows several examples of non-linear transfer function used as EOTFs. The transfer functions may also be applied to each R, G and B component separately.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level" or "digital code value" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

RGB data is typically utilized as the input color space, since RGB is the type of data that is typically produced by image-capturing sensors. However, the RGB color space has high redundancy among its components and is not optimal for compact representation. To achieve more compact and a more robust representation, RGB components are typically converted (e.g., a color transform is performed) to a more uncorrelated color space that is more suitable for compression, e.g., YCbCr. A YCbCr color space separates the brightness in the form of luminance (Y) and color information (CrCb) in different less correlated components. In this context, a robust representation may refer to a color space featuring higher levels of error resilience when compressed at a constrained bitrate.

Following the color transform, input data in a target color space may be still represented at high bit-depth (e.g. floating point accuracy). The high bit-depth data may be converted to a target bit-depth, for example, using a quantization process. Certain studies show that 10-12 bits accuracy in combination with the PQ transfer is sufficient to provide HDR data of 16 f-stops with distortion below the Just-Noticeable Difference (JND). In general, a JND is the amount that something (e.g., video data) must be change in order for a difference to be noticeable (e.g., by the HVS). Data represented with 10-bit accuracy can be further coded with most of the state-of-the-art video coding solutions. This quantization is an element of lossy coding and is a source of inaccuracy introduced to converted data.

It is anticipated that next generation HDR/WCG video applications will operate with video data captured at different parameters of HDR and CG. Examples of different configurations can be the capture of HDR video content with peak brightness up-to 1000 nits, or up-to 10,000 nits. Examples of different color gamut may include BT.709, BT.2020 as well SMPTE specified-P3, or others.

It is also anticipated that a single color space, e.g., a target color representation, that incorporates (or nearly incorporates) all other currently used color gamut to be utilized in future. One example of such a target color representation is BT.2020. Support of a single target color representation would significantly simplify standardization, implementation and deployment of HDR/WCG systems, since a reduced number of operational points (e.g., number of color containers, color spaces, color conversion algorithms, etc.) and/or a reduced number of required algorithms should be supported by a decoder (e.g., video decoder 30).

In one example of such a system, content captured with a native color gamut (e.g. P3 or BT.709) different from the target color representation (e.g. BT.2020) may be converted to the target container prior to processing (e.g., prior to video encoding). Below are several examples of such conversion:

RGB conversion from BT.709 to BT.2020 color representation:

$$R_{2020} = 0.627404078626 * R_{709} + 0.329282097415 * G_{709} + 0.043313797587 * B_{709}$$

$$G_{2020} = 0.069097233123 * R_{709} + 0.919541035593 * G_{709} + 0.011361189924 * B_{709}$$

$$B_{2020} = 0.016391587664 * R_{709} + 0.088013255546 * G_{709} + 0.895595009604 * B_{709} \quad \text{(eq. 1)}$$

RGB conversion from P3 to BT.2020 color representation:

$$R_{2020} = 0.753832826496 * R_{P3} + 0.198597635641 * G_{P3} + 0.047569409186 * B_{P3}$$

$$G_{2020} = 0.045744636411 * R_{P3} + 0.941777687331 * G_{P3} + 0.012478735611 * B_{P3}$$

$$B_{2020} = -0.001210377285 * R_{P3} + 0.017601107390 * G_{P3} + 0.983608137835 * B_{P3} \quad \text{(eq. 2)}$$

During this conversion, the value range occupied by each component (R,G,B) of a signal captured in P3 or BT.709 color gamut may be reduced in a BT.2020 representation. Since the data is represented in floating point accuracy, there is no loss; however, when combined with color conversion (e.g., a conversion from RGB to YCrCB shown in equation 3 below) and quantization (example in equation 4 below), the shrinking of the value range leads to increased quantization error for input data.

$$Y' = 0.2627 * R' + 0.6780 * G' + 0.0593 * B'; \quad \text{(eq. 3)}$$

$$Cb = \frac{B' - Y'}{1.8814}; Cr = \frac{R' - Y'}{1.4746}$$

$$D_{Y'} = (\text{Round}((1 \ll (BitDepth_Y - 8)) * (219 * Y' + 16))) \quad \text{(eq. 4)}$$

$$D_{Cb} = (\text{Round}((1 \ll (BitDepth_{Cr} - 8)) * (224 * Cb + 128)))$$

$$D_{Cr} = (\text{Round}((1 \ll (BitDepth_{Cb} - 8)) * (224 * Cr + 128)))$$

In equation (4) $D_{Y'}$ is the quantized Y' component, $D_{Cb}$ is the quantized Cb and $D_{Cr}$ is the quantized Cr component. The term $\ll$ represents a bit-wise right shift. $BitDepth_Y$, $BitDepth_{Cr}$, and $BitDepth_{Cb}$ are the desired bit depths of the quantized components, respectively.

In addition, in a real-world coding system, coding a signal with reduced dynamic range may lead to significant loss of accuracy for coded chroma components and would be observed by a viewer as coding artifacts, e.g., color mismatch and/or color bleeding.

Figure 7:
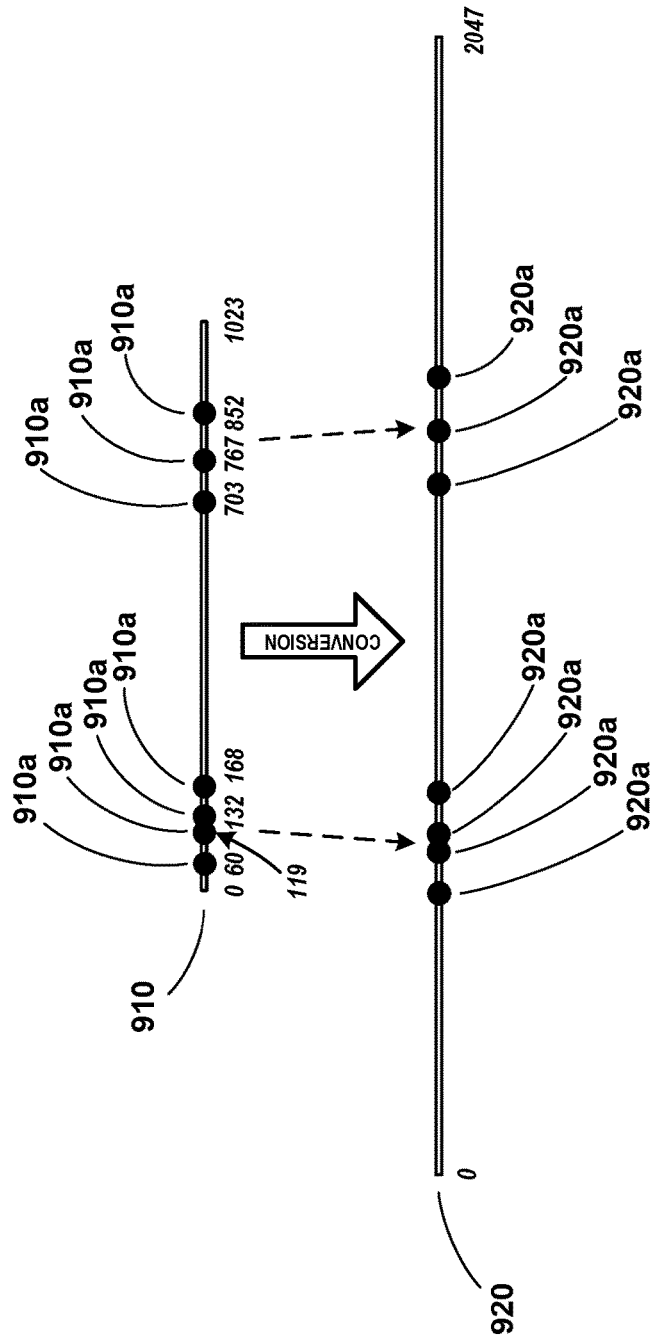
FIG. 7 is a conceptual diagram illustrating aspects of a color gamut conversion process as applied to a single color component.

FIG. 7 is a simplified conceptual illustration of how video preprocessor 17 may generate unique bit sequences that represent a range of values for a color component in a color representation, which may not be occupying the full value range of the components in the color representation, might be translated into a range of values for a target color. One-dimensional ranges of component values are shown, including a one-dimensional native range of codewords 910, and a one-dimensional a target range of codewords 920. For simplicity, and for purposes of illustration, the native range of codewords (corresponding to range of codewords 910) in the example of FIG. 7 is assumed to have 1024 codewords (ranging, for example, from 0 to 1023), and the target range of codewords (corresponding to range of codewords 920) is assumed to have a larger number of codewords, such as 2048 (ranging, for example, from 0 to 2047).

Illustrated in FIG. 7 are a number of represented values 910a in the native range of codewords 910, where each may correspond to a component value represented in a sample of video data in the native range of codewords 910. For simplicity in the illustration of FIG. 7, only a few represented values 910a are shown along the range of codewords 910, but many more values 910a in the range may be present in a typical sample of video data. Similarly, only the corresponding component values 920a after conversion to the target range of codewords are shown in the range of codewords 920; in a different example, many more values 920a may be represented in the range of codewords 920.

In some examples, a video preprocessor may convert the unadjusted component values 910a in the native range of codewords 910 to the adjusted values 920a of target range of codewords 920. For purposes of illustration, such a process might be illustrated in the manner shown in the simplified example of FIG. 7. For example, if luma values in a native range of codewords are represented by the one-dimensional representation 910 of values corresponding to the native range of codewords in FIG. 7, luma values could have 1024 possible values (from 0 to 1023) in the native range of codewords, with the actual sample of video data including luma values 910a. Similarly, if those same luma values after conversion to a target range of codewords are represented by the one-dimensional representation of codewords 920 of values corresponding to the target range of codewords, luma values could have 2048 possible values (0 to 2047) in the target range of codewords, with the sample of video data including luma values 920a after conversion. Accordingly, the represented values 910a in the range of codewords 910 may be translated, through the conversion process, to the represented values 920a in the range of codewords 920 as shown in FIG. 7. In each case, the values 910a in the range of codewords 910 and values 920a in the range of codewords 920 would each be represented by a binary codeword corresponding to one such value in the range.

In general, in the simplified example of FIG. 7, after color gamut conversion (and dynamic range compaction by a transfer function), the converted component values may not use all of the available codewords in the target color representation. In the example of FIG. 7, the target range of codewords has twice as many luma codewords as the native range of codewords. A conversion and quantization process performed on the component values in the range of codewords 910 may in some cases result in significantly less than all of the 2048 codewords in the range of codewords 920 being used by the luma values after conversion, depending on the distribution of component values in the range of codewords 910. In other words, a conversion process such as that illustrated in FIG. 7 may inefficiently distribute the color values relative to the number of target codewords otherwise available in the range of codewords 920, and as a result, might not make efficient use of all possible codewords. Accordingly, the conversion and quantization process may result in a significant loss of accuracy. This loss of accuracy may have undesirable effects on the resulting video, including coding artifacts, color mismatch, and/or color bleeding.

To address the problems described above, other techniques may be considered. One example technique includes a color gamut aware video codec. In such a technique, a hypothetical video encoder is configured to estimate the native color gamut of the input signal and adjust coding parameters (e.g., quantization parameters for coded chroma components) to reduce any distortion resulting from the reduced dynamic range. However, such a technique would not be able to recover loss of accuracy, which may happen due to the quantization conducted in equation (4) above, since all input data is provided to a typical codec in integer point accuracy.

This disclosure describes techniques, methods, and apparatuses to perform a dynamic range adjustment (DRA) to compensate dynamic range changes introduced to HDR signal representations. The dynamic range adjustment may help to prevent and/or lessen any distortion caused, including color mismatch, color bleeding, etc. In one or more examples of the disclosure, DRA is conducted on the values of each color component of the target color space, e.g., YCbCr, prior to quantization at the encoder side (e.g., by source device 12) and after the inverse quantization at the decoder side (e.g., by destination device 14). In view of the foregoing, this disclosure proposes signaling, through one or more SEI messages, parameters relating to performing such a dynamic range adjustment, such parameters including information relating to scale and offsets, partitions, global offsets, and local scale and offsets.

Figure 8:
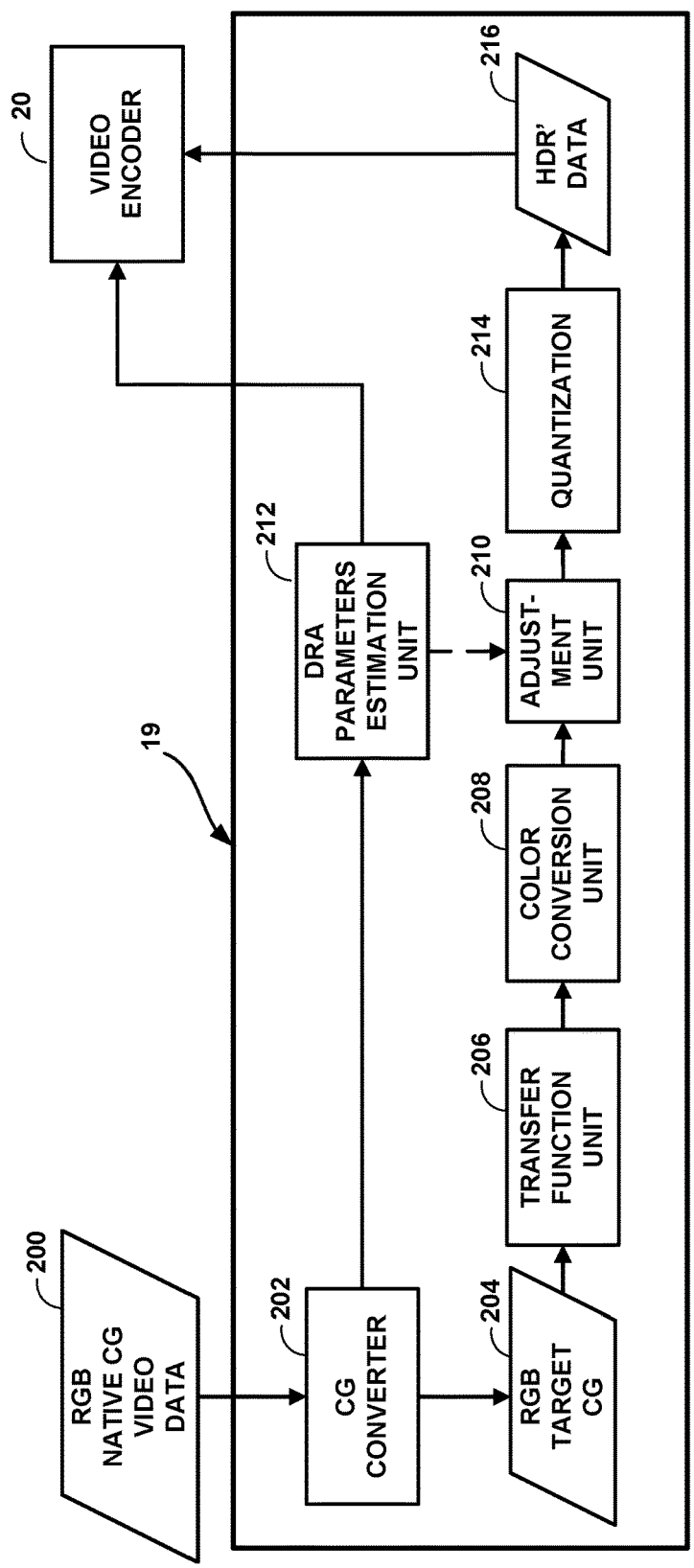
FIG. 8 is a block diagram illustrating an example HDR/WCG conversion apparatus operating according to the techniques of this disclosure.

FIG. 8 is a block diagram illustrating an example HDR/WCG conversion apparatus operating according to the techniques of this disclosure. In FIG. 8, solid lines specify the data flow and dashed lines specify control signals. One or more techniques described in this disclosure may be performed by video preprocessor 19 of source device 12. As discussed above, video preprocessor 19 may be a separate device from video encoder 20. In other examples, video preprocessor 19 may be incorporated into the same device as video encoder 20.

As shown in FIG. 8, RGB native CG video data 200 is input to video preprocessor 19. In the context of video preprocessing by video preprocessor 19, RGB native CG video data 200 is defined by an input color representation. The input color container specifies a set of color primaries used to represent video data 200 (e.g., BT. 709, BT. 2020, P3, etc.). In one example of the disclosure, video preprocessor 19 may be configured to convert both the color container and the color space of RGB native CG video data 200 to a target color container and target color space for HDR' data 216. Like the input color container, the target color container may specify a set or color primaries used to represent the HDR' data 216. In one example of the disclosure, RGB native CG video data 200 may be HDR/WCG video, and may have a BT.2020 or P3 color container (or any WCG), and be in an RGB color space. In another example, RGB native CG video data 200 may be SDR video, and may have a BT.709 color container. In one example, the target color container for HDR' data 216 may have been configured for HDR/WCG video (e.g., BT.2020 color container) and may use a color space more optimal for video encoding (e.g., YCrCb).

In one example of the disclosure, CG converter 202 may be configured to convert the color container of RGB native CG video data 200 from the input color container (e.g., first color container) to the target color container (e.g., second color container). As one example, CG converter 202 may convert RGB native CG video data 200 from a BT.709 color representation to a BT.2020 color representation, example of which is shown below.

The process to convert RGB BT.709 samples ($R_{709}$, $G_{709}$, $B_{709}$) to RGB BT.2020 samples ($R_{2020}$, $G_{2020}$, $B_{2020}$) can be implemented with a two-step conversion that involves converting first to the XYZ representation, followed by a conversion from XYZ to RGB BT.2020 using the appropriate conversion matrices.

$$X = 0.412391*R_{709} + 0.357584*G_{709} + 0.180481*B_{709}$$

$$Y = 0.212639*R_{709} + 0.715169*G_{709} + 0.072192*B_{709}$$

$$Z = 0.019331*R_{709} + 0.119195*G_{709} + 0.950532*B_{709} \quad \text{(eq. 5)}$$

Conversion from XYZ to $R_{2020}G_{2020}B_{2020}$ (BT.2020)

$$R_{2020} = \text{clipRGB}(1.716651*X - 0.355671*Y - 0.253366*Z)$$

$$G_{2020} = \text{clipRGB}(-0.666684*X + 1.616481*Y + 0.015768*Z)$$

$$B_{2020} = \text{clipRGB}(0.017640*X - 0.042771*Y + 0.942103*Z) \quad \text{(eq. 6)}$$

Similarly, the single step and recommended method is as follows:

$$R_{2020} = \text{clipRGB}(0.627404078626*R_{709} + 0.329282097415*G_{709} + 0.043313797587*B_{709})$$

$$G_{2020} = \text{clipRGB}(0.069097233123*R709 + 0.919541035593*G709 + 0.011361189924*B709)$$

$$B_{2020} = \text{clipRGB}(0.016391587664*R_{709} + 0.088013255546*G_{709} + 0.895595009604*B_{709}) \quad \text{(eq. 7)}$$

The resulting video data after CG conversion is shown as RGB target CG video data 204 in FIG. 8. In other examples of the disclosure, the color container for the input data and the output HDR' data may be the same. In such an example, CG converter 202 need not perform any conversion on RGB native CG video data 200.

Next, transfer function unit 206 compacts the dynamic range of RGB target CG video data 204. Transfer function unit 206 may be configured to apply a transfer function to compact the dynamic range in the same manner as discussed above with reference to FIG. 4. The color conversion unit 208 converts RGB target CG color data 204 from the color space of the input color container (e.g., RGB) to the color space of the target color container (e.g., YCrCb). As explained above with reference to FIG. 4, color conversion unit 208 converts the compacted data into a more compact or robust color space (e.g., a YUV or YCrCb color space) that is more suitable for compression by a hybrid video encoder (e.g., video encoder 20).

Adjustment unit 210 is configured to perform a dynamic range adjustment (DRA) of the color converted video data in accordance with DRA parameters derived by DRA parameters estimation unit 212. In general, after CG conversion by CG converter 202 and dynamic range compaction by transfer function unit 206, the actual color values of the resulting video data may not use all available codewords (e.g., unique bit sequences that represent each color) allocated of a particular target color representation. That is, in some circumstances, the conversion of RGB native CG video data 200 from an input color representation to an output color representation may overly compact the color values (e.g., Cr and Cb) of the video data such that the resultant compacted video data does not make efficient use of all possible color values. As explained above, coding a signal with a reduced range of values for the colors may lead to a significant loss of accuracy for coded chroma components and would be observed by a viewer as coding artifacts, e.g., color mismatch and/or color bleeding.

Adjustment unit 210 may be configured to apply DRA parameters to the color components (e.g., YCrCb) of the video data, e.g., RGB target CG video data 204 after dynamic range compaction and color conversion to make full use of the codewords available for a particular target color representation. Adjustment unit 210 may apply the DRA parameter to the video data at a pixel level. In general, the DRA parameters define a function that expands the codewords used to represent the actual video data to as many of the codewords available for the target color representation as possible. As is further described below, the process for expanding the codewords used to represent the actual video may include partitioning the codeword range, and applying a scale and offset to each such partition.

In one example of the disclosure, the DRA parameters include a scale and offset value that are applied to the components of the video data. In general, the lower the value range of the color components of the video data, the larger a scaling factor may be used. The offset parameter may be used to center the values of the color components to the center of the available codewords for a target color representation. For example, if a target color representation includes 1024 codewords per color component, an offset value may be chosen such that the center codeword is moved to codeword 512 (e.g., the middle most codeword). In other examples, the offset parameter may be used to provide better mapping of input codewords to output codewords such that overall representation in the target color representation is more efficient in combating coding artifacts.

In one example, adjustment unit 210 applies DRA parameters to video data in the target color space (e.g., YCrCb) as follows:

$Y''=\text{scale1}*Y'+\text{offset1}$ $Cb''=\text{scale2}*Cb'+\text{offset2}$ $Cr''=\text{scale3}*Cr'+\text{offset3}$ (eq. 8)

where signal components Y', Cb' and Cr' is a signal produced from RGB to YCbCr conversion (example in equation 3). Note that Y', Cr' and Cr' may also be a video signal decoded by video decoder 30. Y'', Cb'', and Cr'' are the color components of the video signal after the DRA parameters have been applied to each color component. As can be seen in the example above, each color component is related to different scale and offset parameters. For example, scale1 and offset1 are used for the Y' component, scale2 and offset2 are used for the Cb' component, and scale3 and offset3 are used for the Cr' component. It should be understood that this is just an example. In other examples, the same scale and offset values may be used for every color component.

As can be seen in the above example, adjustment unit 210 may apply dynamic range adjustment parameters, such the scale and offset DRA parameters, as a linear function. As such, it is not necessary for adjustment unit 210 to apply the DRA parameters in the target color space after color conversion by color conversion unit 208. This is because color conversion is itself a linear process. As such, in other examples, adjustment unit 210 may apply the DRA parameters to the video data in the native color space (e.g., RGB) before any color conversion process. In this example, color conversion unit 208 would apply color conversion after adjustment unit 210 applies the DRA parameters.

In other examples, and as further described below in connection with FIG. 9A through FIG. 9C, each color component may be associated with multiple scale and offset parameters, and the range of codewords may be divided into multiple partitions. For example, the actual distribution of chroma values for the Cr or Cb color components may differ for different portions of codewords, and may not be uniform over the range of codewords. In such a situation (or in other situations), it may be beneficial to divide the range of codewords into multiple partitions, and apply a scale and offset to each partition. One or more global offsets may be applied to some or all of the partitions.

In some examples, adjustment unit 210 may apply the DRA parameters in either the target color space or the native color space as follows:

$Y''=(\text{scale1}*(Y'-\text{offset}Y)+\text{offset1})+\text{offset}Y;$ $Cb''=\text{scale2}*Cb'+\text{offset2}$ $Cr''=\text{scale3}*Cr'+\text{offset3}$ (eq. 9)

In this example, the parameter scale1, scale2, scale3, offset1, offset2, and offset3 have the same meaning as described above. The parameter offsetY is a parameter reflecting brightness of the signal, and can be equal to the mean value of Y'. In other examples, an offset parameter similar to offset Y may be applied for the Cb' and Cr' components to better preserve the mapping of the center value in the input and the output representations.

In another example of the disclosure, adjustment unit 210 may be configured to apply the DRA parameters in a color space other than the native color space or the target color space. In general, adjustment unit 210 may be configured to apply the DRA parameters as follows:

$X'=\text{scale1}*(X-\text{offset1})+\text{offset2}+\text{offset3};$ $Y'=\text{scale2}*(Y-\text{offset4})+\text{offset5}+\text{offset6}$ $Z'=\text{scale3}*(Z-\text{offset7})+\text{offset8}+\text{offset9}$ (eq. 10)

where signal components X, Y and Z are signal components in a color space which is different from target color space, e.g., RGB or an intermediate color space. The values X, Y, and Z may simply be variables or references to signal components, and should not be confused with the XYZ color space.

Figure 9A:
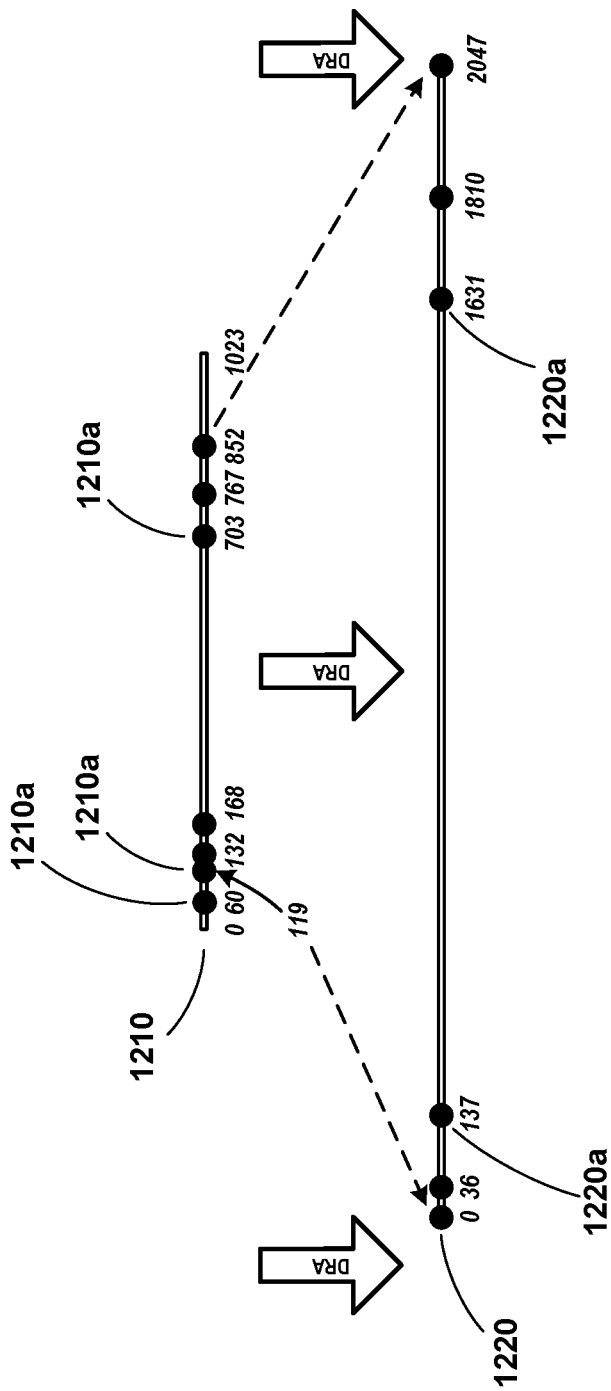
FIGS. 9A through 9C are conceptual diagrams illustrating aspects of a dynamic range adjustment process in accordance with one or more aspects of the present disclosure.

FIG. 9A is a simplified conceptual illustration of how unique bit sequences that represent a range of values for a color component in a native range of codewords might be converted by video preprocessor 19 of FIG. 8 into a range of values for a target range of codewords in accordance with one or more aspects of the present disclosure. One-dimensional ranges of component values are shown in FIG. 9A, including a one-dimensional native range of codewords 1210 corresponding to a native range of codewords, and a one-dimensional target range of codewords 1220 that corresponds to a target range of codewords. In a manner similar to that described in connection with FIG. 7, for simplicity and for purposes of illustration, the range of component values for the native range of codewords (corresponding to range 1210) in the example of FIG. 9A is assumed to have 1024 codewords, and the range of component values for the target range of codewords (corresponding to range of codewords 1220) is assumed to have 2048 codewords. For example, if the one-dimensional native range of codewords 1210 represents luma values, there could be 1024 possible luma values in the range of codewords 1210 corresponding to the native range of codewords. If the one-dimensional target range of codewords 1220 represents the luma values in the target range of codewords, there could be 2048 possible luma values in the range of codewords 1220 corresponding to the target range of codewords.

Illustrated in FIG. 9A are a number of represented values 1210a in the native range of codewords 1210, which each correspond to a component value represented in a sample of video data in the native range of codewords 1210. For simplicity in the illustration of FIG. 9A, only a few represented values 1210a are shown in the range of codewords 1210, but many more component values 1210a in the range of codewords 1210 may be present in a typical sample of video data.

In some cases, the values 1210a for a sample of video data might not be uniformly spread over the range of codewords 1210, and may be concentrated in a relatively small number of regions within the range of codewords 1210. Although the illustration in FIG. 9A is a simplified example, such a non-uniform representation is nevertheless apparent in FIG. 9A, because range of codewords 1210 shows a number of component values 1210a near the ends of the range of codewords 1210, but no values generally in the middle of the range (i.e., in the range codewords between 169 and 702).

In some examples, video preprocessor 19 may apply a global offset value to the range of codeword values 1210 in FIG. 9A when performing dynamic range adjustment to efficiently map unadjusted component values 1210a in the range of codeword values 1210 to adjusted component values 1220a in the range of component values 1220. For instance, in FIG. 9A, video preprocessor 19 may choose a first global offset value 119 in the unadjusted range of codewords 1210, which is one of the component values 1210a in the range of codewords 1210. Video preprocessor 19 may choose a second global offset value to be 0, which in the example of FIG. 9A is the adjusted value in the range of codewords 1220 that the first global offset (119) maps to when performing dynamic range adjustment.

In some examples, there may be unadjusted component values in the range of codewords 1210 that are less than the global offset value. In the range of codewords 1210 in FIG. 9A, there is one such component value 1210a (having a value of 60). In some examples, video preprocessor 19 may ignore this value, particularly where the unadjusted component value that is less than the first global offset will not have a significant effect on the decoded video data. In other examples, any component value 1210a less than the first global offset value (119) in range of codewords 1210 may be clipped to the first global offset value (119), or in other words, video preprocessor 19 may assume it to be equal to the first global offset value (119). In such an example, video preprocessor 19 may modify the unadjusted value 60 prior to performing dynamic range adjustment so that it has an unadjusted component value of 119 within range of codewords 1210, rather than an unadjusted component value of 60.

Video preprocessor 19 may choose an appropriate scale value to be used in conjunction with the global offset values. Accordingly, in the example of FIG. 9A, video preprocessor 19 may use such dynamic range parameters to translate unadjusted component values 1210a in range of codewords 1210 to values 1220a in range of codewords 1220. In some examples, such dynamic range adjustment parameters may be chosen so that when converting values 1210a to the range of codewords 1220, available codewords in the range of codewords 1220 are used in an efficient manner. For example, video preprocessor 19 may calculate a linear scale value based on assumptions that the dynamic range adjustment will translate the first global offset (unadjusted value 119) into the second global offset (adjusted value 0), and that the dynamic range adjustment will translate the last unadjusted value 1210a (having an unadjusted value of 852) in the range of code words 1210 is translated into an adjusted value of 2047 in the range of codewords 1210. Based on such assumptions in the simplified example of FIG. 9A, video preprocessor 19 may determine that the following formula can be used to translate unadjusted component values 1210a from range of codewords 1210 into adjusted component values 1220a in the range of codewords 1220:

$$A1220 = 2.793 * (U1210 - 119) + 0 \qquad \text{(eq. 11)}$$

In the equation above, $A_{1220}$ is an adjusted component value in the range of codewords 1220, and $U_{1210}$ is an unadjusted component value in the range of codewords 1210. In this formula the scale value is calculated to be 2.793, and the first global offset value is 119, and the second global offset value is 0.

The effect of the dynamic range adjustment performed by video preprocessor 19 and illustrated in FIG. 9A is that values in the range of codewords 1210 are translated into values in the range of codewords 1220 in a way such that the adjusted component values are spread within the range of codewords 1220 to effectively use more codewords in the range of codewords 1220. In some examples, video preprocessor 19 chooses scale and global offset values so that component values represented in the video data (values 1210a in the range of codewords 1210), are spread out among as many a codewords along the range of codewords 1220 as is beneficial. In further examples, even when the bit depth and/or the codewords corresponding to ranges 1210 and 1220 are the same, it may be possible for video preprocessor 19 to translate values into values in the range of codewords 1220 so that the adjusted component values are spread within the range of codewords 1220 to effectively use more codewords in the range of codewords 1220. In some examples, one way in which this may be possible is to map unadjusted values at or below a global offset value to the first value in the range of codewords 1220 (e.g., map value 1210a to adjusted value 0).

Figure 9B:
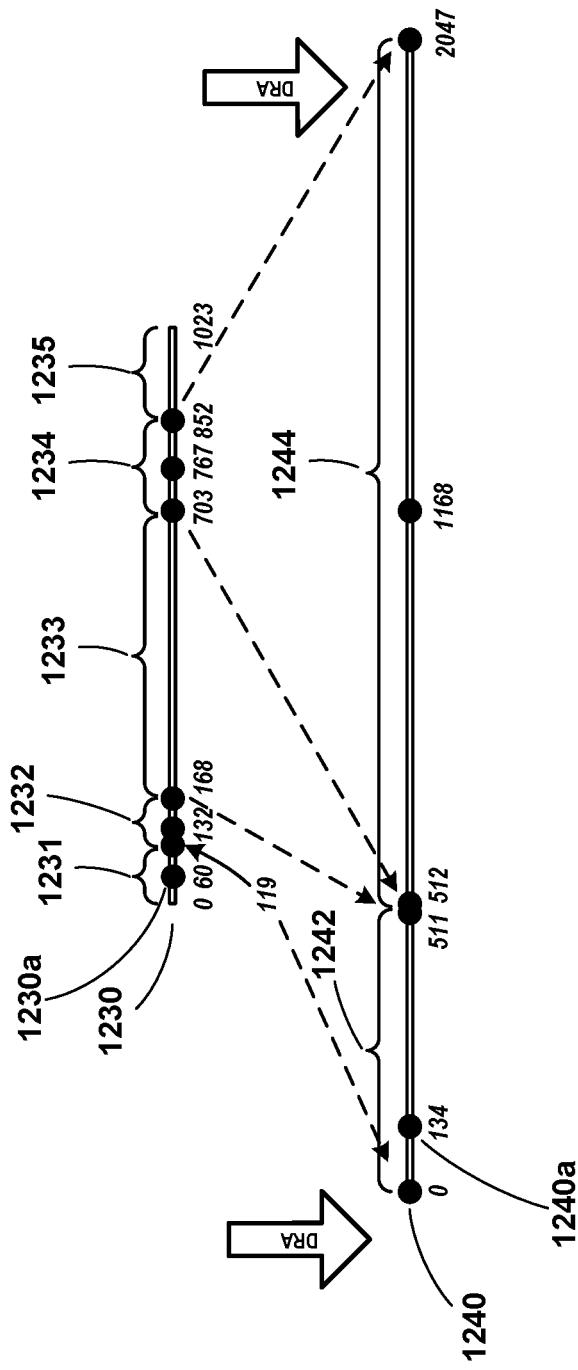

FIG. 9B is another simplified conceptual illustration of how video preprocessor 19 may translate unique bit sequences that represent a range of values for a color component in a native range of codewords into a range of values for a target range of codewords. As in FIG. 9A, one-dimensional ranges of component values are shown in FIG. 9B, including a one-dimensional native range of codewords 1230 corresponding to a native range of codewords, and a one-dimensional target range of codewords 1240 that corresponds to a target range of codewords. For simplicity, and for purposes of illustration, the range of component values for the native color representation (corresponding to the range of codewords 1230) in the example of FIG. 9B is assumed to have 1024 codewords, and the range of component values for the target range of codewords (corresponding to the range of codewords 1240) is assumed to have 2048 codewords. For example, in a manner similar to FIG. 9A, if the one-dimensional native range of codewords 1230 represents luma values, there could be 1024 possible luma values in the range of codewords 1230 corresponding to the native range of codewords. If the one-dimensional target range of codewords 1240 represents the luma values in the target range of codewords, there could be 2048 possible luma values in the range of codewords 1240 corresponding to the target range of codewords.

Illustrated in FIG. 9B are a number of represented values 1230a in the native range of codewords 1230, which each correspond to a component value represented in a sample of video data in the native range of codewords 1230. For simplicity in the illustration of FIG. 9B, only a few represented values 1230a are shown in the range of codewords 1230, but many more component values 1230a in the range of codewords 1230 may be present in a typical sample of video data.

As illustrated in FIG. 9B, and in some examples, video preprocessor 19 may determine that further efficiencies in performing dynamic range adjustment may be gained by dividing the range of codewords 1230 into multiple partitions. Video preprocessor 19 may determine scale and offset values for each partition, which video preprocessor 19 uses to map unadjusted component values 1230a in each partition to adjusted component values 1240a in the range of component values 1240. If video preprocessor 19 chooses the scale and offset parameters to efficiently use the codewords of the target range of codewords 1240, it may be possible to efficiently represent the video data in the target range of codewords 1240, and may also result in higher quality decoded video data.

For instance, in FIG. 9B, video preprocessor 19 divides the range of codewords 1230 into five partitions (1231, 1232, 1233, 1234, and 1235). Partition 1231 corresponds to codewords 0 to 118 (inclusive) in the range of codewords 1230, and includes only one represented component value (component value 60). Partition 1232 corresponds to codewords 119 to 168, and in the simplified example of FIG. 9B, the video sample represented by the range of codewords 1210 includes three component values 1230a in partition 1232 (component values 119, 132, and 168). Partition 1233 corresponds to codewords 169 to 702, and the video sample represented by range of codewords 1230 includes no component values in this range. Partition 1234 corresponds to codewords 703 to 852, and the video sample represented by range of codewords 1230 includes three component values 1230a in this partition (component values 703, 767, and 852). Finally, the fifth partition, partition 1235, ranges from codeword 853 to codeword 1023, and the video sample represented by range of codewords 1230 includes no component values in this range.

Video preprocessor 19 chooses partitions and appropriate scale and offset values so that performing dynamic range adjustment on the component values shown in the range of codewords 1230 will result in using the available codewords in the range of codewords 1240 in an efficient manner. In the example of FIG. 9B, video preprocessor 19 allocates to partitions that include values (e.g., partitions 1232 and 1234) a portion of the range of codewords 1240, whereas video preprocessor 19 allocates to partitions including no values (partitions 1231, 1233, 1225) no portion of the range of codewords 1240. Similarly, the size of the portion of range 1240 that video preprocessor 19 allocates to partitions depends on the size of the corresponding partition 1231, 1232, 1233, 1234, and 1235. For a larger or wider partitions on range 1230, a larger portion of range 1240 is allocated.

Further, in some cases, as previously described in connection with FIG. 9A, video preprocessor 19 may determine that it may be beneficial to omit or ignore certain values in the range of codewords 1230, such as, for example, values at the extreme ends of the range of codewords 1230. To the extent that such values may be few in number, and/or where such values do not affect the decoded video data in a significant way, some efficiencies may be gained by omitting such values. For instance, with respect to partition 1211 in the example of FIG. 9B, some efficiencies may be gained if the video preprocessor 19 ignores the single codeword having a component value of 60 represented by the video data in partition 1231, so in the example of FIG. 9B, video preprocessor 19 does not allocate that partition 1231 any portion of the range of codewords 1240.

Accordingly, in the example of FIG. 9B, video preprocessor 19 translates partition 1232, which spans 50 values or codewords (119 through 168) in the range of codewords 1230, into a partition 1242 spanning codewords 0 through 511 of range of codewords 1240. Video preprocessor 19 translates partition 1234, which spans 150 codewords in the range of codewords 1230, into a partition 1244 in the range of codewords 1240 spanning codewords 512 through 2047. As a result, the partition 1242 in the range of codewords 1240 spans 512 codewords along range of codewords 1240, and the partition 1244 in the range of codewords 1240 spans 1536 codewords along range of codewords 1240. The partition 1244 is therefore three times the size of partition 1242. In the example of FIG. 9B, video preprocessor 19 may have chosen the partition sizes in this way because the partitions 1232 and 1234 were similarly proportioned (i.e., partition 1234 is three times the size of partition 1232), thereby maintaining the relative size of the partitions 1232 and 1234 when dynamic range adjustment translates those partitions into adjusted component values within partitions 1242 and 1244 in the range of codewords 1240. In other examples, video preprocessor 19 might not maintain the proportions of partitions along range of codewords 1230 in this manner when dynamic range adjustment is applied to values in the range of codewords 1230 to translate those partitions to values in the range of codewords 1240. In other examples, video preprocessor 19 may maintain the proportions of partitions along range of codewords 1230 in a different way.

Still referring to the example of FIG. 9B, video preprocessor 19 may apply a scale and offset value (e.g., a local scale and local offset) in a manner local to each of the partitions in the range of codeword values 1230, to translate unadjusted component values 1230a in those partitions to adjusted component values 1240a in partitions 1242 and 1244 along range of codewords 1240. For example, for partition 1232, video preprocessor 19 may calculate linear scale and offset values based on assumptions that the first unadjusted value of 119 in partition 1232 maps to an adjusted value of 0 in partition 1242, and the last unadjusted value of 168 in partition 1232 maps to an adjusted value of 511 in partition 1242. Based on such assumptions in the simplified example of FIG. 9B, video preprocessor 19 may determine that the following formula can be used to translate unadjusted component values from partition 1232 into adjusted component values from partition 1242:

$$A_{1242} = 10.429 * U_{1232} + -1241.1 \qquad (eq. 12)$$

In the equation above, $A_{1242}$ is an adjusted component value in partition 1242 within the range of codewords 1240, and $U_{1232}$ is an unadjusted component value in partition 1232 within the range of codewords 1230. In this formula, the local scale value for the partition 1232 is 10.429, and the local offset value for the partition 1232 is −1241.1.

Similarly, video preprocessor 19 may calculate linear scale and offset values for converting unadjusted component values in partition 1234 into adjusted component values in partition 1244 based on assumptions that the first unadjusted value of 703 in partition 1234 corresponds to an adjusted value of 512 in partition 1244, and the last unadjusted value of 852 in partition 1234 corresponds to an adjusted value of 2047 in partition 1244. Based on such assumptions, video preprocessor 19 may determine that the following formula may be used to translate unadjusted component values from partition 1234 into adjusted component values in partition 1244:

$$A_{1244} = 10.302 * U_{1234} + -6730.3 \qquad (eq. 13)$$

In the equation above, $A_{1244}$ is an adjusted component value in partition 1244 within the range of codewords 1240, and $U_{1234}$ is an unadjusted component value in partition 1234 within the range of codewords 1230. In this formula, the local scale value for the partition 1234 is 10.302, and the local offset value for the partition 1234 is −6730.3.

In the example of FIG. 9B, video preprocessor 19 does not allocate to partitions 1231, 1233, and 1235 any of the range of codewords 1240, which may enable a more efficient use of range of codewords 1240, and may allow more of the range of codewords 1240 to be used for partitions where the video data includes more values (e.g., partitions 1232 and 1234). In such an example, partitions 1231, 1233, and 1235 may not have any corresponding partition in the range of codewords 1240. In some examples, video preprocessor 19 may ignore or drop any unadjusted component values that might be included in a video data sample corresponding to partitions 1231, 1233, and 1235. In other examples, video preprocessor 19 may map any unadjusted component values that might be included in partitions 1231, 1233, and 1235 to an appropriate value in one of the other partitions, or video preprocessor 19 may map such values to a value on or near a border between partitions allocated in the range of codewords 1240, or video preprocessor 19 may map such values to one of the two ends of the range of codewords 1240. Alternatively, video preprocessor 19 may allocate (or logically allocate) a small partition, or one having size of zero, and video preprocessor 19 may apply appropriate local scale and offset values for such a partition to map unadjusted component values for such partitions into adjusted component values in the range of codewords 1240.

The effect of the dynamic range adjustment illustrated in FIG. 9B is that video preprocessor 19 translates values in the range of codewords 1230 into values in the range of codewords 1240 in a way such that that the values in partitions 1232 and 1234 are spread within the range of codewords 1240 to effectively use more codewords in the range of codewords 1240. In some examples, video preprocessor 19 chooses the local scale and local offset values, for each partition, so that component values represented in the video data, as represented by values 1230a in the range of codewords 1230, are spread out among as many codewords along the range of codewords 1240 as possible. In some cases, such as where there are large number of values 1230a within certain ranges, such an adjustment may be beneficial. Video preprocessor 19 performing dynamic range adjustment in a manner similar to that described in connection with FIG. 9B in such a case may result in preventing or reducing any loss of accuracy for coded component values, and therefore, may prevent coding artifacts (e.g., color mismatch and/or color bleeding) from being observed by a viewer of the decoded video data.

In some examples, video preprocessor 19 may gain further efficiencies by choosing a global offset value that may be applied to the range of codewords 1230 and 1240 in FIG. 9B, in a manner similar to that described in connection with FIG. 9A. For instance, in FIG. 9B, video preprocessor 19 may choose a global offset value of 119, so that any values less than 119 in the range of codewords 1210 may be assumed to be the unadjusted value 119. In such an example, video preprocessor 19 would assume that the unadjusted component value 60 in partition 1231 has a value of 119, rather than 60, and would therefore be included in partition 1232. In some examples, video preprocessor 19 modifying a value before performing a dynamic range adjustment may be preferable to ignoring the value or not performing a dynamic range adjustment on the value.

In the example of FIG. 9B, video preprocessor 19 translates the global offset value for the unadjusted component value 119 into an adjusted component value of 0 along range of codewords 1240. The adjusted value 0 that corresponds to the global offset value for the unadjusted value 119 may itself be used as a second global offset value in a manner similar to that described in connection with FIG. 9A. This second global offset value may be considered the adjusted value corresponding to unadjusted value 119, or put another way, the first global offset value (unadjusted component value in the range of codewords 1230) may map to the second global offset value (adjusted component value in the range of codewords 1240).

The equations {12} and {13} described previously for performing a dynamic range adjustment for values in partitions 1212 and 1214, can be rewritten in terms of these above-described global offset values. Specifically, video preprocessor 19 may determine a different relationship may apply to partition 1232 when one or more global offset values are used. Accordingly, equation {12} can be rewritten as follows:

$$A_{1242} = 10.429 * (U_{1232} + -119) + 0 + 0 \qquad (eq. 14)$$

In the equation above, $A_{1242}$ is an adjusted component value in partition 1242 within the range of codewords 1240, and $U_{1232}$ is an unadjusted component value in partition 1232 within the range of codewords 1230. In this formula, the (first) global offset value for the unadjusted component values in the range of codewords 1230 is −119, and the (second) global offset value for the adjusted component values in the range of codewords 1240 is 0. The scale value for the partition 1232 is 10.429, and the offset value for the partition 1232 is 0.

Similarly, video preprocessor 19 may determine that a different relationship may apply to partition 1234 when one or more global offset values are used. Accordingly, equation {13} can be rewritten as follows:

$$A_{1244} = 10.302 * (U_{1234} + -119) + 0 + -5504.4 \quad \text{(eq. 15)}$$

In the equation above, $A_{1244}$ is an adjusted component value in partition 1244 within the range of codewords 1240, and $U_{1234}$ is an unadjusted component value in partition 1234 within the range of codewords 1230. In this formula, the (first) global offset value for the unadjusted component values in the range of codewords 1230 is −119, and the (second) global offset value for the adjusted component values in the range of codewords 1240 is 0. The scale value for the partition 1234 is 10.302, and the offset value for the partition −5504.4.

Figure 9C:
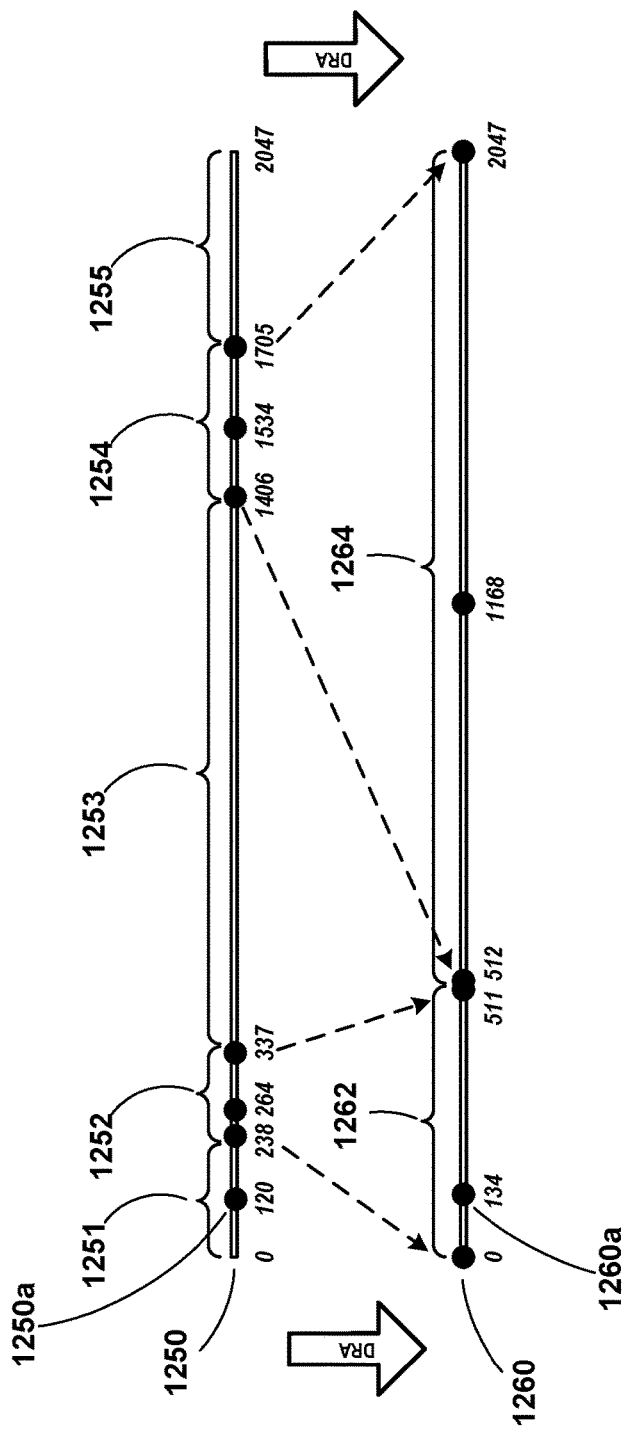

FIG. 9C is another simplified conceptual illustration of how video preprocessor 19 may translate unique bit sequences that represent a range of values for a color component in a native range of codewords into a range of values for a target range of codewords. As in FIG. 9A and FIG. 9B, one-dimensional ranges of component values are shown in FIG. 9C, including a one-dimensional native range of codewords 1250 corresponding to a native range of codewords, and a one-dimensional a target range of codewords 1260 that corresponds to a target range of codewords. In this example, the range of component values for the native range of codewords (corresponding to the range of codewords 1250) is assumed to correspond to 2048 codewords, and the range of component values for the target range of codewords (corresponding to the range of codewords 1260) is assumed to correspond to 2048 codewords. For example, if the one-dimensional native range of codewords 1250 represents luma values, there could be 2048 possible luma values in the range of codewords 1250 corresponding to the native range of codewords. If the one-dimensional target range of codewords 1260 represents the luma values in the target range of codewords, there could be 2048 possible luma values in the range of codewords 1260 corresponding to the target range of codewords.

The example of FIG. 9C illustrates that a dynamic range adjustment performed by video preprocessor 19 in accordance with one or more aspects of the present disclosure may be beneficial even when the native range of codewords (corresponding to the range of codewords 1250 in FIG. 9C) is the same size or substantially the same size as the target range of codewords (corresponding to the range of codewords 1260 in FIG. 9C). Illustrated in FIG. 9C are a number of represented values 1250a in the native range of codewords 1250. For simplicity, only a few represented values 1250a are shown.

As illustrated in FIG. 9C, video preprocessor 19 may divide the range of codewords 1250 into multiple partitions. Video preprocessor 19 may calculate and use scale and offset values for each partition to map unadjusted component values 1250a in each partition to adjusted component values 1260 a in the range of component values 1260. Video preprocessor 19 may choose dynamic range adjustment parameters to efficiently use the codewords of the target range of codewords 1260. For instance, in FIG. 9C, video preprocessor 19 may divide the range of codewords 1250 into five partitions (1251, 1252, 1253, 1254, and 1255). As with other examples, in the example of FIG. 9C, video preprocessor 19 allocates a portion of the range of codewords 1260 to those partitions that include values, whereas video preprocessor 19 might not allocate any portion of the range of codewords 1260 to those partitions that include no values. Similarly, video preprocessor 19 may allocate a larger portion of the range of codewords 1260 to those partitions in the range of codewords 1250 that are wider or span more values than another partition in 1250. Further, with respect to partition 1251 in the example of FIG. 9C, video preprocessor 19 does not allocate any portion of the range of codewords 1260 to partition 1251, even though that partition includes a component value of 120.

Accordingly, video preprocessor 19 in the example of FIG. 9C translates partition 1252, which spans 100 values or codewords (238 through 337) in the range of codewords 1250, into a partition 1262 spanning codewords 0 through 511 of the range of codewords 1260. Video preprocessor 19 translates partition 1254, which spans 300 codewords in the range of codewords 1250, into a partition 1264 in the range of codewords 1260 spanning codewords 512 through 2047.

Still referring to the example of FIG. 9C, video preprocessor 19 may calculate and apply a scale and offset value, in a manner local to each of the partitions in the range of codeword values 1250, to translate unadjusted component values in those partitions to adjusted component values in partitions 1262 and 1264 along range of codewords 1260. For example, for partition 1252, video preprocessor 19 may calculate linear scale and offset values based on assumptions that the first unadjusted value of 238 in partition 1252 maps to an adjusted value of 0 in partition 1262, and the last unadjusted value of 337 in partition 1252 maps to an adjusted value of 511 in partition 1262. Based on such assumptions in the simplified example of FIG. 9C, video preprocessor 19 may determine that following relationship may be used to translate unadjusted component values from partition 1212 into adjusted component values from partition 1222:

$$A_{1262} = 5.162 * (U_{1252} + -238) + 0 + 0 \quad \text{(eq. 16)}$$

In the equation above, $A_{1262}$ is an adjusted component value in partition 1262 within the range of codewords 1260, and $U_{1252}$ is an unadjusted component value in partition 1252 within the range of codewords 1250. In this formula, the (first) global offset value is −238, and the (second) global offset value is 0. The local scale value for the partition 1252 is 5.162, and the local offset value for the partition 1252 is 0.

Similarly, video preprocessor 19 may calculate linear scale and offset values for converting unadjusted component values in partition 1254 into adjusted component values in partition 1264 based on assumptions that the first unadjusted value of 1406 in partition 1254 corresponds to an adjusted value of 512 in partition 1264, and the last unadjusted value of 1705 in partition 1254 corresponds to an adjusted value of 2047 in partition 1264. Based on such assumptions, video preprocessor 19 may determine that the following relationship may be used to translate unadjusted component values from partition 1254 into adjusted component values in partition 1264:

$$A_{1264} = 5.134 * (U_{1254} + -238) + 0 + -5484.5 \quad \text{(eq. 17)}$$

In the equation above, $A_{1264}$ is an adjusted component value in partition 1264 within the range of codewords 1260, and $U_{1254}$ is an unadjusted component value in partition 1254 within the range of codewords 1250. In this formula, the (first) global offset value is −238, and the (second) global offset value is 0. The local scale value for the partition 1254 is 5.134, and the local offset value for the partition 1254 is −5484.5.

Again, the effect of the dynamic range adjustment illustrated in FIG. 9C is that video preprocessor 19 translates values in the range of codewords 1250 into values in the range of codewords 1260 in a way such that that the values in partitions 1252 and 1254 are spread within the range of codewords 1260 to effectively use more codewords of the range of codewords 1260. In some examples, video preprocessor 19 performing dynamic range adjustment in a manner similar to that described in connection with FIG. 9C may result in preventing or reducing any loss of accuracy for coded component values, and therefore, may prevent coding artifacts (e.g., color mismatch and/or color bleeding) from being observed by a viewer of the decoded video data.

As further described below, and in accordance with one or more aspects of the present disclosure, one or more new SEI messages may include parameters and/or information relating to performing the dynamic range adjustment described above. The dynamic range adjustment parameters or information may be generated by the video preprocessor 19, and encoded by the video decoder 30 as an SEI message. Such SEI messages may include information sufficient to enable video decoder 30 and/or video postprocessor 31 to perform the inverse of the dynamic range adjustment to reconstruct the video data.

In other examples of the disclosure, adjustment unit 210 may be configured to apply a linear transfer function to the video to perform DRA. Such a transfer function may be different from the transfer function used by transfer function unit 206 to compact the dynamic range. Similar to the scale and offset terms defined above, the transfer function applied by adjustment unit 210 may be used to expand and center the color values to the available codewords in a target color representation. An example of applying a transfer function to perform DRA is shown below:

$$Y''=TF2(Y)$$

$$Cb''=TF2(Cb')$$

$$Cr''=TF2(Cr')$$

Term TF2 specifies the transfer function applied by adjustment unit 210. In some embodiments the adjustment unit may apply different transfer functions to each of the components.

In another example of the disclosure, adjustment unit 210 may be configured to apply the DRA parameters jointly with the color conversion of color conversion unit 208 in a single process. That is, the linear functions of adjustment unit 210 and color conversion unit 208 may be combined. An example of a combined application, where f1 and f2 are a combination of the RGB to YCbCr matrix and the DRA scaling factors, is shown below:

$$Cb = \frac{B' - Y'}{f1}; Cr = \frac{R' - Y'}{f2}$$

In another example of the disclosure, after applying the DRA parameters, adjustment unit 210 may be configured to perform a clipping process to prevent the video data from having values outside the range of codewords specified for a certain target color representation. In some circumstances, the scale and offset parameters applied by adjustment unit 210 may cause some color component values to exceed the range of allowable codewords. In this case, adjustment unit 210 may be configured to clip the values of the components that exceed the range to the maximum value in the range.

The DRA parameters applied by adjustment unit 210 may be determined by DRA parameters estimation unit 212. The frequency and the time instances at which the DRA parameters estimation unit 212 updates the DRA parameters is flexible. For example, DRA parameters estimation unit 212 may update the DRA parameters on a temporal level. That is, new DRA parameters may be determined for a group of pictures (GOP), or a single picture (frame). In this example, the RGB native CG video data 200 may be a GOP or a single picture. In other examples, DRA parameters estimation unit 212 may update the DRA parameters on a spatial level, e.g., at the slice tile, or block level. In this context, a block of video data may be a macroblock, coding tree unit (CTU), coding unit, or any other size and shape of block. A block may be square, rectangular, or any other shape. Accordingly, the DRA parameters may be used for more efficient temporal and spatial prediction and coding.

In other examples of the disclosure, DRA parameters estimation unit 212 may be configured to derive values for DRA parameters so as to minimize certain cost functions associated with preprocessing and/or encoding video data. As one example, DRA parameters estimation unit 212 may be configured to estimate DRA parameters that minimized quantization errors introduced by quantization unit 214 (e.g., see equation (4)) above. DRA parameters estimation unit 212 may minimize such an error by performing quantization error tests on video data that has had different sets of DRA parameters applied. In another example, DRA parameters estimation unit 212 may be configured to estimate DRA parameters that minimize the quantization errors introduced by quantization unit 214 in a perceptual manner. DRA parameters estimation unit 212 may minimize such an error based on perceptual error tests on video data that has had different sets of DRA parameters applied. DRA parameters estimation unit 212 may then select the DRA parameters that produced the lowest quantization error.

In another example, DRA parameters estimation unit 212 may select DRA parameters that minimize a cost function associated with both the DRA performed by adjustment unit 210 and the video encoding performed by video encoder 20. For example, DRA parameters estimation unit 212 may perform DRA and encode the video data with multiple different sets of DRA parameters. DRA parameters estimation unit 212 may then calculate a cost function for each set of DRA parameters by forming a weighted sum of the bitrate resulting from DRA and video encoding, as well as the distortion introduced by these two lossy process. DRA parameters estimation unit 212 may then select the set of DRA parameters that minimizes the cost function.

In each of the above techniques for DRA parameter estimation, DRA parameters estimation unit 212 may determine the DRA parameters separately for each component using information regarding that component. In other examples, DRA parameters estimation unit 212 may determine the DRA parameters using cross-component information. For example, the DRA parameters derived for a Cr component may be used to derive DRA parameters for a Cb component.

In video coding schemes utilizing weighted prediction, a sample of currently coded picture Sc are predicted from a sample (for single directional prediction) of the reference picture Sr taken with a weight ($W_{wp}$) and an offset ($O_{wp}$) which results in predicted sample Sp:

$$Sp = Sr \cdot * W_{wp} + O_{wp}.$$

In some examples utilizing DRA, samples of the reference and currently coded picture can be processed with DRA employing different parameters, namely {scale1$_{cur}$, offset1$_{cur}$} for a current picture and {scale1$_{ref}$, offset1$_{ref}$} for a reference picture. In such embodiments, parameters of weighted prediction can be derived from DRA, e.g.:

$$W_{wp} = scale1_{cur}/scale1_{ref}$$

$$O_{wp} = offset1_{cur}/offset1_{ref}$$

After adjustment unit 210 applies the DRA parameters, video preprocessor 19 may then quantize the video data using quantization unit 214. Quantization unit 214 may operate in the same manner as described above with reference to FIG. 4. After quantization, the video data is now adjusted in the target color space and target primaries of the target color container of HDR' data 216. HDR' data 216 may then be sent to video encoder 20 for compression.

Figure 10:
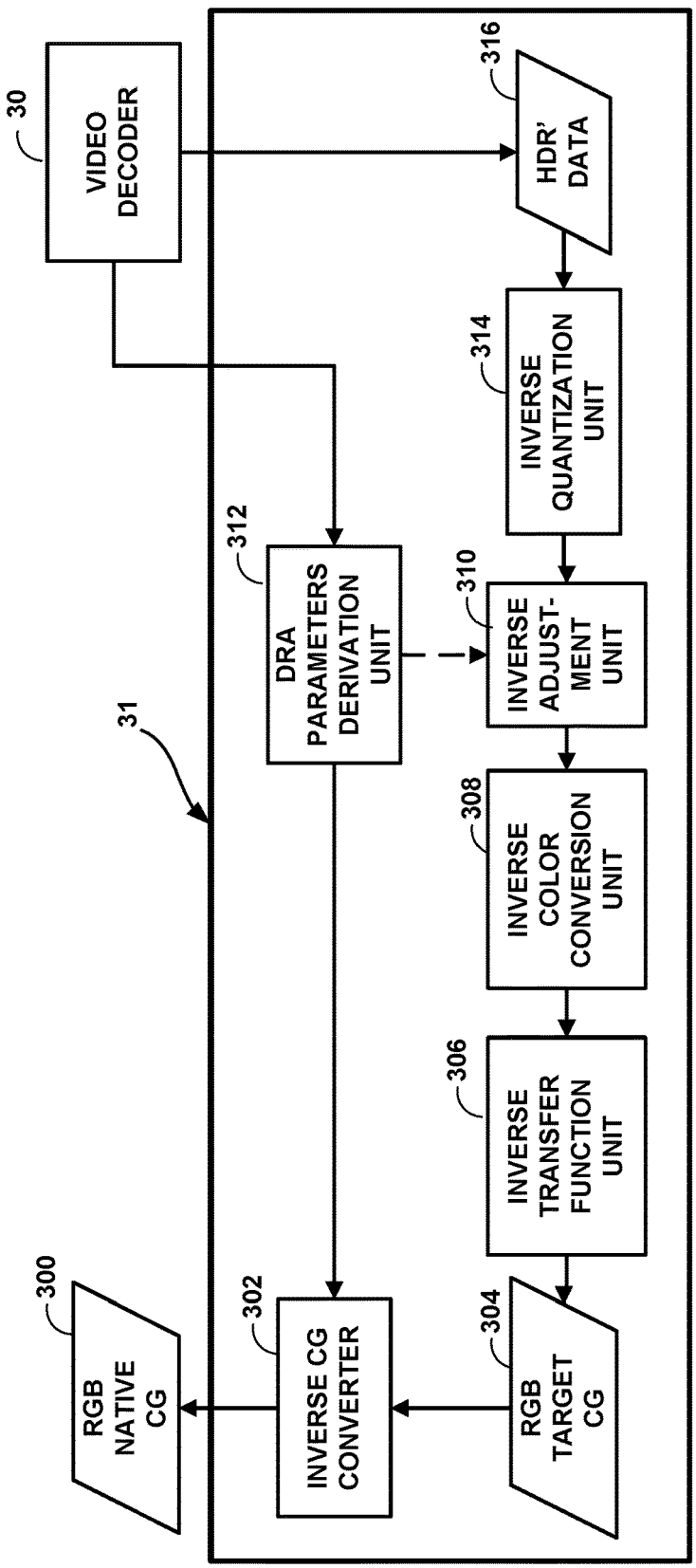
FIG. 10 is a block diagram illustrating an example HDR/WCG inverse conversion apparatus according to the techniques of this disclosure.

FIG. 10 is a block diagram illustrating an example HDR/WCG inverse conversion apparatus according to the techniques of this disclosure. As shown in FIG. 10, video postprocessor 31 may be configured to apply the inverse of the techniques performed by video preprocessor 19 of FIG. 8. In other examples, the techniques of video postprocessor 31 may be incorporated in, and performed by, video decoder 30.

In one example, video decoder 30 may be configured to decode the video data encoded by video encoder 20. The decoded video data (HDR' data 316 in the target color container) is then forwarded to video postprocessor 31. Inverse quantization unit 314 performs an inverse quantization process on HDR' data 316 to reverse the quantization process performed by quantization unit 214 of FIG. 8.

Video decoder 30 may also be configured to decode and send any of the one or more syntax elements produced by DRA parameters estimation unit 212 of FIG. 10 to DRA parameters derivation unit 312 of video postprocessor 31. DRA parameters derivation unit 312 may be configured to determine the DRA parameters based on one or more syntax elements or SEI messages, in accordance with one or more aspects of the present disclosure. In some examples, the one or more syntax elements or SEI messages may indicate the DRA parameters explicitly. In other examples, DRA parameters derivation unit 312 is configured to derive some (or all) of the DRA parameters using information from syntax elements or SEI messages, and/or using the same techniques used by DRA parameters estimation unit 212 of FIG. 10.

The parameters derived by DRA parameters derivation unit 312 may be sent to inverse adjustment unit 310. Inverse adjustment unit 310 uses the DRA parameters to perform the inverse of the linear DRA adjustment performed by adjustment unit 210. Inverse adjustment unit 310 may apply the inverse of any of the adjustment techniques described above for adjustment unit 210. In addition, as with adjustment unit 210, inverse adjustment unit 310 may apply the inverse DRA before or after any inverse color conversion. As such, inverse adjustment unit 310 may apply the DRA parameter on the video data in the target color representation or the native color representation. In some examples, the inverse adjustment unit may also be applied before the inverse quantization unit.

Inverse color conversion unit 308 converts the video data from the target color space (e.g., YCbCr) to the native color space (e.g., RGB). Inverse transfer function 306 then applies an inverse of the transfer function applied by transfer function 206 to uncompact the dynamic range of the video data. The resulting video data (RGB target CG 304) is still represented using the target primaries, but is now in the native dynamic range and native color space. Next, inverse CG converter 302 converts RGB target CG 304 to the native color gamut to reconstruct RGB native CG 300.

In some examples, additional postprocessing techniques may be employed by video postprocessor 31. Applying the DRA may put the video outside its actual native color gamut. The quantization steps performed by quantization unit 214 and inverse quantization unit 314, as well as the up and down-sampling techniques performed by adjustment unit 210 and inverse adjustment unit 310, may contribute to the resultant color values in the native color representation being outside the native color gamut. When the native color gamut is known (or the actual smallest content primaries, if signaled, as described above), then additional process can be applied to RGB native CG video data 304 to transform color values (e.g., RGB or Cb and Cr) back into the intended gamut as postprocessing for DRA. In other examples, such postprocessing may be applied after the quantization or after DRA application.

According to one or more aspects of the present disclosure, and as further described below, video decoder 30 may receive one or more SEI messages that indicate parameters and/or information that relate to the dynamic range adjustment performed by video preprocessor 19. Video decoder 30 may parse and/or decode the information, and act upon it and/or pass that information to video postprocessor 31. Such SEI messages may include information sufficient to enable video decoder 30 and/or video postprocessor 31 to perform the inverse of the dynamic range adjustment to reconstruct the video data.

In addition to deriving DRA parameters or DRA adjustment information, video preprocessor 19 (e.g., DRA parameters estimation unit 212) or video encoder 20 of FIG. 8 may be configured to signal the DRA parameters in an encoded bitstream or by other means such as a different channel. DRA parameters derivation unit 312 or video decoder 30 of FIG. 10 may be configured to receive such signaling in the encoded bitstream or from other means such as a different channel. DRA parameters estimation unit 212 may signal one or more syntax elements that indicate the DRA parameters directly, or may be configured to provide the one or more syntax elements to video encoder 20 for signaling. Such syntax elements of the parameters may be signaled in the bitstream such that video decoder 30 and/or video postprocessor 31 may perform the inverse of the process of video preprocessor 19 to reconstruct the video data in its native color representation.

One way in which video encoder 20 or video preprocessor 19 may signal the DRA adjustment parameters or DRA adjustment information is through an SEI message. Supplemental Enhancement Information (SEI) messages have been used for a number of purposes and may be included in video bitstreams, typically to carry information that are not essential in order to decode the bitstream by the decoder. This information may be useful in improving the display or processing of the decoded output; e.g., such information could be used by decoder-side entities to improve the viewability of the content. It is also possible that certain application standards could mandate the presence of such SEI messages in the bitstream so that the improvement in quality can be brought to all devices that conform to the application standard (the carriage of the frame-packing SEI message for frame-compatible plano-stereoscopic 3DTV video format, where the SEI message is carried for every frame of the video, e.g., as described in ETSI-TS 101 547-2, Digital Video Broadcasting (DVB) Plano-stereoscopic 3DTV; Part 2: Frame compatible plano-stereoscopic 3DTV, handling of recovery point SEI message, e.g., as described in 3GPP TS 26.114 v13.0.0, 3rd Generation Partnership Project; Technical Specification Group Services and System Aspects; IP Multimedia Subsystem (IMS); Multimedia Telephony; Media handling and interaction (Release 13), or use of pan-scan scan rectangle SEI message in DVB, e.g., as described in ETSI-TS 101 154, Digital Video Broadcasting (DVB); Specification for the use of Video and Audio Coding in Broadcasting Applications based on the MPEG-2 Transport Stream.

A number of SEI messages that have been used may be deficient in one or more ways for signaling dynamic range adjustment parameters in accordance with one or more aspects of the present disclosure.

For example, one SEI message is a tone-mapping information SEI message, which is used to map luma samples, or each of RGB component samples. Different values of tone_map_id are used to define different purposes, and the syntax of the tone-map SEI message is also modified accordingly. For example, a value of 1 for the tone_map_id allows a processor acting on the SEI message to clip the RGB samples to a minimum and a maximum value. A value of 3 for the tone_map_id allows or indicates that a look-up table will be signaled in the form of pivot points. However, when applied, the same values are applied to all RGB components, or only applied to the luma component.

Another example is the knee function SEI message, which is used to indicate the mapping of the RGB components of the decoded pictures in the normalized linear domain. The input and output maximum luminance values are also indicated, and a look-up table maps the input luminance values to the output luminance values. The same look-up table may be applied to all the three color components.

Figure 11:
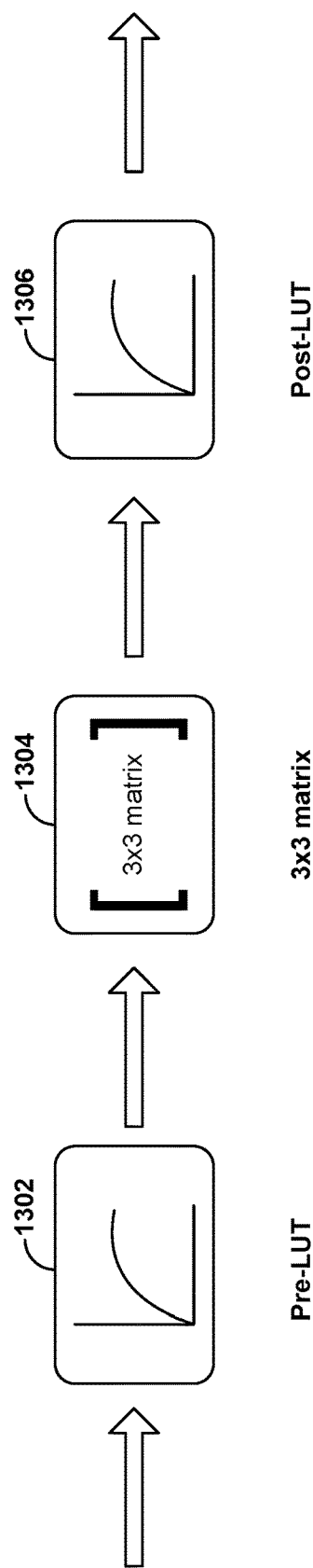
FIG. 11 is a conceptual drawing showing a typical structure of a color remapping information (CRI) process.

The color remapping information (CRI) SEI message, which is defined in the HEVC standard, is used to convey information that is used to map pictures in one color space to another. FIG. 11 shows a typical structure of the color remapping information process used by the CRI SEI message. In one example, the syntax of the CRI SEI message includes three parts: a first look-up table (Pre-LUT) 1302, followed by a 3×3 matrix indicating color remapping coefficients 1304, and followed by a second look-up table (Post-LUT) 1306. For each color component, e.g., R,G,B or Y,Cb,Cr, an independent Pre-LUT is defined, and also an independent Post-LUT is defined. The CRI SEI message also includes a syntax element called colour_remap_id, different values of which may be used to indicate different purposes of the SEI message.

In another example, the dynamic range adjustment (DRA) SEI message, has been described in D. Bugdayci Sansli, A. K. Ramasubramonian, D. Rusanovskyy, S. Lee, J. Sole, M. Karczewicz, Dynamic range adjustment SEI message, m36330, MPEG meeting, Warsaw, Poland, 22-26 Jun. 2015. An example DRA SEI message includes signaling of one set of scale and offset numbers to map the input samples. The SEI message also allows the signaling of different look-up tables for different components, and also allows for signaling optimization when the same scale and offset are to be used for more than one component. The scale and offset numbers may be signaled in fixed length accuracy.

This section lists several problems that are associated with the color remapping information SEI message and other SEI messages related to scaling or mapping video content. The SEI messages described in the previous paragraphs have one or more of the following deficiencies:

There are several problems associated with the tone-mapping SEI message, the knee function SEI message, and the CRI SEI message. For example, the tone-mapping information SEI syntax does not allow indication, or provide any indication, of scaling for chroma components Cb and Cr. Further the number of bits needed to indicate the look-up table pivot points and other syntax elements (e.g., in the CRI SEI message) is more than what may be necessary, and may be inefficient. When the SEI message is to be signaled more frequently, e.g. every frame, it may be beneficial that the SEI message be simple and consume fewer bits. Further, many SEI messages (e.g., tone-mapping information, knee function SEI message) have same look up table applied for all three color components when applicable. Still further, the dynamic range adjustment SEI message only signals one scale and one offset for each component.

In view of the foregoing, and as further described below, this disclosure proposes signaling, through one or more new SEI messages, parameters and/or information relating to performing dynamic range adjustment described above. The dynamic range adjustment parameters or information may be used by the video decoder 30 and/or video postprocessor 31 to perform the inverse of the dynamic range adjustment to reconstruct the video data. In some examples, the DRA parameters or DRA information may be signaled explicitly. For example, the one or more SEI messages may include the various global offset, local offset, partition, and scale information.

Accordingly, in some examples, video encoder 20 may receive dynamic range adjustment parameters or information from video preprocessor 19, and may signal one or more SEI messages that include various dynamic range adjustment parameters or dynamic range adjustment information. Such information may include global offset, local offset, partition, and scale parameters, or information that is sufficient to derive such parameters or information, or is otherwise sufficient to describe how the dynamic range adjustment was applied to the video data. Decoder 30 may receive one or more of such SEI messages, parse and/or decode the information in the SEI messages, and act upon such information and/or pass the information to the video postprocessor 31.

In some examples, video encoder 20 may signal one or more SEI messages that include global offset values, including, for each component, a first offset value that determines a first unadjusted component value below which all component values are clipped to the first component value before applying dynamic range adjustment as described in this disclosure. Decoder 30 may receive one or more of such SEI messages, parse and/or decode the information in the SEI messages, and pass the information to the video postprocessor 31.

In some examples, for each component, video encoder 20 may signal one or more SEI messages that include a second offset value that specifies the adjusted value to which the first offset value maps to after dynamic range adjustment. Video decoder 30 may receive such SEI messages, parse and/or decode the information, and pass that information to video postprocessor 31.

In another example, neither the first global offset value nor the second global offset value is signaled in a SEI message. Instead, decoder 30 assumes that the values of the first global offset and the second global offset is a constant, predetermined, or signaled value that the decoder 30 either determines per sequence or receives by external means. In another example, video encoder 20 signals the first global offset value in an SEI message, but the second global offset value is not signaled in a SEI message. Instead, video decoder 30 infers that its value is a constant, predetermined, or signaled value that decoder 30 either determines per sequence or received by external means. In a still further example, video encoder 20 signals the second global offset value in an SEI message, but the first global offset value is not signaled in a SEI message. Instead, video decoder 30 infers that the first global offset value is a constant, predetermined, or signaled value that decoder 30 either determines per sequence or received by external means.

In some examples, video encoder 20 may signal offset values that are received by decoder 30, and are used by decoder 30 to derive other global or local parameters, including both global and local scale and offset values, as well as partitions of a range of unadjusted values, and partitions of a range of adjusted values.

In some examples, video encoder 20 may signal one or more SEI messages that include the number of partitions that the range of input representation values (i.e., component values) were divided into during dynamic range adjustment. In one example, the number of partitions may be constrained to be a power of 2 (i.e. 1, 2, 4, 8, 16, etc.) and the number of partitions is signaled as logarithm (e.g. 8 partitions is signaled as $3=\log_2 8$). Video decoder 30 may receive such SEI messages, parse and/or decode the information, and pass that information to video postprocessor 31.

In some examples, the number of partitions for the chroma components may be different from the number of partitions for the luma component. The number of partitions may be constrained to be a power of 2+1 and signaled as logarithm and rounding towards minus 0. In this way, pixels with neutral chroma can have their own values and the size of that partition can be smaller than the other partitions. In such an example, neutral chroma may refer to values of chroma around the mid-value (e.g., 0 when the chroma values range between −0.5 and 0.5, or between −512 and 511 in a 10-bit representation). Constraining the number of partitions as a power of 2 may enable the encoder 20 to save bits, because encoder 20 may be able to represent the log of a value with fewer bits than the actual value for integer values. Constraining the number of partitions to a power of 2+1 may ensure that at least one partition may be dedicated to the neutral chroma values, and in some examples, the width of the partition corresponding to the neutral chroma values may be smaller than the rest. In other examples, such a partition may be larger than one or more of the other partitions.

In some examples, decoder 30 may use the signaled number of partitions to derive other global or local parameters, including both global and local scale and offset values, as well as the actual size of the partitions of a range of unadjusted component values and/or the size of the partitions of a range of adjusted component values.

In some examples, encoder 20 may signal one or more SEI messages that may include, for each partition, a local scale and local offset value specifying a range of the input component values and the corresponding mapped output component values. In some examples, encoder 20 may signal an SEI message that includes the number of bits used by the syntax elements to signal the scale and offsets. In other examples, encoder 20 may signal an SEI message that indicates the number of bits that are used to represent the fractional part of the scale and offsets in the syntax elements. In other examples, encoder 20 may signal one or more SEI messages or syntax elements that indicate that the integer part of the scale parameters is signaled in a signed representation. In some examples, the signed representation is two's complement. In other examples, the signed representation is signed magnitude representation. Video decoder 30 may receive such SEI messages and/or syntax elements, parse and/or decode the information, and pass that information to video postprocessor 31.

In other examples, encoder 20 may use each offset value successively to first compute the range of adjusted component or representation values, and then using the scale value, compute the corresponding range in the unadjusted representation. For example, one offset value may be used to compute the range of a first partition in the adjusted component using the value of a global offset value derived or signaled for the adjusted component, followed by using the scale value and the range of a first partition of the adjusted representation to derive the range in the corresponding partition of the unadjusted representation and with the respective ranges of the first partition of the adjusted and the corresponding partition of the unadjusted representations, derive a respective value derived for the first partition of the adjusted range and the corresponding partition of unadjusted representations that indicate a boundary of the partitions. Following this, another offset value may be used to compute the range of a second partition in the adjusted component using the boundary value of the first partition in the adjusted component derived in the previous step, followed by using the scale value and the range of a second partition of the adjusted representation to derive the range of the unadjusted representation, and with the respective ranges of the second partitions of the adjusted representation and corresponding partition of the unadjusted representations, a respective value is derived for the partitions in the adjusted and unadjusted representations that indicate a boundary of the respective representations. This method may be repeated until all the ranges and boundaries are derived for all the partitions in the adjusted and unadjusted representations. In another example, encoder 20 may use each offset value successively to first compute the range of unadjusted component or representation values, and then using the scale value, compute the corresponding range in the adjusted representation. In other words, the component or representation to which the scale and offset values are applied could be swapped between unadjusted and adjusted representations.

In some examples, the number of bits used by the syntax elements to signal scale and offset values may depend on the component. In other examples, a default number of bits is defined and used when these numbers are not explicitly signaled.

In some examples, encoder 20 may signal a syntax element indicating whether the length of the partitions of the output representations (i.e., output components) are equal. In such an example, encoder 20 might not signal the offset value for one or more partitions. Decoder 30 may infer the offset values to be equal in some examples. In another example, decoder 30 may assume the partitions are of equal length and may not receive a syntax element so indicating. In some examples, decoder 30 may derive the size of each partition from signaled syntax elements and predefined total dynamical range of the representation.

In other examples, rather than signaling pivot points for each partition as well as scale and offset values for each partition, video encoder 20 may signal one or more SEI messages that indicate derivative or scale value for each partition along with the size of one or more or all partitions. This approach may allow encoder 20 to avoid signaling local offset values for each partition. Instead, in some examples, encoder 20 may be able to signal, in one or more SEI messages, the partition size and scale value (or derivative) for one or more partitions. The local offset value for each partition or partitioning (which may require higher accuracy) may be determined or derived by decoder 30.

In some examples, encoder 20 may signal one or more SEI messages that indicate a mode value that specifies several default values for offset and scale values for certain partitions. Video decoder 30 may receive such SEI messages, parse and/or decode the information, and pass that information to video postprocessor 31.

In some examples, encoder 20 may signal one or more SEI messages that indicate a value defining the persistence of the SEI message such that the persistence of a subset of the components may be defined and component scale values of a subset of the components may be updated. The persistence of an SEI message indicates the pictures to which the values signaled in the instance of the SEI may apply. In some examples, the persistence of the SEI message is defined such that the values signaled in one instance of SEI messages may apply correspondingly to the all components of the pictures to which the SEI message applies. In other examples, the persistence of the SEI message is defined such that the values signaled in one instance of the SEI may be indicated to apply correspondingly to a subset of the components wherein the components to which the values in the instance of the SEI does not apply may either have no values applicable or may have values applicable that are signaled in another instance of the SEI message. Video decoder 30 may receive such SEI messages, parse and/or decode the information, and pass that information to video postprocessor 31.

In some examples, encoder 20 may signal one or more SEI messages that include syntax elements indicating the postprocessing steps to be performed to the decoded output. Each syntax element may be associated with a particular process (e.g. scaling components, color transforms, up-sampling/down-sampling filters, etc.) and each value of the syntax element may specify that a particular set of parameters associated with the process be used. In some examples, the parameters associated with the process are signaled by video encoder 20 using SEI messages that are part of the bitstream or as metadata that may be transmitted through other means. Video decoder 30 may receive such SEI messages, parse and/or decode the information, and pass that information to video postprocessor 31.

In some examples, encoder 20 may signal syntax elements or one or more SEI messages that may be used for describing and/or constructing a piece-wise linear model function for mapping input representations (i.e., input component values) to output representations (i.e., output component values). Video decoder 30 may receive such SEI messages, parse and/or decode the information, and pass that information to video postprocessor 31. In other examples, predefined assumptions may be used for describing and/or constructing a piece-wise linear model function for mapping input representations to the output representation.

In some examples, encoder 20 may signal one or more SEI messages that may include one or more syntax elements indicating that the scale and offset parameters signaled in the SEI message represent the variation of the scale to be applied to a first component as a function of different values of a second component.

In some examples, encoder 20 may signal one or more SEI messages indicating offset parameters that are to be or may be applied along with the scale on a first component as a function of different values of a second component. In some examples, encoder 20 may signal one or more SEI messages that may include one or more additional syntax elements that indicating offset parameters that are to be or may be applied along with the scale on a first component as a function of different values of a second component. Video decoder 30 may receive such SEI messages, parse and/or decode the information, and pass that information to video postprocessor 31.

In some examples, encoder 20 may signal one or more SEI messages including a first syntax element that indicates a first set of electro-optical transfer function characteristics such that the signaled scale, offset and other dynamic range adjustment parameters the SEI message are applied when the electro-optical transfer function characteristics used on the decoder-side are similar to that first set of electro-optical transfer function characteristics.

In another example, encoder 20 may signal one or more SEI messages indicating that the signaled offset, scale and other dynamic range parameters in the SEI message(s) are to be applied for best reconstruction of the HDR output when the first set of electro-optical transfer function characteristics, or those with similar characteristics, are used by the decoder 30. Video decoder 30 may receive such SEI messages, parse and/or decode the information, and pass that information to video postprocessor 31.

In another example, encoder 20 may signal one or more SEI messages indicating that a first set of opto-electronic transfer function characteristics, and the signaled scale, offset and other dynamic range adjustment parameters are applied on by decoder 30 when the corresponding inverse electro-optical transfer function characteristics are applied at the decoder side. Video decoder 30 may receive such SEI messages, parse and/or decode the information, and pass that information to video postprocessor 31.

In other examples, encoder 20 may signal a condition such that when more than one SEI message is present indicating different set of electro-optical/opto-electronic characteristics and applicable the current picture, only one SEI message is applied. The encoder may signal different set of electro-optical/opto-electronic characteristics to satisfy different types of decoders, or decoders with different capabilities. For example, some displays at the decoder side may apply the PT EOTF to convert the coded component values in an appropriate domain to linear light, whereas other displays, e.g. legacy displays, may apply the gamma EOTF to convert to linear light. Each SEI with a particular characteristic that the encoder sends may be appropriate or beneficial for certain types of displays and not for other types of displays, e.g. an SEI message with PQ EOTF characteristics may be suitable for displays that apply PQ EOTF to convert the coded video to linear light. The decoder 30 determines which SEI message is to be applied, and makes such a choice based on the application standard, based on the end-user device, based on a signal received, or based on another indication received through external means. For example, decoder 30 may determine that the first syntax element in a first SEI message that applies to a current picture indicates that the SEI message is to be applied with the inverse of PQ OETF and the first syntax element in a second SEI message that applies to a current picture indicates that the SEI message is to be applied with another transfer function (such as BBC, or PH), the decoder 30 or end-user device may choose to apply the parameters in the first SEI message because the device uses PQ EOTF. In some examples, an application standard to which the decoder conforms to may specify that an SEI message with a particular set of characteristics is to be used.

In other examples, encoder 20 may signal an SEI message that carries the parameters corresponding to multiple sets of transfer characteristics. In other examples, encoder 20 may signal different SEI messages for that purpose. Video decoder 30 may receive such SEI messages, parse and/or decode the information, and pass that information to video postprocessor 31

In some examples, encoder 20 may signal one or more SEI messages that include a syntax element indicating the applicability of the SEI message. The applicability of the SEI message may include, but is not limited to (1) the components to which the scales and offsets apply, (2) the position at which the component scaling is applied, and/or (3) whether additional scaling parameters are signaled.

As described, encoder 20 may signal one or more SEI messages that include a syntax element indicating the components to which the scales and offsets apply. The following lists several examples of such an application. For example, one value of the syntax element could indicate that signaled parameters for the first component index are to be applied to the RGB components. Another value may indicate that the signaled parameters for the first component index is to be applied to luma component, and those for the second and third indices are to be applied to the Cb and Cr components. Another value may indicate that the signaled parameters for the first component index is to be applied to R, G and B components, and those for the second and third indices are to be applied to the Cb and Cr components. Another value may indicate that signaled parameters for first three indices are applied to luma, Cb and Cr components, and that corresponding to the remaining indices are applied for color correction. Video decoder 30 may receive such SEI messages, parse and/or decode the information, and pass that information to video postprocessor 31.

Also as described, encoder 20 may signal one or more SEI messages including a syntax element indicating the position at which the component scaling is applied. Several processes occur on the decoder-side, after decoding of the video, and in the video postprocessor 31. Signaling of syntax element indicating the position at which the process associated with the SEI is to be applied, in other words indication of any subset of the preceding or succeeding operations of the process associated with using the information in the SEI, would be helpful to the video decoder 30 or the video postprocessor 31 to process the video. For example, such a syntax element could indicate the position at which the component scaling is applied, for example to YCbCr components before or after upsampling. In another example, the syntax element could indicate that the component scaling is applied before the quantization to the decoder side. Video decoder 30 may receive such SEI messages, parse and/or decode the information, and pass that information to video postprocessor 31.

Also as described, encoder 20 may signal one or more SEI messages that include a syntax element indicating whether an additional set of scaling and parameters, e.g. for color correction, are signaled. The additional set of parameters could be used for color correction to map the color components to fit a particular color gamut, or for correction of component values when a different transfer function is applied than that indicated by the transfer_characteristics syntax element in the VUI.

In other examples, encoder 20 may signal different syntax elements to indicate the above aspects; e.g. one syntax element to indicate which component(s) the SEI applies to, one syntax element to indicate whether it applies to HDR-compatible of SDR-compatible content, and one syntax element to indicate the position(s) where the component scaling SEI message is to be applied.

When the number of components to which the component scaling SEI message parameters are applied is more than one, encoder 20 may signal one or more SEI messages that include a syntax element indicating that application of scale and offset parameters may be done sequentially based on the index of the component. For example, the mapping based on the scale and offset parameters of the first component may be applied, and then the mapping of the second component, which for example uses scale and offset signaled for the second component, may depend on the values of the first component. In some examples, this is indicated by, for example, by syntax element specifying that the mapped values of the first component should be used. Video decoder 30 may receive such SEI messages, parse and/or decode the information, and pass that information to video postprocessor 31.

In another example, video encoder 20 may constrain the values signaled in one or more SEI messages, or in the bitstream, in such a way that an HDR10 receiver can decode and show a viewable HDR video even if the SEI postprocessing is not applied. The SEI message(s) may include a syntax element to indicate that this is the case (e.g., that the bitstream is an HDR10 backward compatible bitstream).

This section includes several examples that use techniques disclosed in accordance with one or more aspects of the present disclosure.

Example 1

In this example 1, the component scaling function is signaled as a look-up table and the number of bits used to signal the points defining the look up table are also signaled. For sample values that do not have explicit points signaled, the value is interpolated based on the neighboring pivot points.

Syntax of the Component Scaling SEI Message

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_num_comps_minus1 | ue(v) |
|   comp_scale_input_bit_depth | ue(v) |
|   comp_scale_output_bit_depth | ue(v) |
|   for( c = 0; c <= comp_scale_num_comps_minus1; c++ ) { | |
|     comp_scale_num_points_minus1[ c ] | ue(v) |
|     for( i = 0; i <= comp_scale_num_points_minus1[ c ]; i++ ) { | |
|       comp_scale_input_point[ c ][ i ] | u(v) |
|       comp_scale_output_point[ c ][ i ] | u(v) |
|     } | |
|   } | |
| } | |
| } | |

Semantics of the Component Scaling SEI Message

The component scaling SEI message provides information to perform scaling operations on the various components of the decoded pictures. The colour space and the components on which the scaling operations should be performed are determined by the value of the syntax elements signaled in the SEI message.

comp_scale_id contains an identifying number that may be used to identify the purpose of the component scaling SEI message. The value of comp_scale_id shall be in the range of 0 to $2^{32}-2$, inclusive. The value of comp_scale_id may be used to specify the colour space at which the component scaling SEI message, or whether the component scaling SEI message is applied in the linear or the non-linear domain.

Values of comp_scale_id from 0 to 255, inclusive, and from 512 to $2^{31}-1$, inclusive, may be used as determined by the application. Values of comp_scale_id from 256 to 511, inclusive, and from $2^{31}$ to $2^{32}-2$, inclusive, are reserved for future use by ITU-T ISO/IEC. Decoders shall ignore all component scale information SEI messages containing a value of comp_scale_id in the range of 256 to 511, inclusive, or in the range of $2^{31}$ to $2^{32}-2$, inclusive, and bitstreams shall not contain such values.

NOTE 1—The comp_scale_id can be used to support component scaling processes that are suitable for different display scenarios. For example, different values of comp_scale_id may correspond to different display bit depths or different colour spaces in which the scaling is applied.

Alternatively, the comp_scale_id may also be used to identify whether the scaling is performed for compatibility to certain types of displays or decoder, e.g. HDR, SDR.

comp_scale_cancel_flag equal to 1 indicates that the component scaling information SEI message cancels the persistence of any previous component information SEI messages in output order that applies to the current layer. comp_scale_cancel_flag equal to 0 indicates that component scaling information follows.

comp_scale_persistence_flag specifies the persistence of the component scaling information SEI message for the current layer.

comp_scale_persistence_flag equal to 0 specifies that the component scaling information applies to the current decoded picture only.

Let picA be the current picture. comp_scale_persistence_flag equal to 1 specifies that the component scaling information persists for the current layer in output order until any of the following conditions are true:

A new CLVS of the current layer begins.

The bitstream ends.

A picture picB in the current layer in an access unit containing a component scaling information SEI message with the same value of comp_scale_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

comp_scale_num_comps_minus1 plus 1 specifies the number of components for which the component scaling function is specified. comp_scale_num_comps_minus1 shall be in the range of 0 to 2, inclusive.

When comp_scale_num_comps_minus1 is less than 2 and the component scaling parameters of the c-th component is not signaled, are inferred to be equal to those of the (c−1)-th component.

Alternatively, when comp_scale_num_comps_minus1 is less than 2, and the component scaling parameters of the c-th component is not signaled, the component scaling parameters of the c-th component are inferred to be equal to default values such that effectively there is no scaling of that component.

Alternatively, the inference of the component scaling parameters may be specified based on the colour space on which the SEI message is applied.

When the colour space is YCbCr, and comp_scale_num_comps_minus1 is equal to 1, the component scaling parameters apply to both Cb and Cr components.

When the colour space is YCbCr, and comp_scale_num_comps_minus1 is equal to 2, the first and second component scaling parameters apply to Cb and Cr components.

In one alternative, the different inference is specified based on the value of comp_scale_id or on the basis of an explicit syntax element.

Alternatively, a constraint is added as follows:

It is constraint for bitstream conformance that the value of comp_scale_num_comps_minus1 shall be the same for all the component scaling SEI message with a given value of comp_scale_id within a CLVS.

comp_scale_input_bit_depth_minus8 plus 8 specifies the number of bits used to signal the syntax element comp_scale_input_point[c][i]. The value of comp_scale_input_bit_depth_minus8 shall be in the range of 0 to 8, inclusive.

When component scaling SEI message is applied to an input that is in a normalized floating point representation in the range 0.0 to 1.0, the SEI message refers to the hypothetical result of a quantization operation performed to convert the input video to a converted video representation with bit depth equal to colour_remap_input_bit_depth_minus8+8.

When component scaling SEI message is applied to a input that has a bit depth not equal to the comp_scale_input_bit_depth_minus8+8, the SEI message refers to the hypothetical result of a transcoding operation performed to convert the input video representation to a converted video representation with bit depth equal to colour_remap_input_bit_depth_minus8+8.

comp_scale_output_bit_depth_minus8 plus 8 specifies the number of bits used to signal the syntax element comp_scale_output_point[c][i]. The value of comp_scale_output_bit_depth_minus8 shall be in the range of 0 to 8, inclusive.

When component scaling SEI message is applied to an input that is in floating point representation, the SEI message refers to the hypothetical result of an inverse quantization operation performed to convert the video representation with a bit depth equal to colour_remap_output_bit_depth_minus8+8 that is obtained after processing of the component scaling SEI message to a floating point representation in the range 0.0 to 1.0. Alternatively, the number of bits used to signal comp_scale_input_point[c][i] and comp_scale_output_point[c][i] are signaled as comp_scale_input_bit_depth and comp_scale_output_bit_depth, respectively, or in other words without subtracting 8.

comp_scale_num_points_minus1[c] plus 1 specifies the number of pivot points used to define the component scaling function. comp_scale_num_points_minus1[c] shall be in the range of 0 to (1<<Min(comp_scale_input_bit_depth_minus8+8, comp_scale_output_bit_depth_minus8+8))−1, inclusive.

comp_scale_input_point[c][i] specifies the i-th pivot point of the c-th component of the input picture. The value of comp_scale_input_point[c][i] shall be in the range of 0 to (1<<comp_scale_input_bit_depth_minus8[c]+8)−1, inclusive. The value of comp_scale_input_point[c][i] shall be greater than or equal to the value of comp_scale_input_point[c][i−1], for i in the range of 1 to comp_scale_points_minus1[c], inclusive.

comp_scale_output_point[c][i] specifies the i-th pivot point of the c-th component of the output picture. The value of comp_scale_output_point[c][i] shall be in the range of 1 to (1<<comp_scale_output_bit_depth_minus8[c]+8)−1, inclusive. The value of comp_scale_output_point[c][i] shall be greater than or equal to the value of comp_scale_output_point[c][i−1], for i in the range of 1 to comp_scale_points_minus1[c], inclusive.

The process of mapping an input signal representation x and an output signal representation y, where the sample values for both input and output are in the range of 0 to (1<<comp_scale_input_bit_depth_minus8[c]+8)−1, inclusive, and 0 to (1<<comp_scale_output_bit_depth_minus8[c]+8)−1, inclusive, respectively, is specified as follows:

```
if( x <= comp_scale_input_point[ c ][ 0 ] )
    y = comp_scale_output_point[ c ][ 0 ]
else if( x > comp_scale_input_point[ c ][ comp_scale_input_point_minus1[ c ] ] )
    y = comp_scale_output_point[ c ][ comp_scale_output_point_minus1[ c ] ]
else
    for( i = 1; i <= comp_scale_output_point_minus1[ c ]; i++ )
        if( comp_scale_input_point[ i − 1 ] < x && x <= comp_scale_input_point[ i ] )
    y = ( ( comp_scale_output_point[ c ][ i ] − comp_scale_output_point[ c ][ i − 1 ] ) ÷
        ( comp_scale_input_point[ c ][ i ] − comp_scale_input_point[ c ][ i − 1 ] ) ) *
                   ( x − comp_scale_input_point[ c ][ i − 1 ] ) +
                   ( comp_scale_output_point[ c ][ i − 1 ] )
```

In one alternative, input and output pivot points comp_scale_input_point[c][i] and comp_scale_output_point[c][i] are coded as difference of adjacent values; e.g., delta_comp_scale_input_point[ ][ ] and delta_comp_scale_output_point[ ][ ], and the syntax elements are coded using exponential Golomb codes.

In another alternative, the process of mapping an input and output representation value is specified by other interpolation methods including, but not limited to, splines and cubic interpolation.

Example 2

This Example 2 shows a different syntax structure compared to the SEI syntax structure described in Example 1. In this syntax structure, the mapping function is described in terms of scales and offsets instead of pivot points.

Syntax of the Component Scaling SEI Message

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_num_comps | ue(v) |
|   comp_scale_input_bit_depth | ue(v) |
|   comp_scale_output_bit_depth | ue(v) |
|   comp_scale_bit_depth_scale_val | ue(v) |
|   comp_scale_log2_denom_scale_val | ue(v) |
|   for( c = 0; c < comp_scale_num_comps; c++ ) { | |
|     comp_scale_num_points_minus1[ c ] | ue(v) |
|     comp_scale_global_offset_input_val[ c ] | u(v) |
|     comp_scale_global_offset_output_val[ c ] | u(v) |
|     for( i = 0; i < comp_scale_num_points_minus1[ c ]; i++ ) { | |
|       comp_scale_offset_val[ c ][ i ] | u(v) |
|       comp_scale_val[ c ][ i ] | u(v) |
|     } | |
|   } | |
| } | |
| } | | comp_scale_bit_depth_scale_val specifies the number of bits used to signal the syntax element comp_scale_val[c][i]. The value of comp_scale_bit_depth_scale_val shall be in the range of 0 to 24, inclusive.

comp_scale_log 2_denom_scale_val specifies the base 2 denominator of the scale value. The value of comp_scale_log 2_denom_scale_val shall be in the range of 0 to 16, inclusive.

comp_scale_global_offset_input_val[c] plus 1 specifies the input sample value below which all the input representation values are clipped to CompScaleOffsetOutputVal[c][0]. used to define the component scaling function. comp_scale_num_points_minus1[c] shall be in the range of 0 to (1<<comp_scale_input_bit_depth)−1, inclusive. The number of bits used to represent comp_scale_global_offset_input_val[c] is comp_scale_input_bit_depth.

comp_scale_global_offset_output_val[c] plus 1 specifies the output sample value to which all the input representation values below comp_scale_global_offset_input_val[c] are to be clipped. comp_scale_num_points_minus1[c] shall be in the range of 0 to (1<<comp_scale_output_bit_depth)−1, inclusive. The number of bits used to represent comp_scale_global_offset_output_val[c] is comp_scale_output_bit_depth.

comp_scale_num_points_minus1[c] plus 1 specifies the number of pivot points used to define the component scaling function. comp_scale_num_points_minus1[c] shall be in the range of 0 to (1<<Min(comp_scale_input_bit_depth, comp_scale_output_bit_depth)−1, inclusive.

The process of mapping an input signal representation x and an output signal representation y, where the sample values for both input representation is in the range of 0 to (1<<comp_scale_input_bit_depth)−1, inclusive, and output representation is in the range of and 0 to (1<<comp_scale_output_bit_depth)−1, inclusive, is specified as follows:

```
if( x <= CompScaleOffsetInputVal[ c ][ 0 ] )
    y = CompScaleOffsetOutputVal[ c ][ 0 ]
else if( x > CompScaleOffsetInputVal[ c ]
    [ comp_scale_output_point_minus1 ] )
    y = CompScaleOffsetOutputVal[ c ]
    [ comp_scale_output_point_minus1 ]
else
    for( i = 1; i <= comp_scale_output_point_minus1; i++ )
        if( CompScaleOffsetInputVal[ i − 1 ] < x && x <=
CompScaleOffsetInputVal[ i ] )
            y = ( x −
CompScaleOffsetInputVal[ i − 1 ] ÷ ( comp_scale_val[ c ][ i ] +
              CompScaleOffsetOutputVal[ c ][ i ]
``` comp_scale_offset_val[c][i] specifies the offset value of the i-th sample value region of the c-th component. The number of bits used to represent comp_scale_offset_val[c] is equal to comp_scale_input_bit_depth.

comp_scale_val[c][i] specifies the scale value of the i-th sample value region point of the c-th component. The number of bits used to represent comp_scale_val[c] is equal to comp_scale_bit_depth_scale_val.

The variables CompScaleOffsetOutputVal[c][i] and CompScaleOffsetInputVal[c][i] for i in the range of 0 to comp_scale_num_points_minus1[c], inclusive, is derived as follows:

```
roundingOffset = (comp_scale_log2_denom_scale_val == 0 ) ? 0 : (1 <<
                      comp_scale_log2_denom_scale_val − 1)
for( i = 0; i <= comp_scale_num_points_minus1[ c ]; i++ )
  if( i == 0 )
    CompScaleOffsetOutputVal[ c ][ i ] =
comp_scale_global_offset_output_val[ c ]
    CompScaleOffsetInputVal[ c ][ i ] =
comp_scale_global_offset_input_val[ c ]
  else
    CompScaleOffsetOutputVal[ c ][ i ] = CompScaleOffsetOutputVal[ c ][ i −
1 ] +
              (comp_scale_offset_val[ c ][ i − 1 ] * comp_scale_val[ c ][ i − 1 ]
                   + roundingOffset ) >>
comp_scale_log2_denom_scale_val
    CompScaleOffsetInputVal[ c ][ i ] = CompScaleOffsetInputVal[ c ][ i − 1 ]
+
                   comp_scale_offset_val[ c ][ i − 1 ]
```

In one alternative, comp_scale_offset_val[c][i] is used to directly calculate CompScaleOffsetOutputVal[ ][i] and indirectly calculate CompScaleOffsetInputVal[ ][i] for i in the range of 0 to comp_scale_num_points_minus1[c] as follows:

```
for( i = 0; i < comp_scale_num_points_minus1[ c ]; i++ )
  if( i == 0 )
    CompScaleOffsetOutputVal[ c ][ i ] =
comp_scale_global_offset_output_val[ c ]
    CompScaleOffsetInputVal[ c ][ i ] =
comp_scale_global_offset_input_val[ c ]
  else
    CompScaleOffsetInputVal[ c ][ i ] = CompScaleOffsetInputVal[ c ]
[ i − 1 ]+
              (comp_scale_offset_val[ c ][ i − 1 ] *
comp_scale_val[ c ][ i − 1 ]
                   + roundingOffset ) >>
comp_scale_log2_denom_scale_val )
    CompScaleOffsetOutputVal[ c ][ i ] =
CompScaleOffsetOutputVal[ c ][ i − 1 ] +
                   comp_scale_offset_val[ c ][ i − 1 ]
```

In one alternative, comp_scale_offset_val[c][i] for i in the range of 0 to comp_scale_num_points_minus1[c], inclusive, are not signaled, and the values of comp_scale_offset_val[c][i] are derived based on comp_scale_num_points_minus1[c] equally spaced intervals for which the scale is specified. The value of comp_scale_offset_val[c][i] for i in the range of 0 to comp_scale_num_points_minus1[c]−1, inclusive, is derived as follows:

comp_scale_offset_val[*c*][*i*]=((1<<comp_scale_output_bit_depth)−comp_scale_global_offset_output_val[*c*])÷comp_scale_num_points_minus1[*c*]

In another alternative, comp_scale_offset_val[c][i] for i in the range of 0 to comp_scale_num_points_minus1[c] is calculated as follows:

comp_scale_offset_val[*c*][*i*]=(1<<comp_scale_output_bit_depth)÷comp_scale_num_points_minus1[*c*]÷

In one alternative, instead of signaling comp_scale_num_points_minus1[c], the number of pivot points is signaled using log 2_comp_scale num_points[c], where (1<<log 2_comp_scale num_points[c]) specifies the number of pivot points for the c-th component.

Alternatively, each of comp_scale_offset_val[c][ ] and comp_scale_val[c][ ] is signaled as floating point numbers, or as two syntax elements with exponent and mantissa.

In another alternative, signaling of comp_scale_val[c][i] is replaced by comp_scale_output_point[c][i].

The semantics of rest of the syntax elements are similar to those described in Example 1.

Example 3

This method described in Example 3 is similar to one of the alternatives described in Example 2, with the exception that the component scaling functions are allowed to be updated independently.

Syntax of the Component Scaling SEI Message

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_num_comps | ue(v) |
|   comp_scale_input_bit_depth | ue(v) |
|   comp_scale_output_bit_depth | ue(v) |
|   for( c = 0; c < comp_scale_num_comps; c++ ) { | |
|     comp_scale_persist_component_flag[ c ] | u(1) |
|     if( !comp_scale_persist_component_flag[ c ] ) | |
|     comp_scale_num_scale_regions[ c ] | ue(v) |
|     comp_scale_global_offset_input_val[ c ] | u(v) |
|     comp_scale_global_offset_output_val[ c ] | u(v) |
|     for( i = 0; i < comp_scale_num_scale_regions[ c ]; i++ ) { | |
|       comp_scale_offset_val[ c ][ i ] | u(v) |
|       comp_scale_val[ c ][ i ] | u(v) |
|     } | |
|   } | |
| } | |
| } | |

Semantics of the Component Scaling SEI Message

The semantics is similar to Example 2, except for the following syntax elements. comp_scale_num_scale_regions [c] specifies the number of regions for which the syntax element comp_scale_val[c][i] is signaled for the c-the component. comp_scale_num_scale_regions[c] shall be in the range of 0 to (1<<comp_scale_input_bit_depth)−1, inclusive.

comp_scale_persist_component_flag[c] equal to 0 specifies that component scaling parameters for the c-th component are explicitly signaled in the SEI message. comp- _scale_persist_component_flag[c] equal to 1 specifies that component scaling parameters for the c-th component are not explicitly signaled in the SEI message, and it persists from the component scaling parameters of the c-th component of the component scaling SEI message that applies to previous picture, in output order.

It is a requirement of bitstream conformance that when the component scaling SEI message is present in an TRAP access unit, the value of comp_scale_persist_component_flag[c], when present, shall be equal to 0.

Alternatively, the following condition is added:

It is a requirement of bitstream conformance that when the component scaling SEI message is present in an access unit that is not an TRAP access unit and comp_scale_persist_component_flag[c] is equal to 1, then there is at least one picture that precedes the current picture in output order and succeeds, in output order, the previous TRAP picture in decoding order, inclusive, such that the one picture is associated with a component scaling SEI message with comp_scale_persistence_flag equal to 1.

comp_scale_persistence_flag specifies the persistence of the component scaling information SEI message for the current layer.

comp_scale_persistence_flag equal to 0 specifies that the component scaling information applies to the current decoded picture only.

Let picA be the current picture comp_scale_persistence_flag equal to 1 specifies that the component scaling information of the c-th component persists for the current layer in output order until any of the following conditions are true:

A new CLVS of the current layer begins.

The bitstream ends.

A picture picB in the current layer in an access unit containing a component scaling information SEI message with the same value of comp_scale_id and comp_scale_persist_component_flag[c] equal to 0, and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

Example 4

In this Example 4, a different method to signal the scale regions is disclosed.

Changes to Component Scaling SEI Message Syntax

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_num_comps | ue(v) |
|   comp_scale_input_bit_depth | ue(v) |
|   comp_scale_output_bit_depth | ue(v) |
|   for( c = 0; c < comp_scale_num_comps; c++ ) { | |
|     comp_scale_persist_component_flag[ c ] | u(1) |
|     if( !comp_scale_persist_component_flag[ c ] ) | |
|       comp_scale_global_offset_input_val[ c ] | u(v) |
|       comp_scale_global_offset_output_val[ c ] | u(v) |
|       comp_scale_num_scale_regions[ c ] | ue(v) |

| component_scale_info( payloadSize ) { | Descriptor |
|---|---|
|     for( i = 0; i < comp_scale_num_scale_regions[ c ]; i++ ) { | |
|       comp_scale_offset_begin_val[ c ][ i ] | u(v) |
|       comp_scale_offset_end_val[ c ][ i ] | u(v) |
|       comp_scale_val[ c ][ i ] | u(v) |
|     } | |
|   } | |
| } | |
| } | |

Changes to Component Scaling SEI Message Semantics

The semantics of the syntax elements are similar to those described in previous examples, except for the following:

comp_scale_offset_begin_val[c][i] specifies the beginning of the sample value range for which the scale value comp_scale_val[c][i] is applicable. The number of bits used to represent comp_scale_offset_begin_val[c] is equal to comp_scale_input_bit_depth.

comp_scale_offset_end_val[c][i] specifies the end of the sample value range for which the scale value comp_scale_val[c][i] is applicable. The number of bits used to represent comp_scale_offset_end_val[c] is equal to comp_scale_input_bit_depth.

For regions that are not explicitly specified by comp_scale offset begin val and comp_scale_offset_end_val, the comp_scale_value[c][i] for those regions is inferred to be equal to 0.

Alternatively, comp_scale_offset_end_val[c][i] is not signaled and instead the difference between comp_scale_offset_end_val[c][i] and comp_scale_offset_begin_val[c][i] is signaled, and the value of comp_scale_offset_end_val[c][i] derived at the decoder-side.

In another alternative, the total number of regions in to which the output sample range is split is specified, and the number of regions is signaled for which the scale regions are explicitly signaled.

| ... | u(v) |
|---|---|
| comp_scale_global_offset_output_val[ c ] | u(v) |
| comp_scale_tot_scale_regions[ c ] | ue(v) |
| comp_scale_num_scale_regions[ c ] | ue(v) |
| for( i = 0; i < comp_scale_num_scale_regions[ c ]; i++ ) { | |
|   comp_scale_region_idx[ c ][ i ] | u(v) |
|   comp_scale_val[ c ][ i ] | u(v) |
| } | |
| ... | | comp_scale_tot_scale_regions[c] specifies the total number of equal length sample value ranges in to which the sample values are split. The number of bits used to represent comp_scale_tot_scale_regions[c] is equal to comp_scale_input_bit_depth.

In one alternative, the comp_scale_tot_scale_regions[c] sample value ranges may not be exactly equal in length but very nearly equal to account for the integer accuracy of the region lengths.

comp_scale_region_idx[c][i] specifies the index of the sample value range for which the scale value comp_scale_val[c][i] is applied. The length of the syntax element comp_scale_region_idx[c] is Ceil(Log 2(comp_scale_tot_scale_regions[c])) bits.

Alternatives

Alternatively, region around the chroma neutral (511 for 10-bit data) have smaller size, p.e., half the size of the other regions.

Example 5

Syntax of the Component Scale SEI Message

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_scale_bit_depth | u(4) |
|   comp_scale_offset_bit_depth | u(4) |
|   comp_scale_scale_frac_bit_depth | u(4) |
|   comp_scale_offset_frac_bit_depth | u(4) |
|   comp_scale_num_comps_minus1 | ue(v) |
|   for( c = 0; c <= comp_scale_num_comps_minus1; c++ ) { | |
|     comp_scale_num_ranges[ c ] | ue(v) |
|     comp_scale_equal_ranges_flag[ c ] | u(1) |
|     comp_scale_global_offset_val[ c ] | u(v) |
|     for( i = 0; i <= comp_scale_num_ranges[ c ]; i++ ) | |
|       comp_scale_scale_val[ c ][ i ] | u(v) |
|     if( !comp_scale_equal_ranges[ c ] ) | u(v) |
|       for( i = 0; i <= comp_scale_num_ranges[ c ]; i++ ) | |
|         comp_scale_offset_val[ c ][ i ] | u(v) |
|   } | |
| } | |

Semantics of the Component Scale SEI Message

The component scaling SEI message provides information to perform scaling operations on the various components of the decoded pictures. The colour space and the components on which the scaling operations should be performed are determined by the value of the syntax elements signaled in the SEI message.

comp_scale_id contains an identifying number that may be used to identify the purpose of the component scaling SEI message. The value of comp_scale_id shall be in the range of 0 to $2^{32}-2$, inclusive. The value of comp_scale_id may be used to specify the colour space at which the component scaling SEI message, or whether the component scaling SEI message is applied in the linear or the non-linear domain.

In some examples, comp_scale_id can specify the configuration of the HDR reconstruction process. In some examples, particular value of comp_scale_id may be associated with signaling of scaling parameters for 3 components. The scaling of the first components to be applied to samples of R',G',B' color space, and parameters of following 2 components are applied for scaling of Cr and Cb.

For yet another comp_scale_id value, hdr reconstruction process can utilize parameters for 3 components, and scaling is applied to samples of Luma, Cr and Cb color components.

In yet another comp_scale_id value, hdr reconstruction process can utilize signaling for 4 components, 3 of which to be applied to Luma, Cr and Cb scaling, and 4th component to bring parameters of color correction.

In some examples, certain range of comp_scale_id values may be associated with HDR reconstruction conducted in SDR-backward compatible configuration, whereas another range of comp_scale_id values may be associated with HDR reconstruction conducted to non-backward compatible configuration.

Values of comp_scale_id from 0 to 255, inclusive, and from 512 to $2^{31}-1$, inclusive, may be used as determined by the application. Values of comp_scale_id from 256 to 511, inclusive, and from $2^{31}$ to $2^{32}-2$, inclusive, are reserved for future use by ITU-T| ISO/IEC. Decoders shall ignore all component scale information SEI messages containing a value of comp_scale_id in the range of 256 to 511, inclusive, or in the range of $2^{31}$ to $2^{32}-2$, inclusive, and bitstreams shall not contain such values.

NOTE 1—The comp_scale_id can be used to support component scaling processes that are suitable for different display scenarios. For example, different values of comp_scale_id may correspond to different display bit depths or different colour spaces in which the scaling is applied.

Alternatively, the comp_scale_id may also be used to identify whether the scaling is performed for compatibility to certain types of displays or decoder, e.g. HDR, SDR.

comp_scale_cancel_flag equal to 1 indicates that the component scaling information SEI message cancels the persistence of any previous component information SEI messages in output order that applies to the current layer. comp_scale_cancel_flag equal to 0 indicates that component scaling information follows.

comp_scale_persistence_flag specifies the persistence of the component scaling information SEI message for the current layer.

comp_scale_persistence_flag equal to 0 specifies that the component scaling information applies to the current decoded picture only.

Let picA be the current picture. comp_scale_persistence_flag equal to 1 specifies that the component scaling information persists for the current layer in output order until any of the following conditions are true:

A new CLVS of the current layer begins.

The bitstream ends.

A picture picB in the current layer in an access unit containing a component scaling information SEI message with the same value of comp_scale_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

comp_scale_scale_bit_depth specifies the number of bits used to signal the syntax element comp_scale_scale_val[c][i]. The value of comp_scale_scale_bit_depth shall be in the range of 0 to 15, inclusive.

comp_scale_offset_bit_depth specifies the number of bits used to signal the syntax elements comp_scale_global_offset_val[c] and comp_scale_offset_val[c][i]. The value of comp_scale_offset_bit_depth shall be in the range of 0 to 15, inclusive.

comp_scale_scale_frac_bit_depth specifies the number of LSBs used to indicate the fractional part of the scale parameter of the i-th partition of the c-th component. The value of comp_scale_scale_frac_bit_depth shall be in the range of 0 to 15, inclusive. The value of comp_scale_scale_frac_bit_depth shall be less than or equal to the value of comp_scale_scale_bit_depth.

comp_scale_offset_frac_bit_depth specifies the number of LSBs used to indicate the fractional part of the offset parameter of the i-th partition of the c-th component and global offset of the c-th component. The value of comp_scale_offset_frac_bit_depth shall be in the range of 0 to 15, inclusive. The value of comp_scale_offset_frac_bit_depth shall be less than or equal to the value of comp_scale_offset_bit_depth.

comp_scale_num_comps_minus1 plus 1 specifies the number of components for which the component scaling function is specified. comp_scale_num_comps_minus1 shall be in the range of 0 to 2, inclusive.

comp_scale_num_ranges[c] specifies the number of ranges in to which the output sample range is partitioned in to. The value of comp_scale_num_ranges[c] shall be in the range of 0 to 63, inclusive.

comp_scale_equal_ranges_flag[c] equal to 1 indicates that that output sample range is partitioned into comp_scale_num_ranges[c] nearly equal partitions, and the partition widths are not explicitly signaled. comp_scale_equal_ranges_flag[c] equal to 0 indicates that that output sample range may be partitioned into comp_scale_num_ranges[c] partitions not all of which are of the same size, and the partitions widths are explicitly signaled.

comp_scale_global_offset_val[c] is used to derive the offset value that is used to map the smallest value of the valid input data range for the c-th component. The length of comp_scale_global_offset_val[c] is comp_scale_offset_bit_depth bits.

comp_scale_scale_val[c][i] is used to derive the offset value that is used to derive the width of the of the i-th partition of the c-th component. The length of comp_scale_global_offset_val[c] is comp_scale_offset_bit_depth bits.

The variable CompScaleScaleVal[c][i] is derived as follows:

```
CompScaleScaleVal[ c ][ i ] = ( comp_scale_scale_val[ c ][ i ] >>
comp_scale_scale_frac_bit_depth ) +
              ( comp_scale_scale_val[ c ][ i ] &
              ( (1 << comp_scale_scale_frac_bit_depth ) - 1 )
) ÷
              (1 << comp_scale_scale_frac_bit_depth )
``` comp_scale_offset_val[c][i] is used to derive the offset value that is used to derive the width of the of the i-th partition of the c-th component. The length of comp_scale_global_offset_val[c] is comp_scale_offset_bit_depth bits.

When comp_scale_offset_val[c][i] is signaled, the value of CompScaleOffsetVal[c][i] is derived as follows:

```
CompScaleOffsetVal[ c ][ i ] = ( comp_scale_offset_val[ c ][ i ] >>
comp_scale_offset_frac_bit_depth ) +
              ( comp_scale_offset_val[ c ][ i ] &
              ( (1 << comp_scale_offset_frac_bit_depth ) - 1 )
) ÷
              (1 << comp_scale_offset_frac_bit_depth )
```

Alternatively, the variable CompScaleScaleVal[c][i] and CompScaleOffsetVal[c][i] are derived as follows:

```
    CompScaleScaleVal[ c ][ i ] = comp_scale_scale_val[ c ][ i ] ÷
              (1 << comp_scale_scale_frac_bit_depth )
CompScaleOffsetVal[ c ][ i ] = comp_scale_offset_val[ c ][ i ] ÷
              (1 << comp_scale_offset_frac_bit_depth )
```

When comp_scale_equal_ranges_flag[c] is equal to 1, comp_scale_offset_val[c][i] is not signaled, and the value of CompScaleOffsetVal[c][i] is derived as follows:

CompScaleOffsetVal[c][i]=1÷comp_scale_num_ranges[c]

The variable CompScaleOutputRanges[c][i] and CompScaleOutputRanges[c][i] for i in the range of 0 to comp_scale_num_ranges[c] is derived as follows:

```
for( i = 0; i <= comp_scale_num_ranges[ c ]; i++ )
  if( i == 0 )
    CompScaleOutputRanges[ c ][ i ] =
              comp_scale_global_offset_val[ c ] ÷
              (1 << comp_scale_offset_frac_bit_depth )
    CompScaleInputRanges[ c ][ i ] = 0
  else
    CompScaleInputRanges[ c ][ i ] = CompScaleOffsetInputRanges[ c ]
[ i - 1 ] +
              (CompScaleOffsetVal[ c ][ i - 1 ] *
CompScaleScaleVal[ c ][ i - 1 ]
    CompScaleOutputRanges[ c ][ i ] =
              CompScaleOutputRanges[ c ][ i - 1 ] +
              CompScaleOffsetVal[ c ][ i - 1 ]
```

In one alternative, the values of CompScaleOutputRanges[ ][ ] and CompScaleOutputRanges[ ][ ] are derived as follows:

```
for( i = 0; i <= comp_scale_num_ranges[ c ]; i++ )
  if( i == 0 )
    CompScaleInputRanges[ c ][ i ] =
              comp_scale_global_offset_val[ c ] ÷
              (1 << comp_scale_offset_frac_bit_depth )
    CompScaleOutputRanges[ c ][ i ] = 0
  else
    CompScaleInputRanges[ c ][ i ] = CompScaleOffsetInputRanges[ c ]
[ i - 1 ] +
              (CompScaleOffsetVal[ c ][ i - 1 ] *
CompScaleScaleVal[ c ][ i - 1 ]
    CompScaleOutputRanges[ c ][ i ] =
              CompScaleOutputRanges[ c ][ i - 1 ] +
              CompScaleOffsetVal[ c ][ i - 1 ]
```

The process of mapping an input signal representation (which may be used to cover both integer as well as floating point) x and an output signal representation y, where the sample values for both input representation is normalized in the range of 0 to 1, and output representation is in the range of and 0 to 1, is specified as follows:

```
if( x <= CompScaleInputRanges[ c ][ 0 ] )
    y = CompScaleOutputRanges[ c ][ 0 ]
else if( x > CompScaleInputRanges[ c ]
[ comp_scale_num_ranges[ c ] ] )
    y = CompScaleOutputRanges[ c ][ comp_scale_num_ranges[ c ]; ]
else
    for( i = 1; i <= comp_scale_num_ranges[ c ]; i++ )
        if( CompScaleInputRanges[ i - 1 ] < x && x <=
CompScaleInputRanges[ i ] )
            y = ( x -
CompScaleInputRanges[ i - 1 ] ) ÷ comp_scale_val[ c ][ i ] +
              CompScaleOutputRanges[ c ][ i - 1 ]
```

In one alternative, the value of CompScaleOutputRanges[c][0] is set based on the permitted sample value range.

Alternatively, the process of mapping an input value valIn to output value valOut is defined as follows:

```
m_pAtfRangeIn[ 0 ] = 0;
m_pAtfRangeOut[ 0 ] = -m_offset2 *m_pAtfScale2[c][0];
for (int j = 1; j < m_atfNumberRanges + 1; j++)
{
```

-continued

```
            m_pAtfRangeIn[ j ] = m_pAtfRangeIn[j - 1] + m_pAtfDelta[j - 1];
            m_pAtfRangeOut[ j ] = m_pAtfRangeOut[j - 1] + m_pAtfScale2[ c ][ j - 1 ] *
                m_pAtfDelta[ j - 1 ];
        }
        for (int j = 0; j < numRanges && skip = = 0; j++)
        {
            if (valIn <= pAtfRangeIn[ j + 1 ])
            {
                valOut = (valIn - pOffset[component][ j ]) * pScale[ component ][ j ];
                skip = 1;
            }
        ]
```

In one alternative, m_offset2 is equal to comp_scale_global_offset_val[c]☐☐ (1<<comp_scale_offset_frac_bit_depth), m_pAtfScale[c][i] is equal to CompScaleScaleVal[c][i] and m_pAtfDelta[i] is equal to CompScaleOffsetVal[c][i] for the c-th component, and pScale and pOffset are scale and offset parameter derived from m_AtfScale and m_pAtfDelta.

An inverse operation would be defined accordingly.

Example 6

In some examples, some of signaling methods described above, e.g., in example 5, can be utilized as shown in following pseudo code.

m_atfNumberRanges is a term for for syntax elements comp_scale_num_ranges[c] for a given c, that specifies number of dynamic range partitioning for mapped data.

m_pAtfRangeIn is a term for CompScaleInputRanges, is an arrays size of m_atfNumberRanges+1 that includes input sample value specifying the border between two concatenated partitions, e.g. i and i+1.

m_pAtfRangeOut is a term for CompScaleOutputRanges, is an arrays size of m_atfNumberRanges+1 that includes output sample value specifying the border between two concatenated partitions, e.g. i and i+1.

m_pAtfScale2 is a term for variable CompScaleScaleVal[c] is an arrays size of m_atfNumberRanges that includes scale values for each partitions.

m_pAtfOffset2 is an array arrays size of m atfNumberRanges that includes offset values for each partition.

m_offset2 is a term for comp_scale_global_offset_val.

In this example, parameters of piece-wise linear model can be determined form syntax elements as in Algorithm 1:

Algorithm 1:

```
m_pAtfRangeIn[0] = 0;
m_pAtfRangeOut[0] = -m_offset2 *m_pAtfScale2[c][0];
for (int j = 1; j < m_atfNumberRanges + 1; j++)
{
    m_pAtfRangeIn[j] = m_pAtfRangeIn[j - 1] + m_pAtfDelta[j - 1];
    m_pAtfRangeOut[j] = m_pAtfRangeOut[j - 1] + m_pAtfScale2[c][j - 1] * m_pAtfDelta[j - 1];
}
for (int j = 0; j < m_atfNumberRanges; j++)
{
    temp = m_pAtfRangeIn[j + 1] - m_pAtfRangeOut[j + 1]/ m_pAtfScale2[c][j];
    m_pAtfOffset2[c][j] = temp;
}
```

Once determined, piece-wise linear model can be applied to input samples value inValue to determine output sample value outValue as in Algorithm 2:

Algorithm 2:

```
for (int j = 0; j < m_atfNumberRanges && skip == 0; j++)
{
    if (inValue <= m_pAtfRangeIn[j + 1])
    {
        outValue = (inValue - m_pAtfOffset2 [j]) * m_pAtfScale2 [j];
        skip = 1;
    }
}
```

Inverse process to be conducted as in Algorithm 3:

Algorithm 3:

```
for (int j = 0; j < m_atfNumberRanges && skip == 0; j++)
{
    if (inValue <= m_pAtfRangeOut[j + 1])
    {
        outValue = inValue / m_pAtfScale2 [j] + m_pAtfOffset2 [j];
        skip = 1;
    }
}
```

In some examples, border sample value (an entry of m_pAtfRangeIn or m_pAtfRangeOut) between two concatenated partitions i and i+1 can be interpreted differently, as belonging to i+1, instead of belonging to i partition as it is shown in Algorithm 2 and 3.

In some examples, inverse process shown in Algorithm 3, can be implemented with a multiplication by m_pAtfInverseScale2 value, instead of division by m_pAtfScale2[j]. In such examples, a value of m_pAtfScale2[j] is determined from m_pAtfScale2 [j] in advance.

In some examples, m_pAtfInverseScale2 [j] is determined at the decoder side as 1/m_pAtfScale2[j].

In some examples, m_pAtfInverseScale2 [j] can be computed at the encoder side, and signaled through bitstream. In such examples, operation given in Algorithms 1, 2 and 3 will be adjusted accordingly.

VARIOUS EXAMPLES

In some examples, proposed signaling mechanism can be used to model a piece-wise function that can be utilized to enable dynamical range adjustment for samples of input signal, e.g. to improve compression efficiency of video coding systems.

In some examples, proposed signaling mechanism can be used to model a piece-wise function that can be applied to codewords (non-linear representation of R,G,B samples) produced by an OETF, e.g. by PQ TF of ST.2084, or others.

In some examples, proposed signaling mechanism can be used to model a piece-wise function that can be applied to samples of YCbCr colors.

In some examples, proposed signaling mechanism can be used to model a piece-wise function that can be utilized to HDR/WCG solutions with SDR compatibility.

In some examples, proposed signaling mechanism can be used to model a piece-wise function that can be applied to samples in floating point representation. In yet another example, proposed signaling mechanism and resulting function can be applied to samples in integer representation, e.g. 10 bits.

In some examples, proposed signaling mechanism can be used to model a piece-wise function that can be applied to samples in a form of Look Up Tables. In yet another examples, proposed signaling can be used to model function that can be applied to a sample in a form of multiplier.

Combinations and Extensions

In the examples above, a linear model is assumed for each region (i.e., scale plus offset); the techniques of this disclosure also may be applicable for higher-order polynomial models, for example, with a polynomial of 2nd degree requiring three parameters instead of two. The signaling and syntax would be properly extended for this scenario.

Combinations of aspects described above are possible and part of the techniques of this disclosure.

Toolbox combination: there are several HDR methods that can target somewhat similar goals to those of the SEIs described in this disclosure. In order to accommodate more than one of them but, at the same time, limiting the number of applicable SEI processing per frame, it is proposed to combine (one or more of) these methods in a single SEI. A proposed syntax element would indicate the specific method to apply in each instance. For example, if there are two possible methods in the SEI, the syntax element would be a flag indicating the one to be used.

Example 7

In this example, the signaling of scale parameters is modified such that negative scales can be transmitted, and the signaled scale parameters indicate the variation of scale to be applied for different ranges of the various components. The changes with respect to example 5 are below.

Changes to Syntax of the SEI Message

| component_scale_info( payloadSize ) { | Descriptor |
|---|---|
| comp_scale_id | ue(v) |
| comp_scale_cancel_flag | u(1) |
| if( !comp_scale_cancel_flag ) { | |
|   comp_scale_persistence_flag | u(1) |
|   comp_scale_scale_bit_depth | u(4) |
|   comp_scale_offset_bit_depth | u(4) |
|   comp_scale_scale_frac_bit_depth | u(4) |
|   comp_scale_offset_frac_bit_depth | u(4) |
|   comp_scale_negative_scales_present_flag | u(1) |
|   comp_scale_dep_component_id | ue(v) |
|   comp_scale_num_comps_minus1 | ue(v) |
|   for( c = 0; c <= comp_scale_num_comps_minus1; c++ ) { | |
|     comp_scale_num_ranges[ c ] | ue(v) |
|     comp_scale_equal_ranges_flag[ c ] | u(1) |
|     comp_scale_global_offset_val[ c ] | u(v) |
|     for( i = 0; i <= comp_scale_num_ranges[ c ]; i++ ) | |
|       comp_scale_scale_val[ c ][ i ] | u(v) |
|     if( !comp_scale_equal_ranges[ c ] ) | u(v) |
|       for( i = 0; i <= comp_scale_num_ranges[ c ]; i++ ) | |
|         comp_scale_offset_val[ c ][ i ] | u(v) |
|   } | |
| } | |

Changes to Semantics of the SEI Message comp_scale_negative_scales_present_flag equal to 1 specifies that the integer part of the scale parameters derived from comp_scale_scale_val[c][i] is represented as a signed integer. comp_scale_negative_scales_present_flag equal to 0 specifies that the integer part scale parameters derived from comp_scale_scale_val[c][i] is represented as an unsigned integer.

In one alternative, another set of offset parameters are signaled along with comp_scale_scale_val that are used to define the offset that is applied along with the scale on a first component as a function of the value of a second component.

The signed-integer representation includes, but is not limited to, twos-complement notation and signed magnitude representation (one bit for sign and the remaining bits in the integer-part). The derivation below is given for the signed magnitude representation. The derivation can be similarly defined for other forms of signed representations.

The variable CompScaleScaleVal[c][i] is derived as follows:

```
compScaleScaleFracPart = ( comp_scale_scale_val[ c ][ i ] &
                         ( (1 << comp_scale_scale_frac_bit_depth ) - 1 )
) ÷
                         (1 << comp_scale_scale_frac_bit_depth )
if( comp_scale_negative_scales_present_flag ) {
  compScaleSignPart = comp_scale_scale_val[ c ][ i ] >>
(comp_scale_scale_bit_depth - 1)
  compScaleIntegerPart = comp_scale_scale_val[ c ][ i ] -
                         ( compScaleSignPart <<
                         (comp_scale_scale_bit_depth - 1) )
  compScaleIntegerVal = ( ( compScaleSignPart = = 1 ) : -1 : 1 ) *
compScaleIntegerPart
} else
  compScaleIntegerVal = comp_scale_scale_val[ c ][ i ] >>
comp_scale_scale_frac_bit_depth
CompScaleScaleVal[ c ][ i ] =
compScaleIntegerVal + compScaleScaleFracPart
```

It is a requirement of bitstream conformance that when comp_scale_negative_scale_present_flag is equal to 1, the value of comp_scale_scale_bit_depth shall be greater than or equal to comp_scale_scale_frac_bit_depth comp_scale_dependent_component_id specifies the application of scale and offset parameters to the various components of the video. When comp_scale_dependent_component_id is equal to 0, the syntax elements comp_scale_global_offset_val[c], comp_scale_scale_val[c][i] and comp_scale_offset_val[c][i] are used to identify mapping of input and output values of the c-th component. When comp_scale_dependent_component_id is greater than 0, comp_scale_dependent_component_id−1 specifies the index of the component such that the syntax elements comp_scale_global_offset_val[c], comp_scale_scale_val[c][i] and comp_scale_offset_val[c][i] specify the mapping of a scale parameter to be applied to the c-th component of a sample as a function of the value of (comp_scale_dependent_component_id−1)-th component of the sample.

The rest of the semantics is similar to those described in example 5.

Example 8

In this example, the bit depth of the ATF parameters depend on the component. For each component, the bit depth of the syntax elements is explicitly signal. In addition, there are default bit-depth for those syntax elements. The default value is assigned when the bit depth is not explicitly signaled. A flag might indicate whether the default values are applied or they are explicitly signaled.

The table below shows an example of these concepts. Syntax elements of the ATF parameters are the scale hdr_recon_scale_val[ ][ ] and range hdr_recon_range_val[ ][ ]. The syntax elements indicating the corresponding bit depth (integer and fractional part) are the following ones:

hdr_recon_scale_bit_depth[c],
hdr_recon_offset_bit_depth[c],
hdr_recon_scale_frac_bit_depth[c],
hdr_recon_offset_frac_bit_depth[c], where c is the component index. The default bit-depths for scale and offset (range) can be set to:

hdr_recon_scale_bit_depth[c]=8,
hdr_recon_offset_bit_depth[c]=8,
hdr_recon_scale_frac_bit_depth[c]=6,
hdr_recon_offset_frac_bit_depth[c]=8.

The accuracy of the parameters might also be different for the ATF parameters and the color adjustment parameters. Also, the default might be different per component and for the color adjustment parameters. In this example, the defaults are assumed to be the same.

| hdr_reconstruction_info( payloadSize ) { | Descriptor |
| --- | --- |
| hdr_recon_id | ue(v) |
| hdr_recon_cancel_flag | u(1) |
| if( !hdr_recon_cancel_flag ) { | |
|   hdr_recon_persistence_flag | u(1) |
|   if (hdr_recon_id = = 1 ) { | |
|     hdr_output_full_range_flag | |
|     hdr_output_colour_primaries | |
|     hdr_output_transfer_characteristics | |
|     hdr_output_matrix_coeffs | |
|   } | |
| SYNTAX FOR THE MAPPING LUTs | |
|   hdr_recon_num_comps_minus1 | ue(v) |
|   for( c = 0; c <= hdr_recon_num_comps_minus1; c++ ) | |
|   { | |
|     hdr_recon_default_bit_depth [ c ] | u(1) |
|     if ( hdr_recon_default_bit_depth [ c ] == 0) { | |
|       hdr_recon_scale_bit_depth[ c ] | u(4) |
|       hdr_recon_offset_bit_depth[ c ] | u(4) |
|       hdr_recon_scale_frac_bit_depth[ c ] | u(4) |
|       hdr_recon_offset_frac_bit_depth[ c ] | u(4) |
|     } | |
|     hdr_recon_num_ranges[ c ] | ue(v) |
|     hdr_recon_equal_ranges_flag[ c ] | u(1) |
|     hdr_recon_global_offset_val[ c ] | u(v) |
|     for( i = 0; i <= hdr_recon_num_ranges[ c ]; i++ ) | |
|       hdr_recon_scale_val[ c ][ i ] | u(v) |
|     if( !hdr_recon_equal_ranges[ c ] ) | u(v) |
|     for( i = 0; i <= hdr_recon_num_ranges[ c ]; i++ ) | |
|       hdr_recon_range_val [ c ][ i ] | u(v) |
|   } | u(v) |
| SYNTAX FOR THE COLOR CORRECTION PART | |
| if (hdr_recon_id = = 1 ) { | Params related to Colour correction |
|   hdr_ color_correction_type | 0: on U, V-1: on R, G, B |
|   hdr_color_accuracy_flag | Syntax for coding the colour correction LUT |
|   if( ! hdr_recon_color_accuracy_flag ) { | |
|     hdr_color _scale_bit_depth | u(4) |
|     hdr_color _offset_bit_depth | u(4) |
|     hdr_color _scale_frac_bit_depth | u(4) |
|     hdr_color _offset_frac_bit_depth | u(4) |
|   } | |
|   color_correction_num_ranges | |
|   color_correction_equal_len_ranges_flag | |
|   color_correction_zero_offset_val | |
|   for( i = 0; i < color_correction_num_ranges; i++ ) | |
|     color_correction_scale_val[ i ] | |
|   if( ! color_correction_equal_len_ranges_flag ) | |
|   for( i = 0; i < color_correction_num_ranges; i++ ) | |
|     color_correction_range_val[ i ] | |
|   } | |
| } | |
| } | |
| } | |

Example 9

A desirable property of a new HDR solution is that it is backward compatible to previous HDR solutions, like HDR10. A syntax element may indicate that this is the case. This indicates a characteristic of the bitstream, and an HDR decoder might decide not to spend computational resources on the inverse ATF processing under some circumstances if the non ATF version is already viewable.

In one example, some values of the hdr_recon_id syntax element are reserved to indicate HDR10 backward compatibility, or to what degree there is backward compatibility.

In another example, a flag (hdr_recon_hdr10_bc) indicates this situation.

In one example, the signaled HDR10 backward compatibility indicates that the bitstream is viewable. Alternatively, it might indicate some specific properties of the signaled values: for example, that they are a range of values that guarantees this property. For instance, a constraint could be that the scale is between 0.9 and 1.1.

Figure 12:
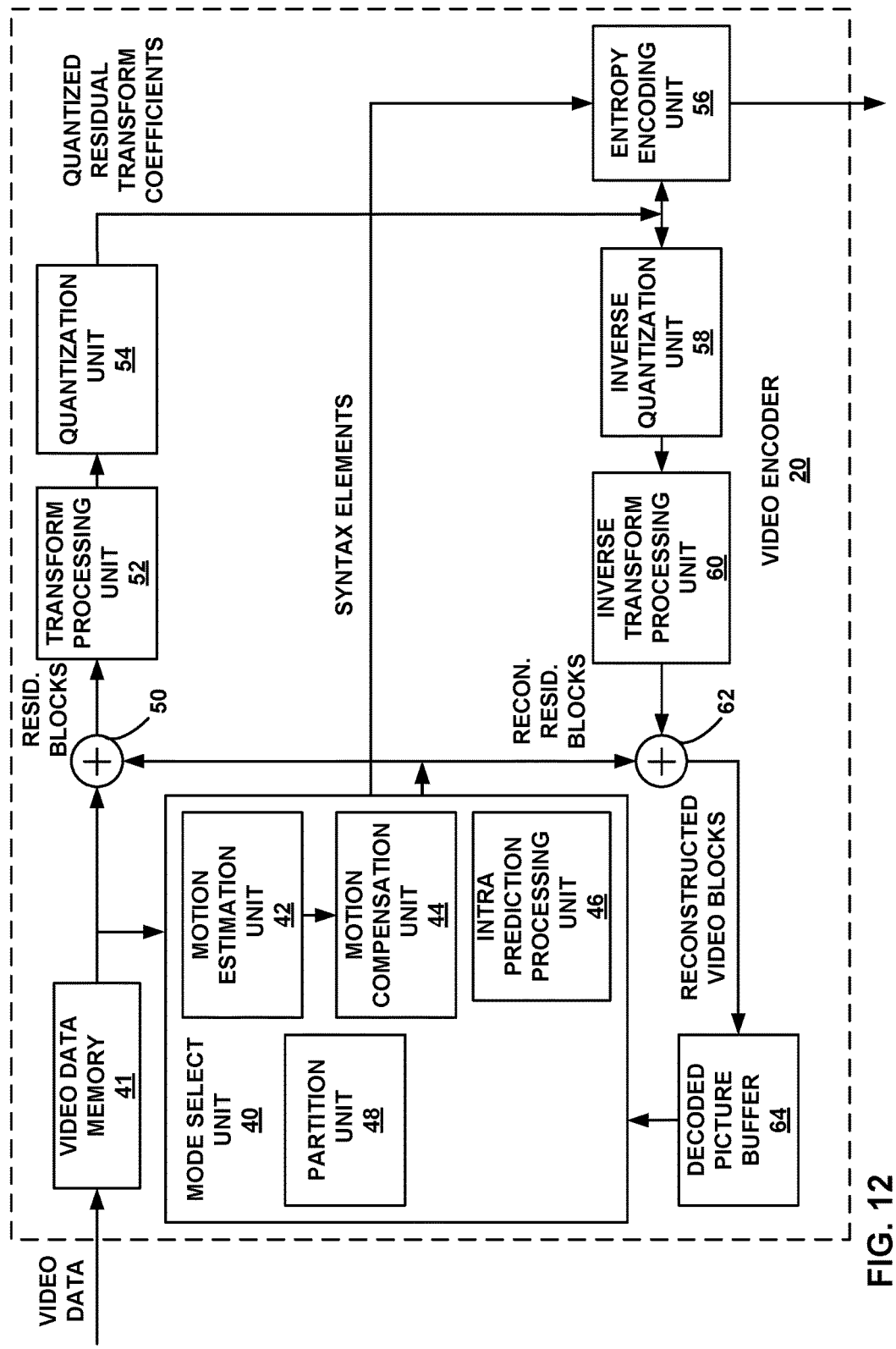
FIG. 12 is a block diagram illustrating an example of a video encoder that may implement techniques of this disclosure or may be used in accordance with one or more aspects of the present disclosure.

FIG. 12 is a block diagram illustrating an example of video encoder 20 that may implement the techniques of this disclosure. Video encoder 20 may perform intra- and inter-coding of video blocks within video slices in a target color representation that have been processed by video preprocessor 19. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 12, video encoder 20 receives a current video block within a video frame to be encoded. In the example of FIG. 12, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 12) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Video data memory 41 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and decoded picture buffer 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

Figure 13:
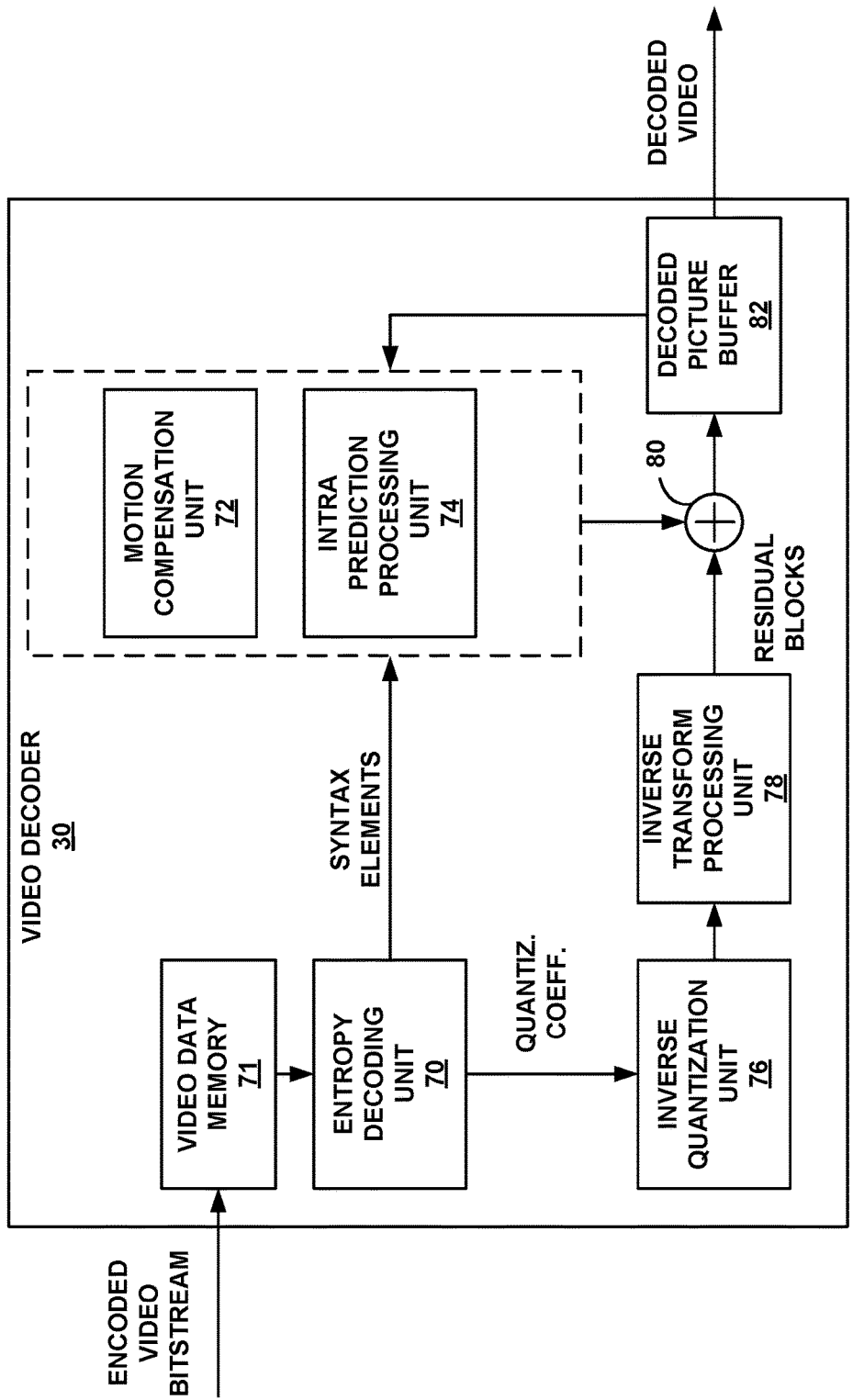
FIG. 13 is a block diagram illustrating an example of a video decoder that may implement techniques of this disclosure or may be used in accordance with one or more aspects of the present disclosure.

FIG. 13 is a block diagram illustrating an example of video decoder 30 that may implement the techniques of this disclosure. In particular, video decoder 30 may decode video data into a target color representation that may then be processed by video postprocessor 31, as described above. In the example of FIG. 13, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 (FIG. 12). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Video data memory 71 and decoded picture buffer 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71 and decoded picture buffer 82 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Figure 14:
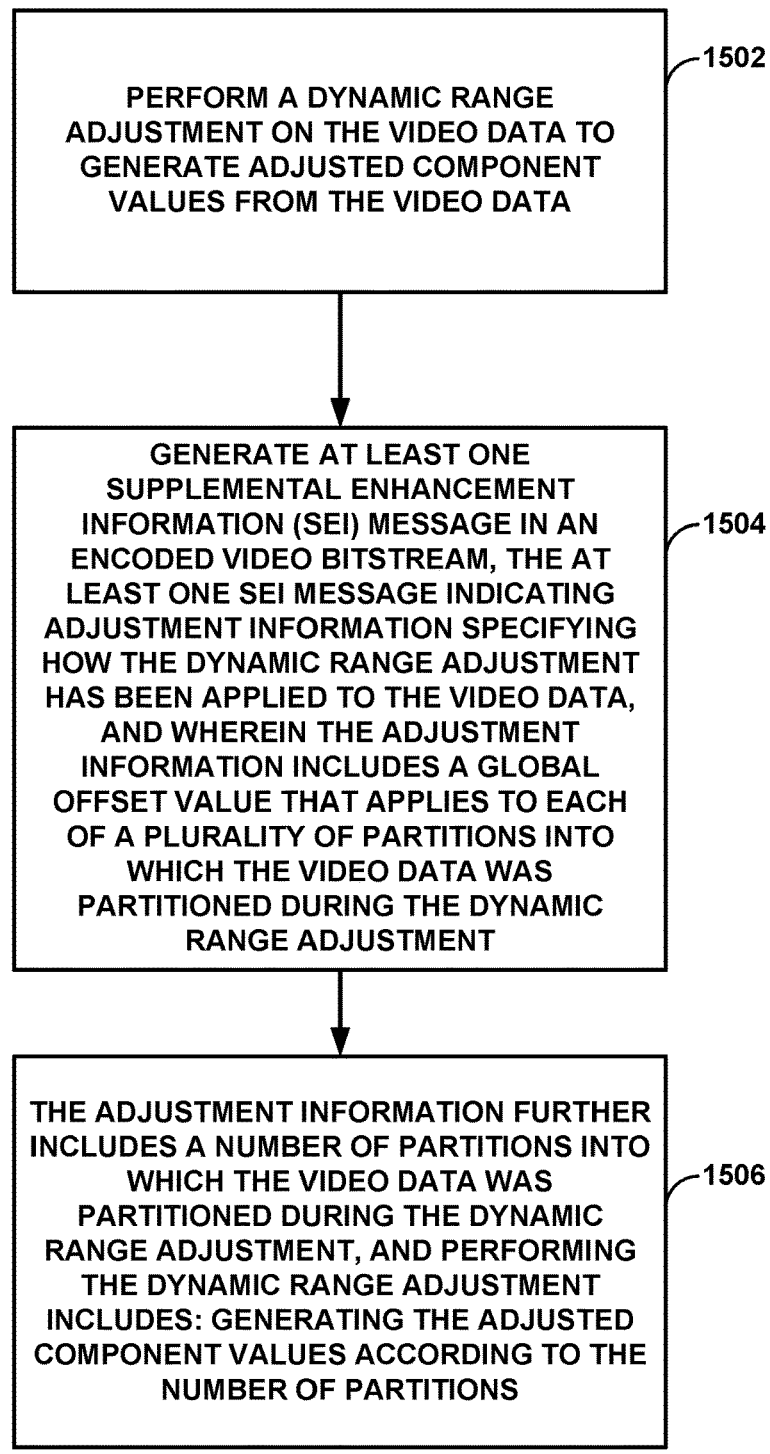
FIG. 14 is a flowchart illustrating an example HDR/WCG conversion process according to the techniques of this disclosure.

FIG. 14 is a flowchart illustrating an example HDR/WCG conversion process according to the techniques of this disclosure. The techniques of FIG. 14 may be executed by source device 12 of FIG. 1, including one or more of video preprocessor 19 and/or video encoder 20.

In one example of the disclosure, source device 12 may be configured to encode video data. Such a device may perform a dynamic range adjustment on the video data to generate adjusted component values from the video data (1502), and signal at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment (1504). In the example of FIG. 14, the video data is input video data prior to video encoding. In some other examples, the source device may signal at least one SEI message in an encoded video bitstream, the at least one SEI message indicating adjustment information specifying how the inverse dynamic range adjustment is to be applied on the video data by a decoder, and wherein the adjustment information includes a global offset value that applies to each of a plurality of partitions into which the video data is to be partitioned during the dynamic range adjustment (1504).

In some examples, the global offset value is a first global offset value, the first global offset value being substituted, prior to performing the dynamic range adjustment on the video data, for unadjusted component values less than the first global offset value, wherein the adjustment information further includes a second global offset value, and wherein performing the dynamic range adjustment on the video data includes: mapping component values matching the first global offset value to the second global offset value.

In other examples, the adjustment information further includes a number of partitions into which the video data was partitioned during the dynamic range adjustment, a scale and a local offset value for one or more partitions, and wherein performing the dynamic range adjustment includes: generating the adjusted component values according to the number of partitions, and scale and local offsets for one or more partitions (1506).

Figure 15:
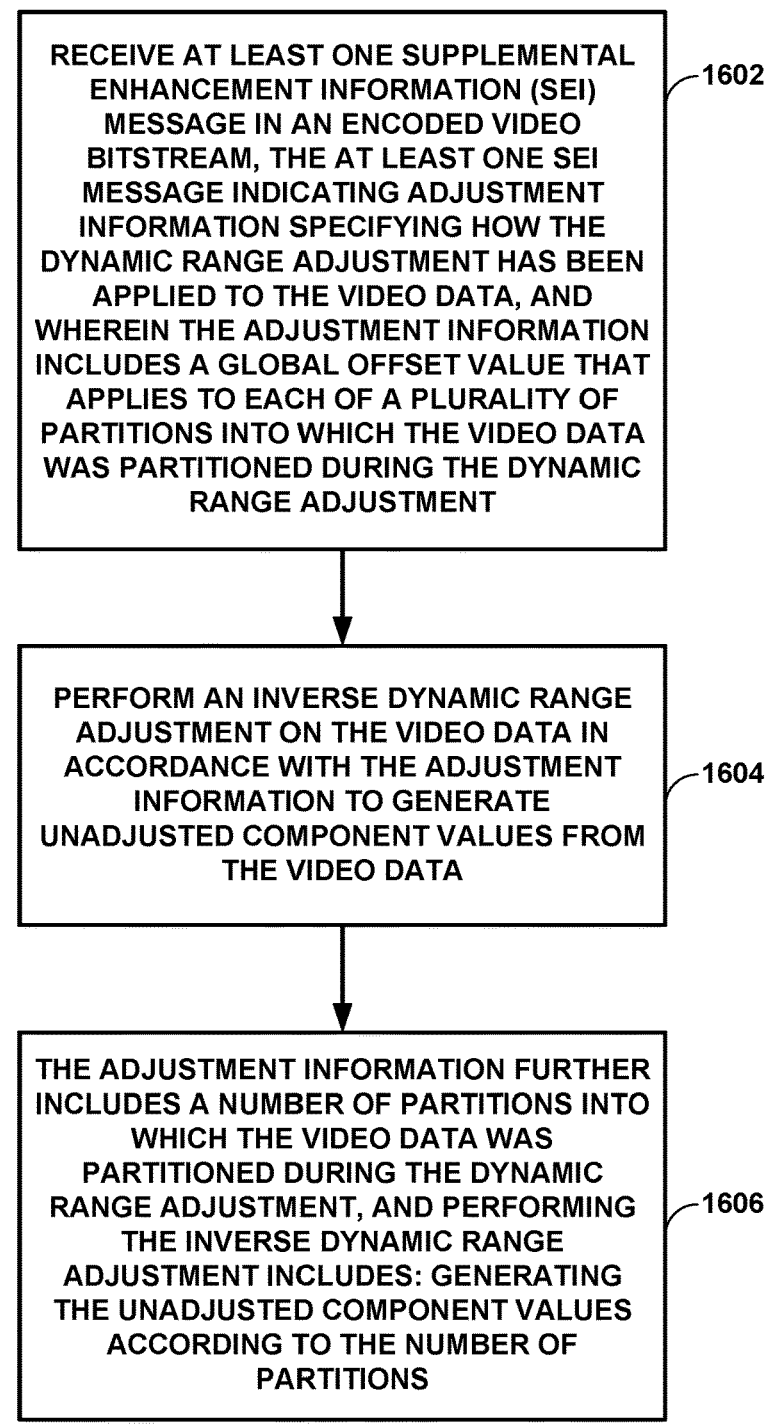
FIG. 15 is a flowchart illustrating an example HDR/WCG inverse conversion process according to the techniques of this disclosure.

FIG. 15 is a flowchart illustrating an example HDR/WCG inverse conversion process according to the techniques of this disclosure. The techniques of FIG. 15 may be executed by destination device 14 of FIG. 1, including one or more of video postprocessor 31 and/or video decoder 30.

In one example of the disclosure, destination device 14 may be configured to decode video data that has been adjusted by performing a dynamic range adjustment. Such a device may receive at least one supplemental enhancement information (SEI) message in an encoded video bitstream, the at least one SEI message indicating adjustment information specifying how the dynamic range adjustment has been applied to the video data, and wherein the adjustment information includes a global offset value that applies to each of a plurality of partitions into which the video data was partitioned during the dynamic range adjustment (1602), and perform an inverse dynamic range adjustment on the video data in accordance with the adjustment information to generate unadjusted component values from the video data (1604). In the example of FIG. 15, the video data is decoded video data. In other examples, device may receive at least one supplemental enhancement information (SEI) message in an encoded video bitstream, the at least one SEI message indicating adjustment information specifying how the dynamic range adjustment is to be applied to the video data, and wherein the adjustment information includes a global offset value that applies to each of a plurality of partitions into which the video data is to be partitioned during the inverse dynamic range adjustment (1604), and perform an inverse dynamic range adjustment on the video data in accordance with the adjustment information to generate unadjusted component values from the video data (1604).

In some examples, the global offset value is a first global offset value, the first global offset value being substituted, prior to performing the dynamic range adjustment on the video data, for unadjusted component values less than the first global offset value, wherein the adjustment information further includes a second global offset value, and wherein performing the inverse dynamic range adjustment on the video data includes: mapping component values matching the second global offset value to the first global offset value.

In other examples, the adjustment information further includes a number of partitions into which the video data was partitioned during the dynamic range adjustment, and a scale and local offset for one or more partitions and wherein performing the inverse dynamic range adjustment includes: generating the unadjusted component values according to the number of partitions and the scale and offset for one or more partitions (1606).

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples may be within the scope of the following claims.

What is claimed is:

1. A method of decoding video data that has been adjusted by performing a dynamic range adjustment, the method comprising:
receiving at least one syntax structure from an encoded video bitstream, the at least one syntax structure indicating adjustment information specifying how the dynamic range adjustment has been applied to the video data, and wherein the adjustment information includes:
  a global offset value that applies to each of one or more partitions into which the video data was partitioned during the dynamic range adjustment, and
  a number of partitions into which the video data was partitioned during the dynamic range adjustment; and performing an inverse dynamic range adjustment on the video data in accordance with the adjustment information to generate unadjusted component values from the video data, wherein performing the inverse dynamic range adjustment includes generating the unadjusted component values according to the number of partitions.

2. The method of claim 1,
wherein the global offset value is a first global offset value, the first global offset value being substituted, prior to performing the dynamic range adjustment on the video data, for unadjusted component values less than the first global offset value,
wherein the adjustment information further includes a second global offset value; and
wherein performing the inverse dynamic range adjustment on the video data includes:
mapping component values matching the second global offset value to the first global offset value.

3. The method of claim 1,
wherein the global offset value is a first global offset value, the first global offset value being substituted, prior to performing the dynamic range adjustment on the video data, for unadjusted component values less than the first global offset value, and
wherein performing the inverse dynamic range adjustment on the video data includes:
deriving a second global offset value from one or more of metadata, video usability information, a video parameter set, a sequence parameter set, a picture parameter, a slice header, or a CTU header; and
mapping component values matching the second global offset value to the first global offset value.

4. The method of claim 1,
wherein the global offset value is a first global offset value,
wherein performing the inverse dynamic range adjustment on the video data includes:
deriving a second global offset value from one or more of metadata, video usability information, a video parameter set, a sequence parameter set, a picture parameter, a slice header, or a CTU header, wherein the second global offset value is a value that was substituted, prior to performing the dynamic range adjustment on the video data, for unadjusted component values less than the second global offset value,
mapping component values matching the first global offset value to the second global offset value.

5. The method of claim 1, further comprising:
deriving additional adjustment information from at least the global offset value, the additional adjustment information further specifying how the dynamic range adjustment has been applied to the video data.

6. The method of claim 1, wherein the adjustment information specifies one partition, and wherein the one partition applies to all components.

7. The method of claim 1, wherein the video data includes luma components and chroma components, wherein the adjustment information includes a first number of partitions into which the luma components were partitioned during the dynamic range adjustment, a second number of partitions into which a first set of the chroma components were partitioned during the dynamic range adjustment, and a third number of partitions into which a second set of the chroma components were partitioned during the dynamic range adjustment, and wherein performing the inverse dynamic range adjustment includes:
generating unadjusted luma component values according to the first number of partitions;
generating unadjusted chroma component values corresponding to the first set of chroma components according to the second number of partitions; and
generating unadjusted chroma component values corresponding to the second set of chroma components according to the third number of partitions.

8. The method of claim 7, wherein the second number of partitions is different than the first number of partitions, and wherein one of the second number of partitions is a neutral chroma partition that is smaller than any other partition in the second number of partitions.

9. The method of claim 1, wherein the video data includes red, green, and blue components, wherein the adjustment information includes a first number of partitions into which the red components were partitioned during the dynamic range adjustment, a second number of partitions into which the green components were partitioned during the dynamic range adjustment, and a third number of partitions into which the blue components were partitioned during the dynamic range adjustment, and wherein performing the inverse dynamic range adjustment includes:
generating unadjusted red component values according to the first number of partitions;
generating unadjusted green component values according to the second number of partitions; and
generating unadjusted blue component values according to the third number of partitions.

10. The method of claim 1, wherein the number of partitions is represented as a logarithm of a function of the number of partitions.

11. The method of claim 1, further comprising:
deriving additional adjustment information from the at least one syntax structure, the additional adjustment information further specifying how the dynamic range adjustment has been applied to the video data.

12. The method of claim 1, wherein performing the inverse dynamic range adjustment on the video data includes:
determining for each input sample for each component of the video data, a partition to which the input sample belongs, and
generating, for each of the partitions, the unadjusted component values.

13. The method of claim 12, wherein the adjustment information further includes a local offset value and a local scale value for each of the partitions, and wherein generating the unadjusted component values includes:
generating the unadjusted component values according to the local offset value and the local scale value.

14. The method of claim 13, wherein the local offset value for each of the partitions is represented by a first number of bits and a second number of bits, wherein the first number of bits is used to represent an integer part of the local offset value and the second number of bits is used to represent a fractional part of the local offset value, wherein the adjustment information further includes the first number of bits and the second number of bits, and
wherein performing the inverse dynamic range adjustment on the video data includes:
generating the unadjusted component values according to the local offset value for each of the partitions as represented by the first number of bits and the second number of bits.

15. The method of claim 13, wherein the local scale value for each of the partitions is represented by a first number of bits and a second number of bits, wherein the first number of bits is used to represent an integer part of the local scale value and the second number of bits is used to represent a fractional part of the local scale value, wherein the adjustment information further includes the first number of bits and the second number of bits, and
wherein performing the inverse dynamic range adjustment on the video data includes:
generating the unadjusted component values according to the local scale value for each of the partitions as represented by the first number of bits and the second number of bits.

16. The method of claim 15, wherein the integer part of the scale value is represented in one of a signed magnitude format or two's complement notation.

17. The method of claim 13,
wherein the local scale value for each of the partitions is a first component local scale value for each of the partitions,
wherein the adjustment information further includes a second component local scale value for each of the partitions,
wherein the first component local scale value for each of the partitions is represented by a first number of bits, wherein the second component local scale value for each of the partitions is represented by a second number of bits,
wherein the adjustment information further includes the first number of bits and the second number of bits, the second number of bits being different than the first number of bits, and
wherein performing the inverse dynamic range adjustment on the video data includes:
generating first component unadjusted component values according to the first component local scale value for each of the partitions; and
generating second component unadjusted component values according to the second component local scale value for each of the partitions.

18. The method of claim 13,
wherein the local offset value for each of the partitions is a first component local offset value for each of the partitions,
wherein the adjustment information further includes a second component local offset value for each of the partitions,
wherein the first component local offset value for each of the partitions is represented by a first number of bits, wherein the second component local offset value for each of the partitions is represented by a second number of bits,
wherein the adjustment information further includes the first number of bits and the second number of bits, the second number of bits being different than the first number of bits, and wherein performing the inverse dynamic range adjustment on the video data includes:
generating first component unadjusted component values according to the first component local offset value for each of the partitions; and
generating second component unadjusted component values according to the second component local offset value for each of the partitions.

19. The method of claim 1, wherein the adjustment information indicates whether the partitions are of equal size.

20. The method of claim 1, wherein the adjustment information includes, for each of the partitions, a scale value and a size value.

21. The method of claim 1, further comprising:
displaying the dynamic range adjusted video data on a display device.

22. A method of encoding video data comprising:
performing a dynamic range adjustment on the video data to generate adjusted component values from the video data; and
generating at least one syntax structure in an encoded video bitstream, the at least one syntax structure indicating adjustment information specifying how the dynamic range adjustment has been applied to the video data, and
wherein the adjustment information includes:
a global offset value that applies to each of one or more partitions into which the video data was partitioned during the dynamic range adjustment, and
a number of partitions into which the video data was partitioned during the dynamic range adjustment, and
wherein performing the dynamic range adjustment includes generating the adjusted component values according to the number of partitions.

23. The method of claim 22,
wherein the global offset value is a first global offset value, the first global offset value being substituted, prior to performing the dynamic range adjustment on the video data, for unadjusted component values less than the first global offset value,
wherein the adjustment information further includes a second global offset value; and
wherein performing the dynamic range adjustment on the video data includes:
mapping component values matching the first global offset value to the second global offset value.

24. The method of claim 22,
wherein the global offset value is a first global offset value, the first global offset value being substituted, prior to performing the dynamic range adjustment on the video data, for unadjusted component values less than the first global offset value, and
wherein performing the dynamic range adjustment on the video data includes:
generating a second global offset value in one or more of metadata, video usability information, a video parameter set, a sequence parameter set, a picture parameter, a slice header, or a CTU header; and
mapping component values matching the first global offset value to the second global offset value.

25. The method of claim 22,
wherein the global offset value is a first global offset value,
wherein performing the dynamic range adjustment on the video data includes:

generating a second global offset value in one or more of metadata, video usability information, a video parameter set, a sequence parameter set, a picture parameter, a slice header, or a CTU header, wherein the second global offset value is a value that was substituted, prior to performing the dynamic range adjustment on the video data, for unadjusted component values less than the second global offset value, mapping component values matching the first global offset value to the second global offset value.

26. The method of claim 22, further comprising:
generating additional adjustment information based on the global offset value, the additional adjustment information further specifying how the dynamic range adjustment has been applied to the video data.

27. The method of claim 25, wherein the adjustment information specifies one partition, and wherein the one partition applies to all components.

28. The method of claim 22, wherein the video data includes luma components and chroma components, wherein the adjustment information includes a first number of partitions into which the luma components were partitioned during the dynamic range adjustment, a second number of partitions into which a first set of the chroma components were partitioned during the dynamic range adjustment, and a third number of partitions into which a second set of the chroma components were partitioned during the dynamic range adjustment, and wherein performing the dynamic range adjustment includes:
generating adjusted luma component values according to the first number of partitions;
generating adjusted chroma component values corresponding to the first set of chroma components according to the second number of partitions; and
generating adjusted chroma component values corresponding to the second set of chroma components according to the third number of partitions.

29. The method of claim 28, wherein the second number of partitions is different than the first number of partitions, and wherein one of the second number of partitions is a neutral chroma partition that is smaller than any other partition in the second number of partitions.

30. The method of claim 22, wherein the video data includes red, green, and blue components, wherein the adjustment information includes a first number of partitions into which the red components were partitioned during the dynamic range adjustment, a second number of partitions into which the green components were partitioned during the dynamic range adjustment, and a third number of partitions into which the blue components were partitioned during the dynamic range adjustment, and wherein performing the dynamic range adjustment includes:
generating adjusted red component values according to the first number of partitions;
generating adjusted green component values according to the second number of partitions; and
generating adjusted blue component values according to the second number of partitions.

31. The method of claim 22, wherein the number of partitions is represented as a logarithm of a function of the number of partitions.

32. The method of claim 22, further comprising:
generating additional adjustment information based on the number of partitions, the additional adjustment information further specifying how the dynamic range adjustment has been applied to the video data.

33. The method of claim 25, wherein performing the dynamic range adjustment on the video data includes:
determining for each input sample for each component of the video data, a partition to which the input sample belongs; and
generating, for each of the partitions, the adjusted component values.

34. The method of claim 33, wherein the adjustment information further includes a local offset value and a local scale value for each of the partitions, and wherein performing the dynamic range adjustment on the video data includes:
generating the adjusted component values according to the local offset value and the local scale value.

35. The method of claim 34, wherein the local offset value for each of the partitions is represented by a first number of bits and a second number of bits, wherein the first number of bits is used to represent an integer part of the local offset value and the second number of bits is used to represent a fractional part of the local offset value, wherein the adjustment information further includes the first number of bits and the second number of bits, and
wherein performing the dynamic range adjustment on the video data includes:
generating the adjusted component values according to the local offset value for each of the partitions as represented by the first number of bits and the second number of bits.

36. The method of claim 34, wherein the local scale value for each of the partitions is represented by a first number of bits and a second number of bits, wherein the first number of bits is used to represent an integer part of the local scale value and the second number of bits is used to represent a fractional part of the local scale value, wherein the adjustment information further includes the first number of bits and the second number of bits, and
wherein performing the dynamic range adjustment on the video data includes:
generating the adjusted component values according to the local scale value for each of the partitions as represented by the first number of bits and the second number of bits.

37. The method of claim 36, wherein the integer part of the scale value is represented in one of a signed magnitude format or two's complement notation.

38. The method of claim 34,
wherein the local scale value for each of the partitions is a first component local scale value for each of the partitions,
wherein the adjustment information further includes a second component local scale value for each of the partitions,
wherein the first component local scale value for each of the partitions is represented by a first number of bits, wherein the second component local scale value for each of the partitions is represented by a second number of bits,
wherein the adjustment information further includes the first number of bits and the second number of bits, the second number of bits being different than the first number of bits, and
wherein performing the dynamic range adjustment on the video data includes:
generating first component adjusted component values according to the first component local scale value for each of the partitions; and generating second component adjusted component values according to the second component local scale value for each of the partitions.

39. The method of claim 34,
wherein the local offset value for each of the partitions is a first component local offset value for each of the partitions,
wherein the adjustment information further includes a second component local offset value for each of the partitions,
wherein the first component local offset value for each of the partitions is represented by a first number of bits, wherein the second component local offset value for each of the partitions is represented by a second number of bits,
wherein the adjustment information further includes the first number of bits and the second number of bits, the second number of bits being different than the first number of bits, and
wherein performing the dynamic range adjustment on the video data includes:
generating first component adjusted component values according to the first component local offset value for each of the partitions; and
generating second component adjusted component values according to the second component local offset value for each of the partitions.

40. The method of claim 22, wherein the adjustment information indicates whether the partitions are of equal size.

41. The method of claim 22, wherein the adjustment information includes, for each of the partitions, a scale value and a size value.

42. An apparatus configured to decode video data that has been adjusted by performing a dynamic range adjustment, the apparatus comprising:
a memory configured to store the video data; and
one or more processors configured to:
receive at least one syntax structure in an encoded video bitstream, the at least one syntax structure indicating adjustment information specifying how the dynamic range adjustment has been applied to the video data, and
wherein the adjustment information includes:
a global offset value that applies to each of one or more partitions into which the video data was partitioned during the dynamic range adjustment, and
a number of partitions into which the video data was partitioned during the dynamic range adjustment, and
perform an inverse dynamic range adjustment on the video data in accordance with the adjustment information to generate unadjusted component values from the video data,
wherein performing the inverse dynamic range adjustment includes generating the unadjusted component values according to the number of partitions.

43. The apparatus of claim 42,
wherein the global offset value is a first global offset value, the first global offset value being substituted, prior to performing the dynamic range adjustment on the video data, for unadjusted component values less than the first global offset value,
wherein the adjustment information further includes a second global offset value; and
wherein performing the inverse dynamic range adjustment on the video data includes:
mapping component values matching the second global offset value to the first global offset value.

44. The apparatus of claim 42,
wherein the global offset value is a first global offset value, the first global offset value being substituted, prior to performing the dynamic range adjustment on the video data, for unadjusted component values less than the first global offset value, and
wherein performing the inverse dynamic range adjustment on the video data includes:
deriving a second global offset value from one or more of metadata, video usability information, a video parameter set, a sequence parameter set, a picture parameter, a slice header, or a CTU header; and
mapping component values matching the second global offset value to the first global offset value.

45. The apparatus of claim 42,
wherein the global offset value is a first global offset value,
wherein performing the inverse dynamic range adjustment on the video data includes:
deriving a second global offset value from one or more of metadata, video usability information, a video parameter set, a sequence parameter set, a picture parameter, a slice header, or a CTU header, wherein the second global offset value is a value that was substituted, prior to performing the dynamic range adjustment on the video data, for unadjusted component values less than the second global offset value,
mapping component values matching the first global offset value to the second global offset value.

46. The apparatus of claim 42, wherein the one or more processors are further configured to:
derive additional adjustment information from at least the global offset value, the additional adjustment information further specifying how the dynamic range adjustment has been applied to the video data.

47. The apparatus of claim 42, wherein the adjustment information specifies one partition, and wherein the one partition applies to all components.

48. The apparatus of claim 42, wherein the video data includes luma components and chroma components, wherein the adjustment information includes a first number of partitions into which the luma components were partitioned during the dynamic range adjustment, a second number of partitions into which a first set of the chroma components were partitioned during the dynamic range adjustment, and a third number of partitions into which a second set of the chroma components were partitioned during the dynamic range adjustment, and wherein performing the inverse dynamic range adjustment includes:
generating unadjusted luma component values according to the first number of partitions;
generating unadjusted chroma component values corresponding to the first set of chroma components according to the second number of partitions; and
generating unadjusted chroma component values corresponding to the second set of chroma components according to the third number of partitions.

49. The apparatus of claim 48, wherein the second number of partitions is different than the first number of partitions, and wherein one of the second number of partitions is a neutral chroma partition that is smaller than any other partition in the second number of partitions.

50. The apparatus of claim 42, wherein the video data includes red, green, and blue components, wherein the adjustment information includes a first number of partitions into which the red components were partitioned during the dynamic range adjustment, a second number of partitions into which the green components were partitioned during the dynamic range adjustment, and a third number of partitions into which the blue components were partitioned during the dynamic range adjustment, and wherein performing the inverse dynamic range adjustment includes:
generating unadjusted red component values according to the first number of partitions;
generating unadjusted green component values according to the second number of partitions; and
generating unadjusted blue component values according to the third number of partitions.

51. The apparatus of claim 42, wherein the first number of partitions is represented as a logarithm.

52. The apparatus of claim 42, wherein the one or more processors are further configured to:
derive additional adjustment information from the at least one SEI message, the additional adjustment information further specifying how the dynamic range adjustment has been applied to the video data.

53. The apparatus of claim 42, wherein performing the inverse dynamic range adjustment on the video data includes:
determining for each input sample for each component of the video data, a partition to which the input sample belongs, and
generating, for each of the partitions, the unadjusted component values.

54. The apparatus of claim 53, wherein the adjustment information further includes a local offset value and a local scale value for each of the partitions, and wherein performing the inverse dynamic range adjustment on the video data includes:
generating the unadjusted component values according to the local offset value and the local scale value.

55. The apparatus of claim 54, wherein the local offset value for each of the partitions is represented by a first number of bits and a second number of bits, wherein the first number of bits is used to represent an integer part of the local offset value and the second number of bits is used to represent a fractional part of the local offset value, wherein the adjustment information further includes the first number of bits and the second number of bits, and
wherein performing the inverse dynamic range adjustment on the video data includes:
generating the unadjusted component values according to the local offset value for each of the partitions as represented by the first number of bits and the second number of bits.

56. The apparatus of claim 54, wherein the local scale value for each of the partitions is represented by a first number of bits and a second number of bits, wherein the first number of bits is used to represent an integer part of the local scale value and the second number of bits is used to represent a fractional part of the local scale value, wherein the adjustment information further includes the first number of bits and the second number of bits, and
wherein performing the inverse dynamic range adjustment on the video data includes:
generating the unadjusted component values according to the local scale value for each of the partitions as represented by the first number of bits and the second number of bits.

57. The apparatus of claim 56, wherein the integer part of the scale value is represented in one of a signed magnitude format or two's complement notation.

58. The apparatus of claim 54,
wherein the local scale value for each of the partitions is a first component local scale value for each of the partitions,
wherein the adjustment information further includes a second component local scale value for each of the partitions,
wherein the first component local scale value for each of the partitions is represented by a first number of bits, wherein the second component local scale value for each of the partitions is represented by a second number of bits,
wherein the adjustment information further includes the first number of bits and the second number of bits, the second number of bits being different than the first number of bits, and
wherein performing the inverse dynamic range adjustment on the video data includes:
generating first component unadjusted component values according to the first component local scale value for each of the partitions; and
generating second component unadjusted component values according to the second component local scale value for each of the partitions.

59. The apparatus of claim 54,
wherein the local offset value for each of the partitions is a first component local offset value for each of the partitions,
wherein the adjustment information further includes a second component local offset value for each of the partitions,
wherein the first component local offset value for each of the partitions is represented by a first number of bits, wherein the second component local offset value for each of the partitions is represented by a second number of bits,
wherein the adjustment information further includes the first number of bits and the second number of bits, the second number of bits being different than the first number of bits, and
wherein performing the inverse dynamic range adjustment on the video data includes:
generating first component unadjusted component values according to the first component local offset value for each of the partitions; and
generating second component unadjusted component values according to the second component local offset value for each of the partitions.

60. The apparatus of claim 42, wherein the adjustment information indicates whether the partitions are of equal size.

61. The apparatus of claim 42, wherein the adjustment information includes, for each of the partitions, a scale value and a size value.

62. The apparatus of claim 42, further comprising a display configured to display a picture comprising the decoded video data.

63. The apparatus of claim 42, wherein the apparatus comprises one or more of a camera, a computer, a mobile device, a broadcast receiver device, or a set-top box.

64. An apparatus configured to encode video, the apparatus comprising:
a memory configured to store the video data; and
one or more processors configured to:
perform a dynamic range adjustment on the video data to generate adjusted component values from the video data, and generating at least one syntax structure in an encoded video bitstream, the at least one syntax structure message indicating adjustment information specifying how the dynamic range adjustment has been applied to the video data, and wherein the adjustment information includes:
- a global offset value that applies to each of one or more partitions into which the video data was partitioned during the dynamic range adjustment, and
- a number of partitions into which the video data was partitioned during the dynamic range adjustment, wherein performing the dynamic range adjustment includes generating the adjusted component values according to the number of partitions.

65. The apparatus of claim 64, wherein the global offset value is a first global offset value, the first global offset value being substituted, prior to performing the dynamic range adjustment on the video data, for unadjusted component values less than the first global offset value, wherein the adjustment information further includes a second global offset value; and wherein performing the dynamic range adjustment on the video data includes:

mapping component values matching the first global offset value to the second global offset value.

66. The apparatus of claim 64, further comprising a camera sensor configured to capture a picture comprising the video data.

67. The apparatus of claim 64, wherein the apparatus comprises one or more of a camera, a computer, a mobile device, a broadcast receiver device, or a set-top box.

68. A non-transitory computer-readable medium with instructions stored thereon that when executed on a processor would cause the processor to perform the method of claim 1.

* * * * *